United States Patent [19]

Imanaka et al.

[11] Patent Number: 5,781,136
[45] Date of Patent: Jul. 14, 1998

[54] DIGITAL INFORMATION ENCODING DEVICE, DIGITAL INFORMATION DECODING DEVICE, DIGITAL INFORMATION ENCODING/DECODING DEVICE, DIGITAL INFORMATION ENCODING METHOD, AND DIGITAL INFORMATION DECODING METHOD

[75] Inventors: Yoshifumi Imanaka; Yoshiko Isu, both of Tokyo, Japan

[73] Assignee: Mitsubishi Denki Kabushiki Kaisha, Tokyo, Japan

[21] Appl. No.: 768,732

[22] Filed: Dec. 18, 1996

[30] Foreign Application Priority Data

Jun. 19, 1996 [JP] Japan ................. 8-158198

[51] Int. Cl.[6] .................................. H04N 1/44
[52] U.S. Cl. .................. 341/107; 341/52; 358/430
[58] Field of Search ................. 341/50, 107, 106, 341/52; 382/232, 238; 358/426, 430, 261.2

[56] References Cited

U.S. PATENT DOCUMENTS

| | | | |
|---|---|---|---|
| 4,973,961 | 11/1990 | Chamzas et al. | 341/51 |
| 5,025,258 | 6/1991 | Duttweiler | 341/107 |
| 5,297,220 | 3/1994 | Nomizu | 382/247 |
| 5,321,521 | 6/1994 | Nomizu | 358/426 |
| 5,404,140 | 4/1995 | Ono et al. | 341/107 |
| 5,422,734 | 6/1995 | Kang | 358/429 |
| 5,491,564 | 2/1996 | Hongu | 358/429 |
| 5,555,323 | 9/1996 | Hongu | 382/247 |
| 5,583,500 | 12/1996 | Allen et al. | 341/107 |
| 5,680,129 | 10/1997 | Weinberger et al. | 341/65 |

FOREIGN PATENT DOCUMENTS 6121172 4/1994 Japan.

OTHER PUBLICATIONS

Imanaka et al. "International Standardized Highly Effective Encoding System (QM–Coder) LSI" *Mitsubishi Denki Giho*. vol. 69, No. 3, 1995.

*Primary Examiner*—Jeffrey A. Gaffin
*Assistant Examiner*—Peguy JeanPierre
*Attorney, Agent, or Firm*—Leydig, Voit & Mayer, Ltd.

[57] ABSTRACT

A digital information encoding device used in a QM-Coder comprises a context table storage means for storing a plurality of storing data comprising a prediction symbol and an LSZ data, an arithmetic calculation means for receiving the storing data which is read out according to the address based on a context from a context generation means, and a renewal data generation means comprising a data storage device means, an LSZ renewal logic circuit, and an MPS renewal logic circuit for generating a renewal data based on a storing data and a prediction conversion signal from the arithmetic calculation means. The renewal data is written to the storing data in the context table storage means according to the address based on the context from the context storage means. The digital information encoding device can obtain a high speed processing, which is suitably integrated into a semiconductor integrated circuit.

29 Claims, 19 Drawing Sheets

| ADDRESS | MPS | LSZ |
|---|---|---|
| 0000000000 | 0 | 0×5a1d |
| 0000000001 | 0 | 0×2586 |
| ∫ | ∫ | ∫ |
| 0000000101 | 0 | 0×5a7f |
| ∫ | ∫ | ∫ |
| 1111111111 | 1 | 0×59eb |

| ADDRESS | MPS | LSZ |
|---|---|---|
| 0000000000 | 0 | 0×5a1d |
| 0000000001 | 0 | 0×2586 |
| ∫ | ∫ | ∫ |
| 0000000101 | 0 | 0×3f25 |
| ∫ | ∫ | ∫ |
| 1111111111 | 1 | 0×59eb |

| No. | INPUT | | OUTPUT | |
|---|---|---|---|---|
| | LPS | LSZ | LSZUP | SWITCH |
| 0 | 0 | 5a1d | 2586 | 0 |
| 1 | 0 | 2586 | 1114 | 0 |
| 2 | 0 | 1114 | 080b | 0 |
| 3 | 0 | 080b | 03d8 | 0 |
| ～ | ～ | ～ | ～ | ～ |
| 14 | 0 | 5a7f | 3f25 | 0 |
| ～ | ～ | ～ | ～ | ～ |
| 111 | 0 | 5522 | 504f | 0 |
| 112 | 0 | 59eb | 5522 | 0 |
| 113 | 1 | 5a1d | 2586 | 1 |
| 114 | 1 | 2586 | 5a7f | 0 |
| 115 | 1 | 1114 | 2cf2 | 0 |
| 116 | 1 | 080b | 17b9 | 0 |
| ～ | ～ | ～ | ～ | ～ |
| 127 | 1 | 5a7f | 3f25 | 1 |
| ～ | ～ | ～ | ～ | ～ |
| 224 | 1 | 5522 | 59eb | 0 |
| 225 | 1 | 59eb | 59eb | 1 |

FIG. 9

| CONDITIONS \ MODE | I | II | III | IV | V |
|---|---|---|---|---|---|
| RENORMALIZING | NO | YES | YES | YES | YES |
| IDENTICAL CONTEXT | = | = | ≠ | = | = |
| NUMBER OF RENORMALIZING (BIT NUMBER) | 0 | r=1 | r>1 | r=1 | r>1 |
| NUMBER OF PROCESSING CLOCK | 1 | 1 | r | 2 | r |

FIG. 10

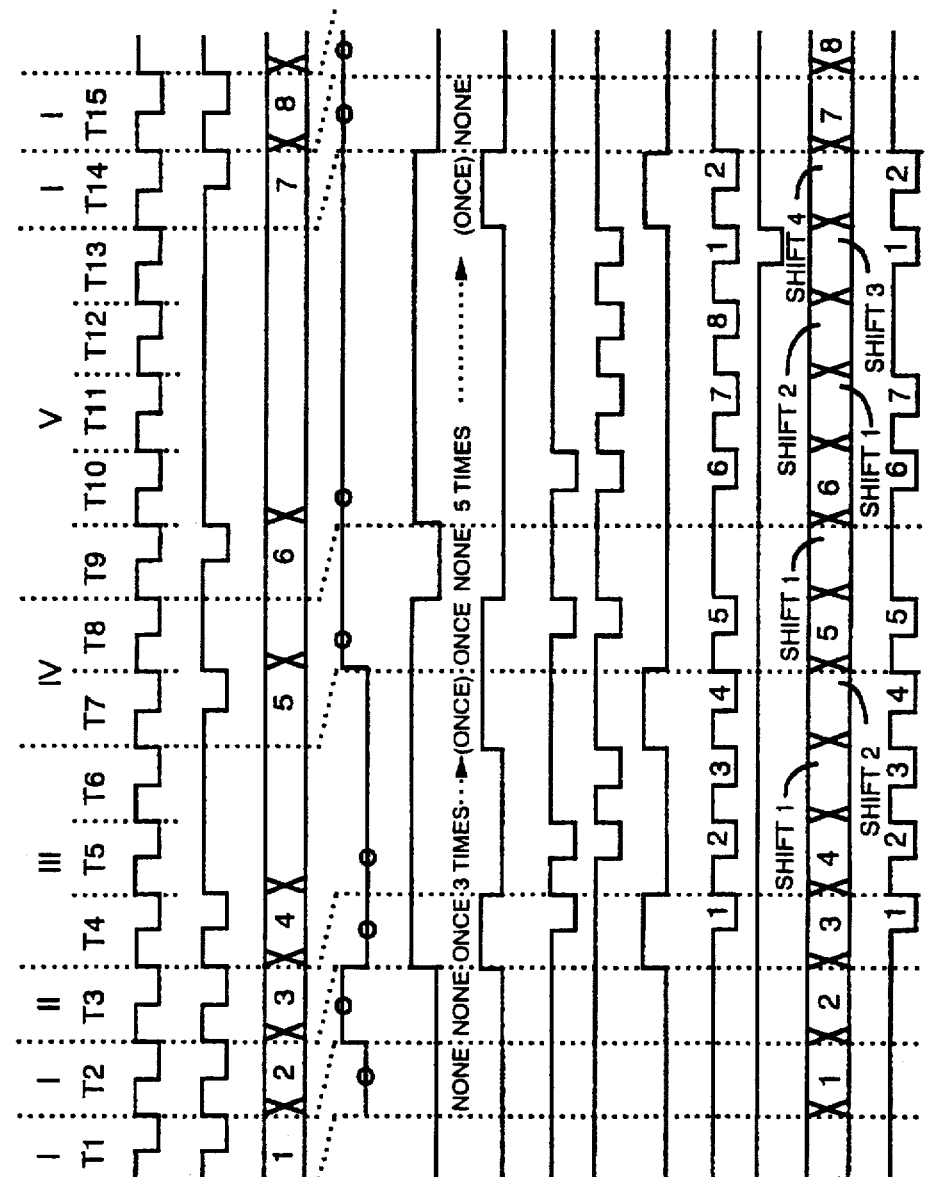

DIGITAL INFORMATION ENCODING DEVICE, DIGITAL INFORMATION DECODING DEVICE, DIGITAL INFORMATION ENCODING/DECODING DEVICE, DIGITAL INFORMATION ENCODING METHOD, AND DIGITAL INFORMATION DECODING METHOD

BACKGROUND OF THE INVENTION

1. Field of the Invention

The present invention relates to a digital information encoding device (an encoding device based on so-called QM-Coder), a digital information decoding device, a digital information encoding(decoding device, a method of encoding digital information, and a method of decoding digital information, which are integrated into a semiconductor integrated circuit applied, for example, to a facsimile apparatus.

2. Description of the Prior Art

A facsimile equipment transmits binary pictures such as drawings and document texts to a remote place. The demand for a facsimile equipment to transmit the data more speedily is increasing in recent years. The transmission time has been reduced by reducing the amount of data by means of encoding.

In other words, in case of a facsimile apparatus, there are some systems for transmitting digital picture information by compressing, namely, transmitting information as an encoded data after encoding, which are now taken into the international standard. One of the system is an MH (Modified Huffman) encoding system which uses correlation between one dimensional pixels (picture elements). The second system is an MR (Modified READ) encoding system which uses correlation between two dimensional pixels which enhances the compression efficiency. The third system is an MMR (Modified Modified READ) encoding system which further enhances the compression efficiency by eliminating redundancy of MR code.

Since it is difficult to procure a recording device which realizes a precise reproduction of the half tone picture at present, the encoding processing is carried out after preprocessing a pseudo half tone by the method called dither.

Recently, attentions are focused on the international standard group JBIG for encoding two value picture, and QM-Corder which is a highly efficient encoding system of information keeping type. The former is characterized by a high compression ratio achieved not only for picture information, but also for various kinds of information including pallet or character information. Moreover, the JBIG achieves a highly efficient compression ratio even for a pseudo half tone picture. The latter has been standardized in the standard group JPEG for color static picture encoding.

Although a digital information encoding device based on the above-mentioned QM-Coder is characterized by its high-speed processing, further high-speed processing is requested. Moreover, a digital information encoding device which is suitably integrated into a semiconductor integrated circuit is in great demand.

The inventors who are concerned with the present invention have carried out several investigation on the digital information encoding device based on the QM-Coder, which is resulted in the following facts. The highest speed of the apparatus has been a satisfactory one. In the worst case however, namely, when the compression ratio is 1, the processing speed falls to less than half of the highest speed.

Accordingly, it is resulted that the total processing speed can be improved by improving the processing speed in the worst case.

It is an object of the present invention to provide a digital information encoding device, a digital information decoding device, a digital information encoding/decoding device, a method of encoding digital information, and a method of decoding digital information, in which the total processing speed is improved, namely, the high speed processing is achieved.

It is another object of the present invention to provide a digital information encoding device, a digital information decoding device, a digital information encoding/decoding device, a method of encoding digital information, and a method of decoding digital information, which are suitably integrated into a semiconductor integrated circuit.

SUMMARY OF THE INVENTION

According to one aspect of the present invention, the digital information encoding device based on a QM-Coder comprises a read/write context table storage device portion in a context table storage means for storing a plurality of storing data of plurality of bits comprising a prediction symbol and an LSZ data which is a part of a probability estimating data and indicates a mismatching probability. The storing data from said plurality of storing data are selectively outputted to an arithmetic calculation means according to a context for a target coding pixel. The digital information encoding device further comprises a renewal data generation means which outputs a renewal data to the context table storage means. The renewal data generation means receives a prediction conversion signal from the arithmetic calculation means and a storing data from the context table storage means and generates a renewal data to be written on the context table storage means.

According to another aspect of the present invention, the digital information encoding device comprises a context table storage means which comprises a read address input node for receiving the context from the context generation means, a read/write context table storage device portion for storing a plurality of the storing data, a data output node for outputting the storing data stored in the context table storage device portion at an address based on the context received on the read address input node, a write address input node for receiving the context temporarily stored in the context storage means, and a data input node for receiving a renewal data of a plurality of bits which corresponds to the context table storage device portion at an address based on the context received on the write address input node.

According to further aspect of the present invention, the digital information encoding device comprises an LSZ renewal means for receiving an LSZ data of a storing data from the context table storage means and a prediction conversion signal from the arithmetic calculation means, and outputting an LSZUP data indicating a mismatching probability of the renewal data to be sent to the context table storage means and a SWITCH data indicating whether a prediction symbol of a storing data from the context table storage means is to be inverted or not. The digital information encoding device further comprises an MPS renewal means for receiving a SWITCH data from the LSZ renewal means and a prediction symbol of storing data from the context table storage means and outputting a value of the received prediction symbol as a prediction symbol of a renewal data to be written on the context table storage device if the received SWITCH data is "0", and outputting an inverted value of the received prediction symbol as a prediction symbol of a renewal data to be written on the context table storage device if the received SWITCH data is "1".

According to further aspect of the present invention, the digital information encoding device comprises an LSZ renewal means comprising, in addition to the above-mentioned construction, a logic circuit which realizes a relationship between an input and an output as shown in a truth table tabulated based on the probability estimation table.

According to further aspect of the present invention, the digital information encoding device comprises, in addition to the above-mentioned construction, a data storage device means for storing temporarily said storing data from said context table storage means, outputting an LSZ data of said temporarily stored storing data to said LSZ renewal means and a prediction symbol of said temporarily stored storing data to said MPS renewal means.

According to further aspect of the present invention, the digital information decoding device based on a QM-Corder comprises a read/write context table storage device portion in a context table storage means for storing a plurality of storing data of plurality of bits comprising a prediction symbol and an LSZ data which is a part of a probability estimating data and indicates a mismatching probability. The storing data from said plurality of storing data are selectively outputted to an arithmetic calculation means according to a context for a target decoding pixel. The digital information decoding device further comprises a renewal data generation means which outputs a renewal data to the context table storage means. The renewal data generation means receives a prediction conversion signal from the arithmetic calculation means and a storing data from the context table storage means and generates a renewal data to be written on the context table storage means.

According to further aspect of the present invention, the digital information decoding device comprises a context table storage means which comprises a read address input node for receiving the context from the context generation means, a read/write context table storage device portion for storing a plurality of the storing data, a data output node for outputting the storing data stored in the context table storage device portion at an address based on the context received on the read address input node, a write address input node for receiving the context temporarily stored in the context storage means, and a data input node for receiving a renewal data of a plurality of bits which corresponds to the context table storage device portion at an address based on the context received on the write address input node.

According to further aspect of the present invention, the digital information decoding device comprises an LSZ renewal means for receiving an LSZ data of a storing data from the context table storage means and a prediction conversion signal from the arithmetic calculation means, and outputting an LSZUP data indicating a mismatching probability of the renewal data to be sent to the context table storage means and a SWITCH data indicating whether a prediction symbol of a storing data from the context table storage means is to be inverted or not. The digital information encoding device further comprises an MPS renewal means for receiving a SWITCH data from the LSZ renewal means and a prediction symbol of storing data from the context table storage means and outputting a value of the received prediction symbol as a prediction symbol of a renewal data to be written on the context table storage device if the received SWITCH data is "0", and outputting an inverted value of the received prediction symbol as a prediction symbol of a renewal data to be written on the context table storage device if the received SWITCH data is "1".

According to further aspect of the present invention, the digital information decoding device comprises an LSZ renewal means comprising, in addition to the above-mentioned construction, a logic circuit which realizes a relationship between an input and an output as shown in a truth table tabulated based on the probability estimation table.

According to further aspect of the present invention, the digital information decoding device comprises, in addition to the above-mentioned construction, a data storage device means for storing temporarily said storing data from said context table storage means, outputting an LSZ data of said temporarily stored storing data to said LSZ renewal means and a prediction symbol of said temporarily stored storing data to said MPS renewal means.

According to further aspect of the present invention, the digital information encoding/decoding device based on a QM-Corder comprises a read/write context table storage device portion in a context table storage means for storing a plurality of storing data of plurality of bits comprising a prediction symbol and an LSZ data which is a part of a probability estimating data and indicates a mismatching probability, and for selectively outputting a storing data from said stored plurality of storing data to either an encoding arithmetic calculation means or a decoding calculation means according to a context for a target coding pixel or target decoding pixel; and a renewal data generation means for outputting to the context table storage means a renewal data, which is generated either in the encoding arithmetic calculation means or the decoding arithmetic calculation means from a prediction conversion signal and the storing data outputted from the context table storage means, and which comprises a plurality of bits including a prediction symbol and an LSZ data which is a part of a probability estimating data and indicates a mismatching probability.

According to further aspect of the present invention, the digital information encoding/decoding device comprises a context table storage means comprising, in addition to the above-mentioned construction, a read address input node for receiving said context from said context generation means, a data output node connected to the arithmetic calculation means for outputting said storing data stored in said context table storage device portion at an address based on said context received on said read address input node, a write address input node for receiving said context temporarily stored in said context storage means, and a data input node for receiving a renewal data from the renewal data generation means, which correspond to said context table storage device portion at an address based on said context received on said write address input node.

According to further aspect of the present invention, the digital information encoding/decoding device comprises a renewal data generation means comprising in addition to the above mentioned construction, an LSZ renewal means for receiving an LSZ data of a storing data from said context table storage means and a prediction conversion signal from said arithmetic calculation means, and outputting an LSZ data indicating a mismatching probability of said renewal data to be written on said context table storage means and a SWITCH data indicating whether a prediction symbol of a storing data from said context table storage means is to be inverted or not; and an MPS renewal means for receiving a SWITCH data from said LSZ renewal means and a prediction symbol of storing data from said context table storage means, and outputting a value of said received prediction symbol as a prediction symbol of a renewal data to be written on said context table storage device if said received SWITCH data is "0", and outputting an inverted value of said received prediction symbol as a prediction symbol of a renewal data to be written on said context table storage device if said received SWITCH data is "1".

According to further aspect of the present invention, the digital information encoding/decoding device comprises an LSZ renewal means comprising, in addition to the above-mentioned construction, a logic circuit which realizes a relationship between an input and an output as shown in a truth table tabulated based on the Probability estimation table.

According to further aspect of the present invention, the digital information encoding/decoding device comprises, in addition to the above-mentioned construction, a data storage device means for storing temporarily said storing data from said context table storage means, outputting an LSZ data of said temporarily stored storing data to said LSZ renewal means and a prediction symbol of said temporarily stored storing data to said MPS renewal means.

According to further aspect of the present invention, the digital information encoding method comprises steps of, during one clock of a system clock signal when encoding processing for a target coding pixel requires one renormalization, generating a context for said target coding pixel, reading out a storing data based on said generated context comprising a prediction symbol and an LSZ data which is a part of a probability estimating data and indicates a mismatching probability, obtaining an A data and a C data using the read-out storing data, and also obtaining a prediction conversion signal indicating whether a picture data for said target coding pixel matches with a prediction symbol of said read-out storing data or not, and during subsequent one clock of a system clock signal, obtaining a renewal data comprising a prediction symbol and an LSZ data which is a part of a probability estimating data and indicates a mismatching probability according to said read-out storing data and said obtained prediction conversion signal, rewriting a storing data based on said context for said target coding pixel by said renewal data, generating a context for a subsequent target coding pixel of said target coding pixel, reading out a storing data based on said generated context, and obtaining an A data and a C data for a subsequent target coding pixel using said read-out storing data.

According to further aspect of the present invention, the digital information decoding method comprises steps of: during one clock of a system clock signal when decoding processing for a target decoding pixel requires one renormalization; generating a context for said target decoding pixel, reading out a storing data based on said generated context comprising a prediction symbol and an LSZ data which is a part of a probability estimating data and indicates a mismatching probability, obtaining an A data, a C data, and a prediction conversion signal using the read-out storing data, and further obtaining a decoded picture data for said target decoding pixel; and during subsequent one clock of a system clock signal; obtaining a renewal data comprising a prediction symbol and an LSZ data which is a part of a probability estimating data and indicates a mismatching probability according to said read-out storing data and said obtained prediction conversion signal, rewriting a storing data based on said context for said target decoding pixel by said renewal data, generating a context for a subsequent target decoding pixel of the target decoding pixel, reading out a storing data based on said generated context, and obtaining an A data and a C data for a subsequent target decoding pixel of said target decoding pixel, according to said readout storing data.

BRIEF DESCRIPTION OF THE DRAWINGS

FIG. 9 is a block diagram showing a truth table for the logic in the LSZ renewal logic circuit 15, 115 in the first–third embodiments of the present invention.

FIG. 10 is a diagram showing the operation modes in the first–third embodiments of the present invention.

FIGS. 17A–17M are diagrams showing signal waveforms at the main portions in the second and third embodiments of the present invention.

DETAILED DESCRIPTION OF THE PREFERRED EMBODIMENTS

Embodiment 1

Figure 1:
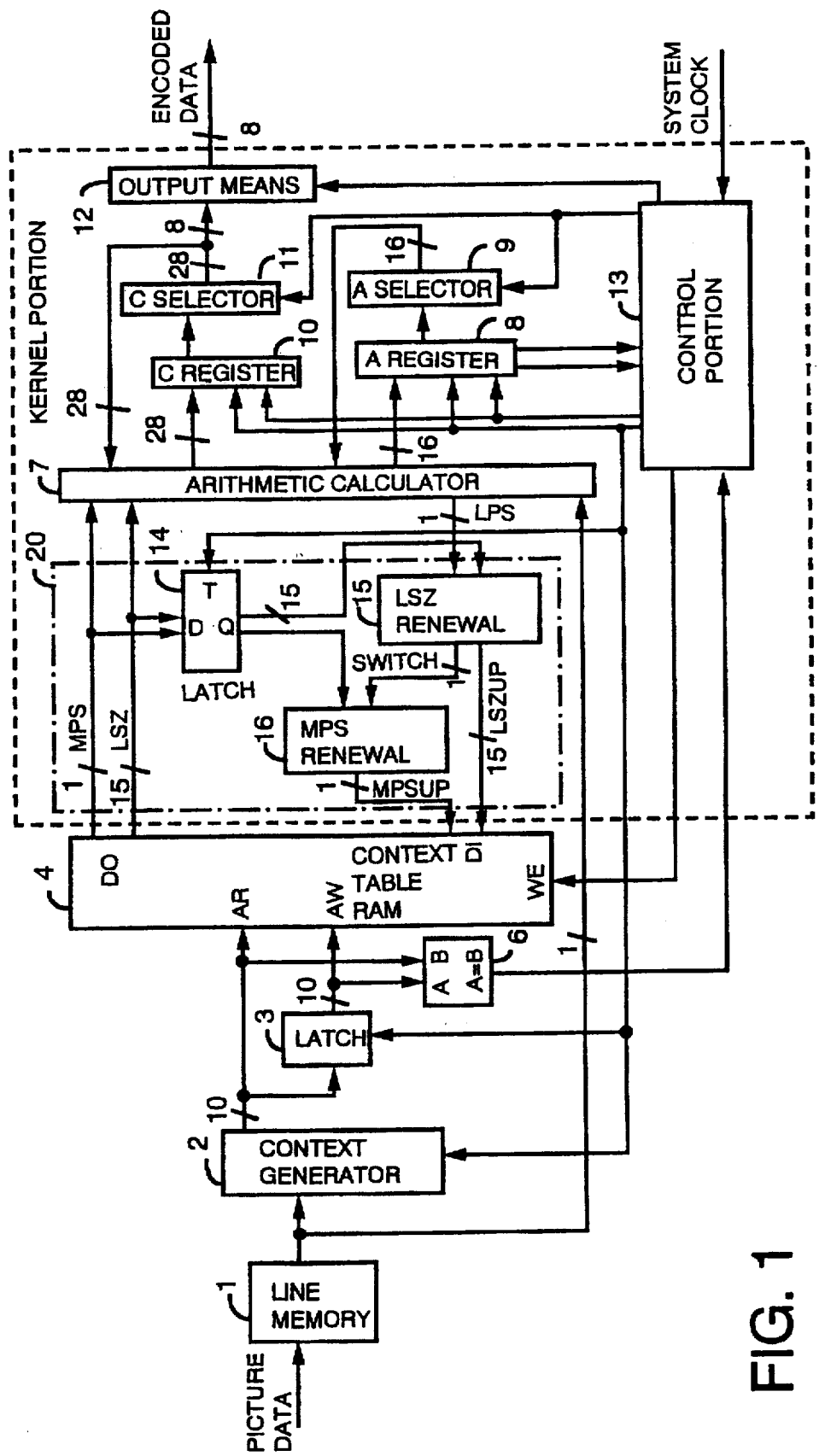
FIG. 1 is a block diagram showing a first embodiment of the present invention.

FIG. 1 shows a digital signal encoding device (QM-Coder) in a first embodiment of the present invention, which is integrated in a semiconductor integrated circuit, which is, for example, applied to a facsimile apparatus. In FIG. 1, a storage device 1 comprises a plurality of line memories which store picture data for every one line. The picture data comprises a digital signal which is converted from the picture information to a two value picture by an analog/digital conversion circuities. The picture information comprises character information, pictorial information, pallet picture information, read out for every one line by a picture sensor such as a scanner (not shown in FIG. 1).

A context generator 2 in FIG. 1 extracts a reference pixel according to a template model from the picture data inputted from the above-mentioned storage device 1. For example, in case of the two-line template in FIG. 2A, the context generator 2 generates and outputs a context having bit patterns of ten pixels extracted from the template of the ten pixels. This ten pixels are four encoded reference pixels on the same line (horizontal direction) as the target coding pixel shown by the code "?", and six encoded reference pixels on the immediately preceding line of the target coding pixel shown by the code "?". The four encoded reference pixels are placed in the immediately preceding line to target coding pixel shown by the code "?", while the six encoded reference pixels are placed in the front and rear rows including the row of the target coding pixel shown by the code "?".

Figure 2B:
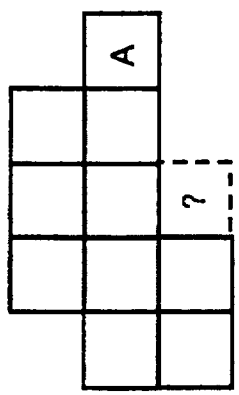
FIG. 2A and FIG. 2B are diagrams showing examples of respective templates.
Figure 2A:
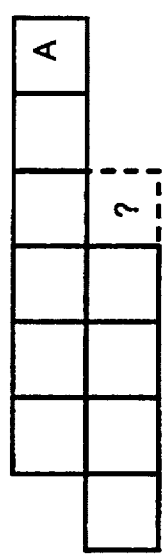

For example, in case of the three line template in FIG. 2B, the context generator 2 generates and outputs a context having bit patterns of the ten pixels extracted from the template of the ten pixels. The ten pixels in this case are two encoded reference pixels on the same line as the target coding pixel shown by the code "?", five encoded reference pixels on the immediately preceding line of the target coding pixel shown by the code "?", and three encoded reference pixels on the two preceding lines from the target coding pixel shown by the code "?". The two encoded reference pixels are placed in the preceding line of the target coding pixel shown by the code "?", while the five encoded reference pixels and the three encoded reference pixels are placed in the front and rear rows including the row of the target coding pixel shown by the code "?". The context generator 2 operates in synchronization with inputted pixel processing clock signal.

A context storage device 3 of FIG. 1 comprises a latch circuit temporarily stores a context for the target coding pixel from the above-mentioned context generator 2 in synchronization with the clock of the above-mentioned pixel processing clock signal, and outputs the temporarily stored context as a context for the target coding pixel in synchronization with the next clock of the above-mentioned pixel processing clock signal.

A context table storage device 4 of FIG. 1 comprises a read address input nodes AR for a plurality of addresses, a plurality of data output nodes DO, a plurality of a write address input nodes AW, a plurality of input nodes DI, a write-enable signal input node WE, and a context table storing portion where a plurality of storing data including a prediction symbol MPS and an LSZ data which is a part of the probability estimating data and indicates a mismatching probability are stored and written and read out.

The context table storage device 4 reads out the storing data stored in the context table storing portion based on the context which is received into the read address input nodes AR from the above-mentioned context generator 2, and then outputs it from the data output nodes DO. Receiving a renewal clock signal on the write-enable signal input node WE, i.e. renormalize processing is required for a target coding pixel, the context table storage device 4 writes a renewal data inputted from the data input nodes DI (rewrite the renewal data over previously stored data) in the context table storing portion based on the context which is received on the write address input nodes AW which is transmitted from the above-mentioned context storage device 3.

The number of the above-mentioned read address input nodes AR and the write address input nodes AW is, for example, 10, if the context comprises 10 bits.

The above-mentioned storing data includes a prediction symbol MPS indicating a prediction value, and an LSZ data which is a part of a probability estimating data.

The probability estimating data comprises a plurality of bits including an LSZ data, an NLPS data, an NMPS data and a SWITCH data, and is based on the probability table recommend by the ITU (International Telecommunication Union) recommendation T. 82.

The LSZ data indicates a mismatching probability. This represents a value of the size (referred to as the LPS area size) given to the area of a least probable symbol (hereinafter it is referred to as the LPS, and this indicates that a prediction symbol of a storing data read out from the context table storage device 4 does not match with a picture data for a target coding pixel from the storage device 1 in this first embodiment). The LSZ data comprises 16 bits for example, for each probability estimation index (status number ST). However, in this first embodiment, the most significant bit is always 0. Accordingly, the LSZ data stored as a storing data actually comprises 15 bits, except the most significant bit.

The rest of the probability estimating data, namely the NLPS data, the NMPS data and the SWITCH data, is explained below. The NLPS data serves as a probability estimation index (status number ST) for a renewal data, when the prediction symbol corresponding to the probability estimating data in the context of the NLPS does not match the picture data for the target coding pixel. When LPS appears, the NLPS data serves as a data for renewing the probability estimation index in the context of the LPS. The NLPS data comprises 7 bits for each probability estimation index (status number ST).

The NMPS data serves as a probability estimation index (status number ST) for a renewal data, when the prediction symbol corresponding to the probability estimating data in the context of the NMPS match the picture data for the target coding pixel. When a most probable symbol (hereinafter it is referred to as the MPS, and this indicates that a prediction symbol MPS matches with the picture data for the target coding pixel) appears and a normalization (renormalize) occurs, the NMPS data serves as a data for renewing the probability estimation index in the context of the MPS. The NMPS data comprises 7 bits for each probability estimation index (status number ST).

The SWITCH data indicates whether or not to invert a prediction symbol MPS for the probability estimating data in the context of the SWITCH data. The SWITCH data comprises 1-bit data, for example.

Figures 3A, 3B:
FIG. 3A and FIG. 3B are diagrams showing examples of respective context tables in the context table storage devices 4, 104.

In this first embodiment, the contents of the respective storing data stored in the context table storage device 4 are, for example, all "5a1d", which are renewed in order by the renormalize processing. FIG. 3A shows an example of storing data for each address in a certain status. FIG. 3B shows an example of renewed storing data where the contents of the storing data at the address 0000000101 is renewed from the status of FIG. 3A. In FIG. 3A and FIG. 3B, all the address and the prediction symbols MPS of the respective storing data are shown in binary, and all the LSZ data of the respective LSZ data are shown in hexadecimal.

The renewal data is the similar to the storing data, and a 16-bit data for example in this first embodiment, comprising 1-bit prediction symbol MPSUP and 15-bit LSZ (LSZUP) data indicating a mismatching probability and constituting a part of a probability estimating data.

The number of the above-mentioned data output nodes DO and the data input nodes DI is 16, for example, if the storing data and the renewal data comprise 16 bits, respectively. The above-mentioned context table storing portion 4 is able to store the storing data as much as the number of the address designated by the context. For example, if the context comprises 10 bits, storing data of $2^{10}$ is stored in the context table storing portion 4.

Figure 4:
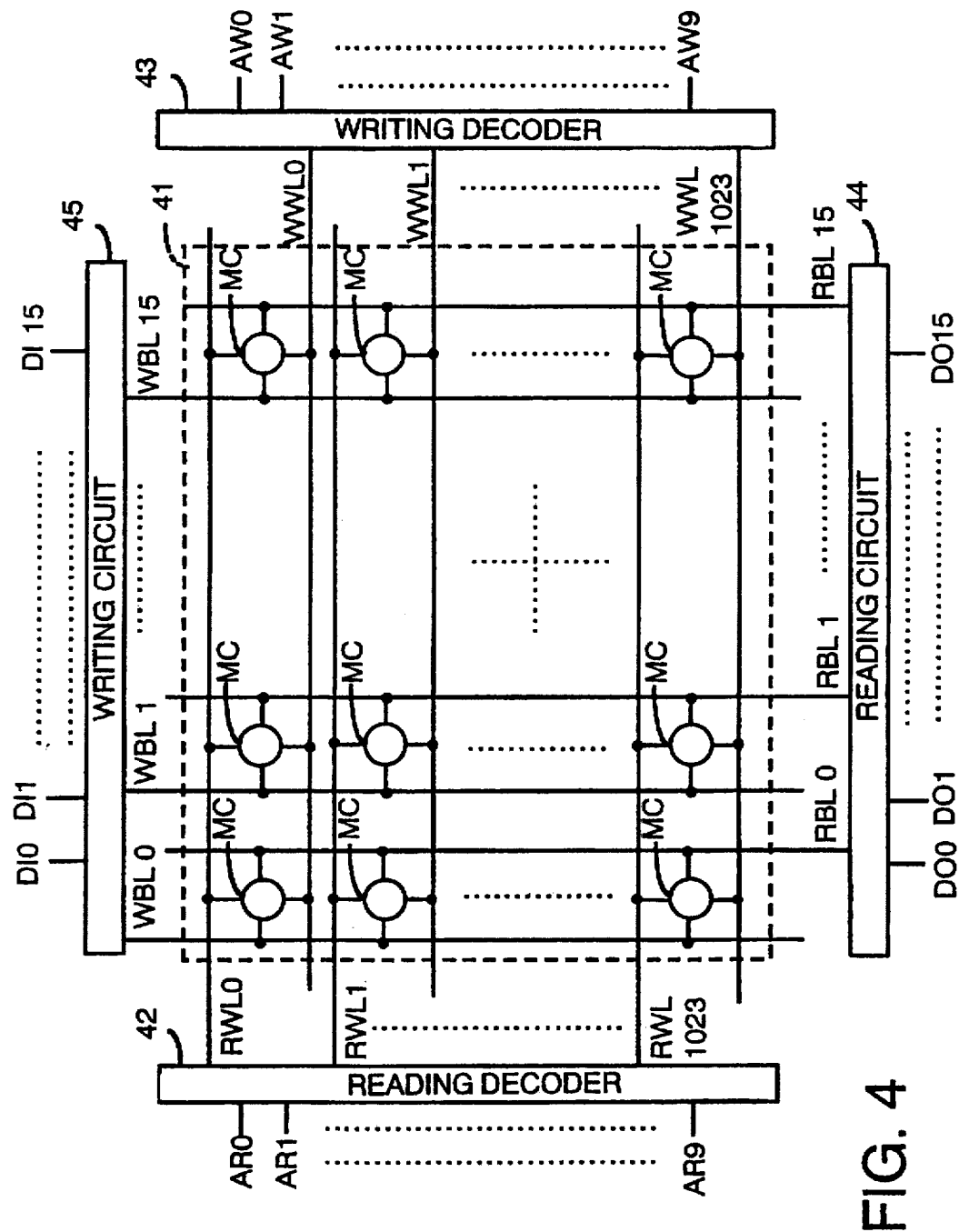
FIG. 4 is a diagram showing an example of the context table storage devices 4, 104 in the first–third embodiments of the present invention.

The above-mentioned context table storage device 4 comprises a two port RAM having a context table storing portion as shown in FIG. 4. This context table storing portion comprises 1024 (1 k) of lines, and each one line (1 address) comprises 16 bits.

In FIG. 4, a memory cell array 41 comprises 1024×16 pieces of memory cell MC which are arranged in the 1024 rows and in the 16 columns. The reading word lines RWL0~RWL1023 are arranged in the 1024 rows, each of which is connected to 16 memory cells allocated in each column. The writing word lines WWL0~WWL1023 are arranged in the 1024 rows, each of which is connected to 16 memory cells allocated in each column. The reading bit lines RBL0~RBL15 are arranged in 16 columns, each of which is connected to 1024 memory cells allocated in each row. The writing bit lines WBL0~WBL15 are arranged in 16 columns, each of which is connected to 1024 memory cells allocated in each row.

A reading decoder 42 is connected to the 10 read address nodes AR0~AR9. According to the context from the context generator 2 inputted to the read address nodes AR0~AR9, the reading decoder 42 activates one of the above-mentioned 1024 reading word lines RWL0~RWL1023. In other words, the reading decoder 42 makes one of the reading word lines "H" level, and make the remaining 1023 lines "L" level. A writing decoder 43 is connected to the 10 write address nodes AW0~AW9. According to the context from the context generator 2 inputted to the write address nodes AW0~AW9 via the above-mentioned context storage device 3, the writing decoder 43 activates one of the above-mentioned 1024 writing word lines WWL0~WWL1023. In other words the write decoder makes one of the writing word lines "H" level and make the remaining 1023 lines "L" level.

A reading circuit 44 is connected to 16 reading bit lines RBL0~RBL15. The reading circuit 44 conducts a predetermined processing, for example, amplification and so on, on stored contents read out from the memory cells into these reading bit lines RBL0~RBL15 and outputs them to the above-mentioned data output nodes DO1~DO15. A writing circuit 45 is connected to 16 writing bit lines WBL0~WBL15. The writing circuit 45 conducts a predetermined processing, for example, amplification and so on, to the renewal data inputted in the input nodes DI1~DI15, and output them to the writing bit lines WBL0~WBL15. A writing circuit 45 is connected to the 16 writing bit lines WBL0~WBL15.

Figure 5:
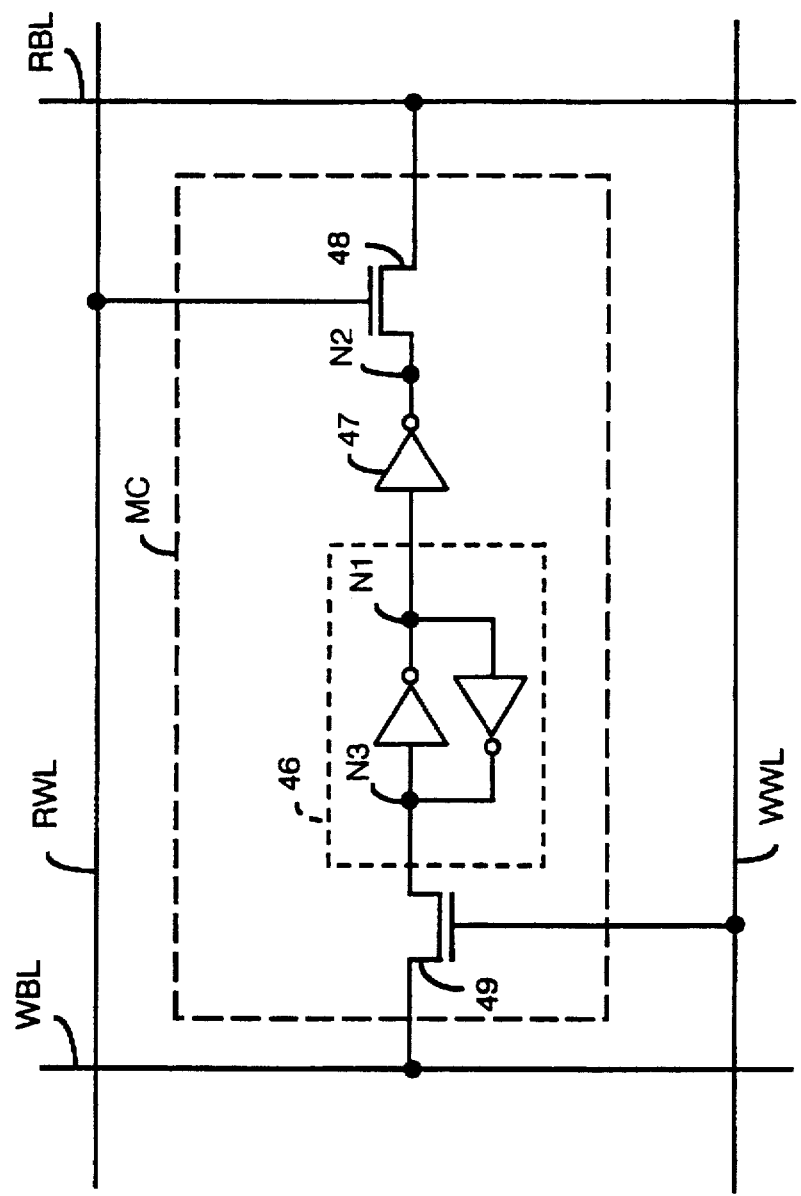
FIG. 5 is a diagram showing an example of a memory cell MC in the context table storage devices 4, 104 in the first–third embodiments of the present invention.

FIG. 5 shows a configuration of a memory cell MC. In FIG. 5, a storage device node N1 stores contents, a reading node N2 reads out stored contents and a writing node N3 is supplied with a renewal data.

A latch circuit 46 in FIG. 5 is connected between the above-mentioned storage device node N1 and the above-mentioned writing node N3. The latch circuit 46 inverts a renewal data inputted to the writing node N3, and provides it with the storage device node N1 and latches the inverted data. The latch circuit 46 comprises two inverter elements connected in parallel in the opposite polarity. An inverter element 47 in FIG. 5 is connected between the storage device node N1 and the reading node N2, and inverts contents stored in the storage device node N1 and provides it with the reading node N2.

A reading transfer gate 48 in FIG. 5 is connected between the reading node N2 and a reading bit line RBL arranged in the corresponding column. Its control electrode is connected to a reading word line RWL arranged in the corresponding row. The reading transfer gate 48 comprises a MOS transistor. A reading transfer gate 49 in FIG. 5 is connected between the reading node N3 and a writing bit line WBL arranged in the corresponding column. Its control electrode is connected to a writing word line WWL arranged in the corresponding row. The reading transfer gate 49 also comprises a MOS transistor.

For the shake of simplifying the explanation, the two port RAM memory cell array 41 shown in FIG. 4 are assumed to that each memory cell MC has 1024 rows and 16 columns. The memory cells can be selected, for example, 1024/n lines and 16×n rows (n is an integer). In this a case, 1024/n reading/writing word lines and 16×n reading/writing bit lines are arranged. One of the 1024/n reading word lines is activated to select 16 reading bit lines out of the 16×n reading bit lines. A 16 bit data are read out and then outputted to the data output nodes DO0~DO15 via the reading circuit 44. One of the 1024/n writing word lines is activated to select eight writing bit lines out of the 16×n writing bit lines for selecting 16 memory cells. A renewal data inputted from the data input nodes DI0~DI15 is provided with these selected 16 memory cells via the writing circuit 45.

Referring back to FIG. 1, a context comparator 6 in FIG. 1 compares a context from the context generator 2 and the context from the context storage device 3. If the resultant shows the same, the context comparator 6 outputs "1". Otherwise, it outputs "0".

Figure 6:
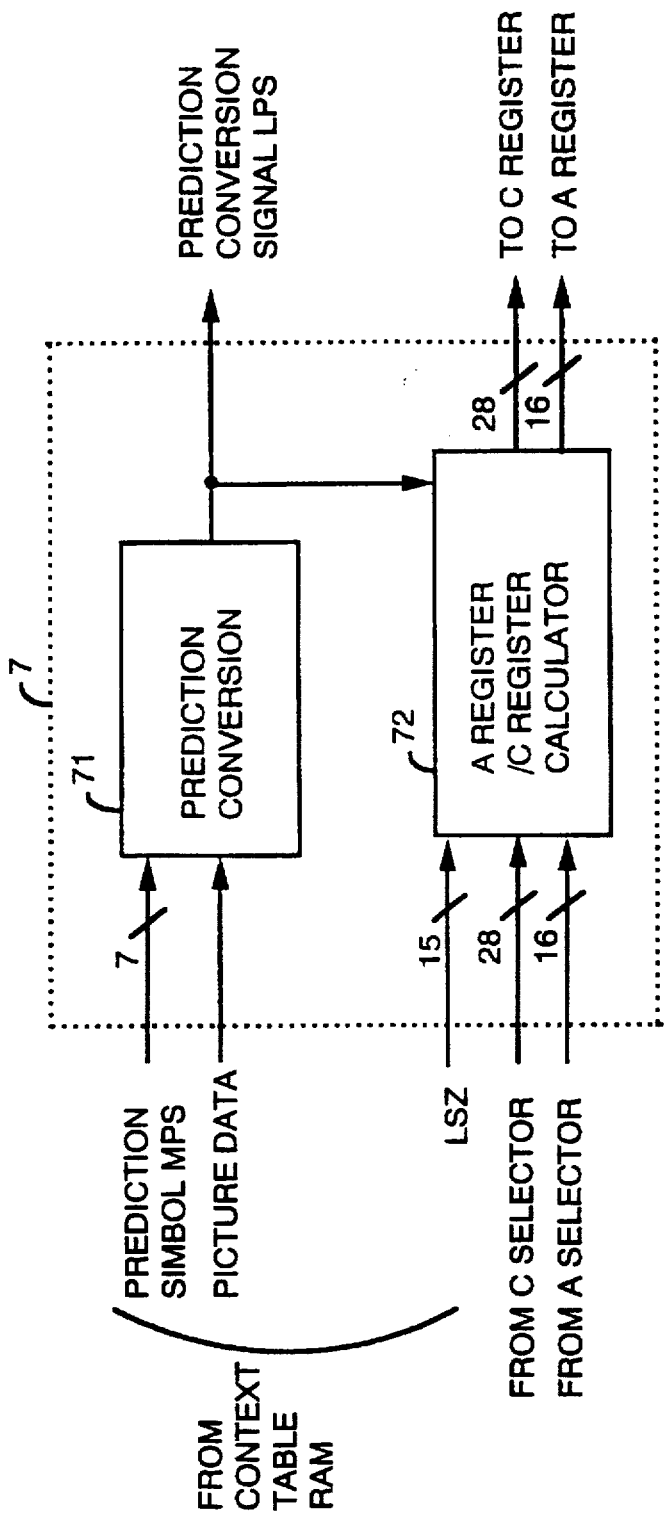
FIG. 6 is a diagram showing an arithmetic calculator 7 in the first–third embodiments of the present invention.

An arithmetic calculator 7 receives a picture data for a target coding pixel from the storage device 1, a storing data from the context table storage device 4, an A data (hereinafter, referred to as immediately preceding A data) which shows a size of the current coding interval for the pixels immediately preceding the target coding pixel, and a C data (hereinafter, referred to as immediately preceding C data) which shows the trailing bits of the code stream for the pixel immediately preceding target coding pixel. The arithmetic calculator 7 conducts a predetermined arithmetic processing and outputs an A data (hereinafter, just referred to as A data) which shows a size of the current coding interval for the target coding pixel and a C data (hereinafter, just referred to as immediately preceding C data) which shows the trailing bits of the code stream for the pixel immediately preceding the target coding pixel. The arithmetic calculator 7 further outputs a prediction conversion signal LPS indicating whether the inputted picture data matches with the prediction symbol MPS in the inputted storing data or not. A detailed configuration of the arithmetic calculator 7 is shown in FIG. 6.

The predetermined arithmetic processing for obtaining A data and C data is described below.

When the MPS has appeared:

$$A(k)=A(k-1)-LSZ(k) \qquad (1)$$

$$C(k)=C(k-1) \qquad (2)$$

When the LPS has appeared:

$$A(k)=LSZ(k) \qquad (3)$$

$$C(k)=C(k-1)+\{A(k-1)-LSD(k)\} \qquad (4)$$

where, A (k) is an A data of the k-th target coding pixel, A (k−1) is an A data of the (k−1)-th target coding pixel, C (k)

is a C data of the k-th target coding pixel, C (k−1) is a C data of the (k−1)-th target coding pixel, LSZ(k) is an LSZ data indicating mismatching probability of the storing data from the context table storage device 4 for the k-th target coding pixel, and k=1, 2, 3, . . . ., the initial value A (0)=1.0 . . . 0, C (0)=0.0 . . . 0, for example.

In FIG. 6, a prediction conversion signal generator 71 receives a picture data for a target coding pixel from the storage device 1 and a prediction symbol MPS of a storing data for the target coding pixel from the context table storage device 4. The prediction conversion signal generator 71 outputs, for example, a signal "0" (above-mentioned MPS), which indicates that the picture data matches with the prediction symbol MPS, when the two contexts match with each other. Otherwise, the prediction conversion signal generator 71 outputs, for example, a signal "1" (above-mentioned the LPS), which indicates that the picture data does not match with the prediction symbol MPS . The prediction conversion signal generator 71 comprises a comparator such as an exclusive OR circuit.

A calculator 72 for generating A data and C data receives an LSZ data of the storing data for a target coding pixel from the context table storage device 4, the immediately preceding A data, the immediately preceding C data, and a prediction conversion signal from the prediction conversion signal generator 71, and conducts the calculations shown by the equation (1)–(4) for outputting an A data and a C data. The calculator 72 comprises an A data generation portion which receives the LSZ data, the immediately preceding A data and the prediction conversion signal, and conducts the calculations according to the equations (1)–(3) for outputting A data, and a C data generation portion which receives the LSZ data, the immediately preceding A data, the immediately preceding C data and the prediction conversion signal, and conducts the calculations according to the equations (2)–(4) for outputting C data.

Referring back to FIG. 1, an A register 8 receives the A data from the arithmetic calculator 7, the pixel processing clock signal and a renormalizing clock signal. In synchronization with the inputted pixel processing clock signal, the A register 8 receives the A data from the arithmetic calculator 7 and latches them. In synchronization with the inputted renormalizing clock signal, the A register 8 shifts-up the latched data by one bit and latches them again, and outputs them as an A data. The A register 8 outputs a renormalizing (normalization) signal for carrying out a normalization processing (extension of area) and a last renormalizing signal indicating that normalization will be completed after one more normalization processing. A detailed configuration of the A register 8 is shown in FIG. 7.

Figure 7:
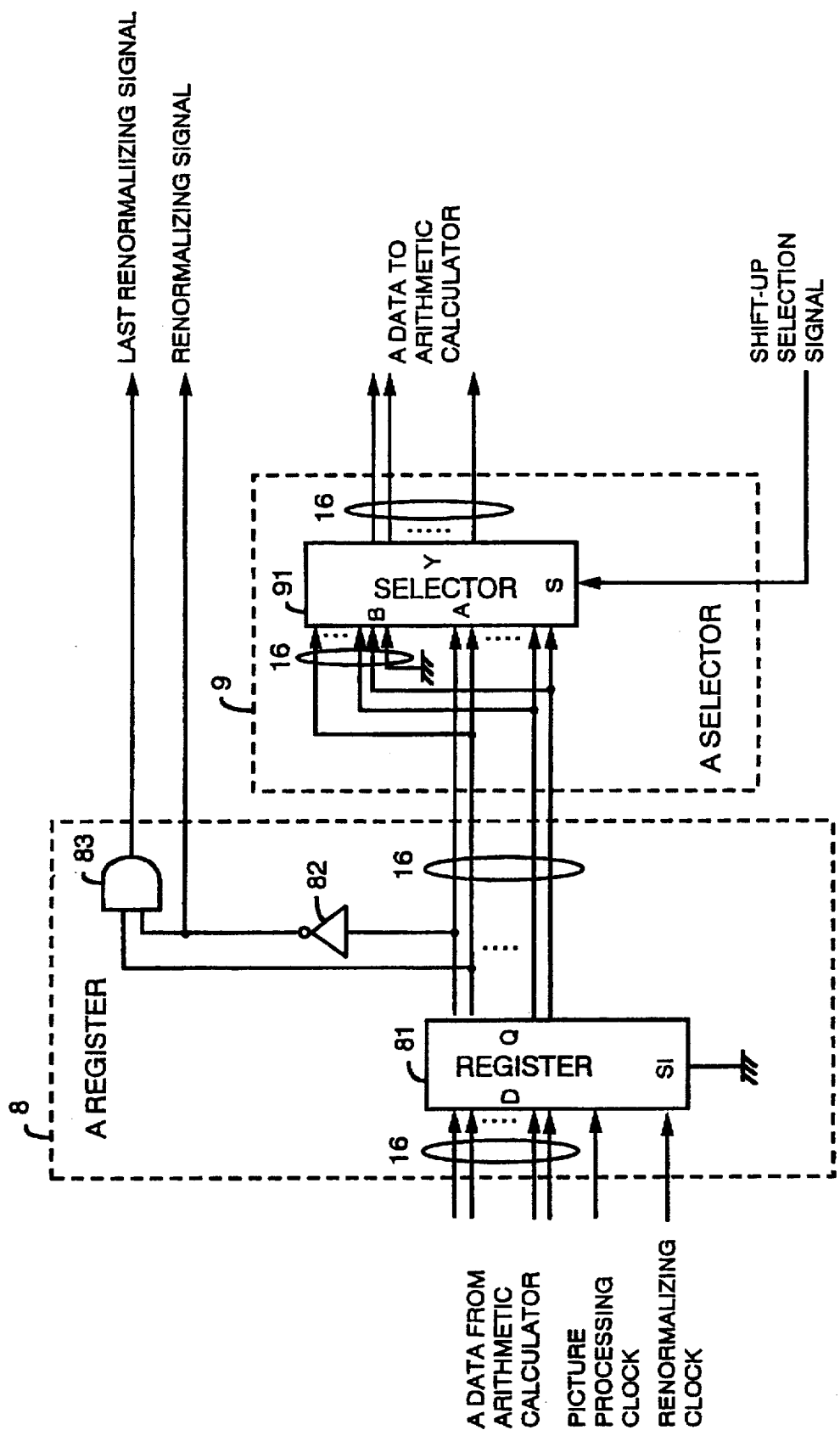
FIG. 7 is a block diagram showing an example of the A register 8 and the A selector 9 in the first–third embodiments of the present invention.

In FIG. 7, an A register portion 81 takes-in the A data from the arithmetic calculator 7 and latches it therein in synchronization with the inputted pixel processing clock signal. The register portion 81 comprises a shift register having 16 latch portions, which contents are all set to "0" in the 16 latch portions at its initial state. In synchronization with the inputted renormalizing clock signal, the register portion 81 shifts-up the data latched by one bit, and latches them again, and outputs them as the A data. If the A data comprises 16 bits, for example, the shift register can perform the data writing (data renewal) for every bit in synchronization with the pixel processing clock signal. Then, the shift register shifts-up the contents by one bit in synchronization with a renormalizing clock signal. In other words, the least significant bit is connected to the earth electric potential node and stores "0", while the contents in the remaining bits are renewed to the latch contents of the immediately preceding stage.

A renormalization generator 82 in FIG. 8 receives a most significant bit signal (hereinafter, referred to as MSB signal) of the A data which is outputted from the register portion 81. Based on the received MSB signal, the renormalization generator 82 outputs a renormalizing signal, indicating "prosecuting a normalization processing", when the size of the current coding interval becomes less than 50%, namely, the A data becomes less than 0.5 in decimal number. The renormalization generator 82 comprises an inverter circuit which outputs "1", for example, indicating "prosecuting a normalization processing", if the MSB signal is "0".

A last renormalization generator 83 in FIG. 8 receives a signal (hereinafter, referred to as the MSB-1 signal) which is placed one bit lower from the most significant bit of the A data outputted from the register portion 81 and a renormalizing signal from the renormalization generator 82. When the renormalizing signal from the renormalization generator 82 indicates "prosecuting a normalization processing", and the MSB-1 signal is "1", for example, the last renormalization generator 83 outputs a last renormalizing signal. The last renormalization generator 83 comprises an AND circuit. When the MSB signal is "0" and the MSB-1 signal is "1", the AND circuit outputs "1" which indicates "the normalization processing will be completed by one more normalization processing".

Referring back to FIG. 1, an A selector, 9 receives the A data from the A register 8 and a shift-up selection signal generated based on the last renormalizing signal. When the shift-up selection signal indicates "shift-up", the A selector 9 outputs a data which is shifted-up by one bit from the A register 8 to the arithmetic calculator 7 as an A data which shows the size of the current coding interval of the pixels immediately preceding the target coding pixel (an immediately preceding A data). Otherwise, the A selector 9 outputs the A data from the A register 8 as it is to the arithmetic calculator 7. The A selector 9, for example, as shown in FIG. 7, comprises a selector 91. The selector 91 has one input terminal A where the A data is received directly from the A register 8, and the other input terminal B where the A data from the A register 8 is received after the contents of the A data are shifted-up by one bit to the MSB side and its least significant bit is connected to an earth electric potential node. The selector 91 selects either one of the input terminal A and the input terminal B according to the shift-up selection signal, and outputs it to the output terminal Y.

A C register 10 in FIG. 1 receives a C data from the arithmetic calculator 7, the pixel processing clock signal and a renormalizing clock signal. In synchronization with the inputted pixel processing clock signal, the C register receives the C data from the arithmetic calculator 7 and latches them. In synchronization with the inputted renormalizing clock signal, the C register shifts-up the latched data by one bit and latches them again, and outputs them as a C data.

Figure 8:
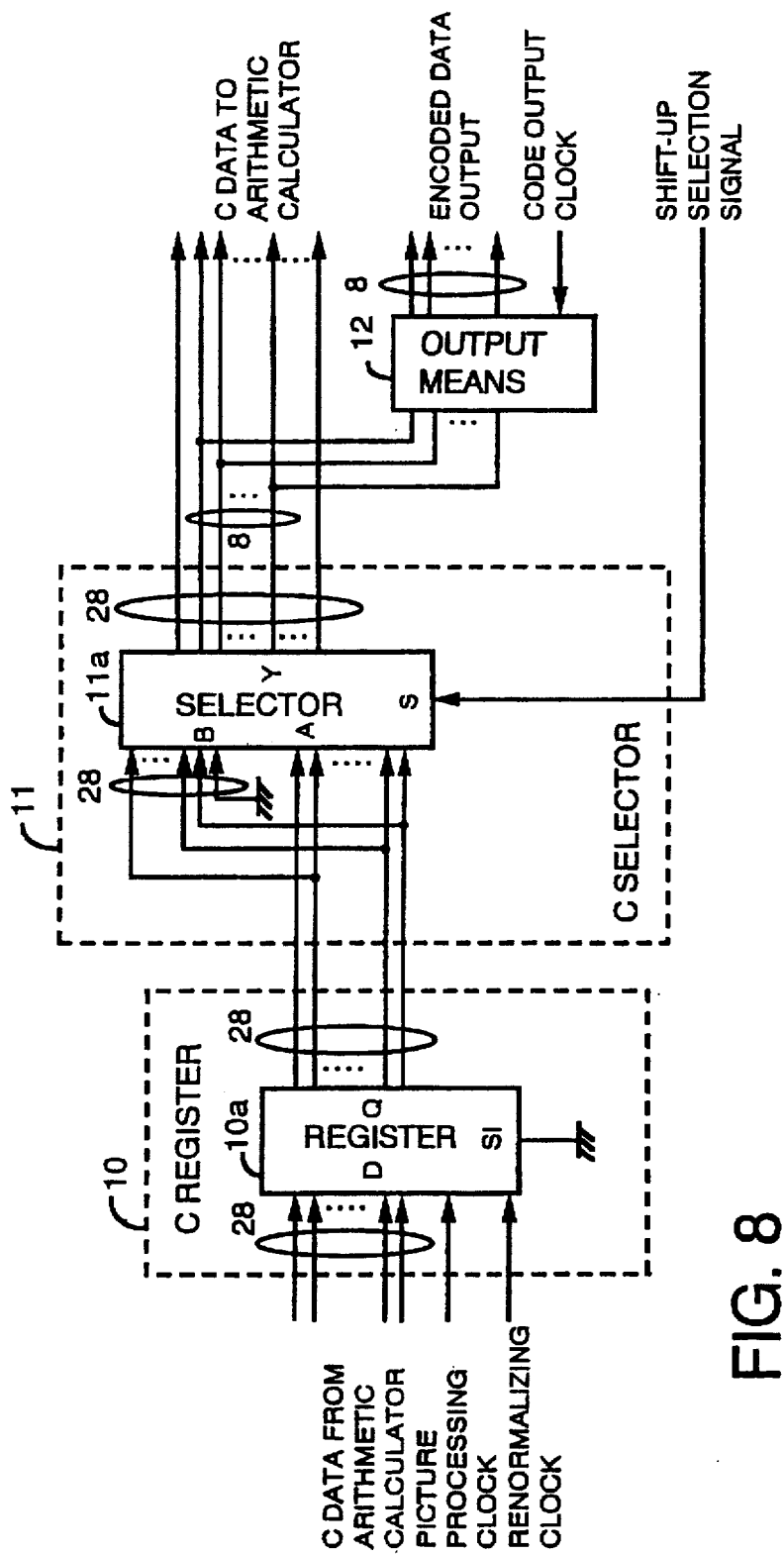
FIG. 8 is a block diagram showing an example of the C register 10 and the C selector 11 in the first–third embodiments of the present invention.

As shown in FIG. 8, the C register 10 takes-in the C data from the arithmetic calculator 7 and latches in synchronization with the inputted pixel processing clock signal, then shifts-up the latched data by one bit and latches it again in synchronization with the inputted renormalizing clock signal, and then outputs it as a C data. The C register 10 comprises shift registers 10a which comprise twenty eight latch portions, if the C data comprises twenty eight bits, for example. The shift register 10a performs data writing (data renewal) in synchronization with the pixel processing clock signal and shifts-up the contents by one bit in synchronization with a renormalizing clock signal. In other words, the least significant bit is connected to the earth electric potential node and stores "0", while the contents of the remaining bits are rewritten to the contents of the latch of the preceding bit. At an initial state, the stored contents in all the twenty eight latch portions are set "0", for example.

A C selector 11 receives the C data from the C register 10 and the shift-up selection signal. The C selector 11 outputs a data which is shifted-up by one bit from the C data, when the shift-up selection signal indicates "shift-up", and outputs a data as it is when the shift-up selection signal does not indicate "shift-up", to the arithmetic calculator 7 as a C data indicating the trailing bits of the code stream for the pixel immediately preceding target coding pixel (an immediately preceding C data), and also as an encoded data for transmitting a predetermined number of significant bits.

The C selector 11, for example, as shown in FIG. 8, comprises a selector 11a. The selector 11a has one input terminal A where the C data is received directly from the C register 10, and the other input terminal B where the C data from the C register 10 is received after the contents of the C data are shifted-up by one bit to the MSB side and its least significant bit is connected to an earth electric potential node. The selector 11a selects either one of the input terminal A and the input terminal B according to the shift-up selection signal, and outputs it to the output terminal Y.

An output means 12 in FIG. 1 receives a predetermined number of most significant bits in the encoded data form the C selector 11 and a code output clock signal. In synchronization with the inputted code output clock signal, the output means 12 takes-in the predetermined number of significant bits in the encoded data form the C selector 11 and outputs the contents taken therein in synchronization with the inputted code output clock signal as an encoded data for transmission. For example, as shown in FIG. 8, the output means 12 has eight latch portions for taking-in eight significant bits of the C data as an encoded data if the C data comprises twenty eight bits.

A control portion 13 in FIG. 1 receives a system clock signal, an identical context signal from the context comparator 6, a renormalizing signal and a last renormalizing signal from the A register 8. The control portion 13 then outputs a pixel processing clock signal to the context generator 2, the context storage device 3, the A register 8 and the C register 10. The control portion 13 further outputs a renewal clock signal to the context table storage device 4 and a renormalizing clock signal to the A register 8 and the C register 10. The control portion 13 further outputs a shift-up selection signal to the A selector 9 and the C selector 11 and a code output clock signal to the output means 12.

The pixel processing clock signal from the control portion 13 is a signal showing a timing for processing the data for the target coding pixel. The pixel processing clock signal is generated by the control portion 13 according to a system clock signal, a renormalizing signal, a last renormalizing signal and an identical context signal and synchronizes with a system clock signal. More specifically, the pixel processing clock signal from the control portion 13 maintains either one of the levels, when the renormalizing signal indicates "prosecute a normalization processing", and the last renormalizing signal does not indicate "normalization will be completed by the last one processing". The pixel processing clock signal from the control portion 13 also maintains either one of the levels, when the renormalizing signal indicates "prosecute a normalization processing", the last renormalizing signal indicates "normalization will be completed by the last one processing", and the identical context signal indicates "identical context". Otherwise, the pixel processing clock signal from the control portion 13 becomes the same signal as the system clock signal.

For example, as shown in FIG. 11B, when the renormalizing signal (FIG. 11E) is "1" indicating "prosecute a normalization processing", and the last renormalizing signal (FIG. 11F) is "0", not indicating "normalization will be completed by the last one processing", (where "1" indicates "H" level and "0" indicates "L" level in this first embodiment in the below, except some specific cases), the pixel processing clock signal from the control portion 13 becomes "H" level regardless of the system clock. When the renormalizing signal is "1" indicating "prosecute a normalization processing", the last renormalizing signal is "1" indicating "normalization will be completed by the last one processing", and the identical context signal (FIG. 11D) is "1" indicating "identical context", the pixel processing clock signal from the control portion 13 becomes "H" level regardless of the system clock. Otherwise, the pixel processing clock signal from the control portion 13 becomes the same signal as the system clock signal.

The renormalizing signal shown in FIG. 11E is generated from the renormalizing signal from the A register 8 in synchronization with the system clock signal. It may be generated in the control portion 13. For example, based on the renormalizing signal from the A register 8, the renormalizing signal of FIG. 11E is generated so that it synchronizes with the rising edge of the system clock. In other words, the renormalizing signal of FIG. 11E is generated in order to decide whether the target coding pixel is normalized or not at the subsequent timing of the system clock used when the context generator 2 takes-in a context for the target coding pixel.

Similarly, the last renormalzing signal shown in FIG. 11F is generated from the last renormalizing signal from the A register 8 in synchronization with the system clock signal. It may be generated in the control portion 13. For example, based on the last renormalizing signal from the A register 8, the last renormalizing signal of FIG. 11F is generated so that it synchronizes with the rising edge of the system clock. In other words, the last renormalizing signal of FIG. 11F is generated in order to specify the last normalizing signal at the subsequent timing of the system clock used when the context generator 2 takes-in a context for the target coding pixel.

The shift-up selection signal from the control portion 13 is generated in the control portion 13 according to the last renormalizing signal from the A register 8, the system clock signal and the identical context signal and synchronizes with the system clock signal. More specifically, when the last renormalizing signal shown in FIG. 11F synchronized with the system clock signal indicates "normalization will be completed by the last one processing", and the identical context signal does not indicates "identical context", the shift-up selection signal indicates a "shift-up" state. Otherwise, the shift-up selection signal does not indicates the "shift-up" state.

Figure 11:
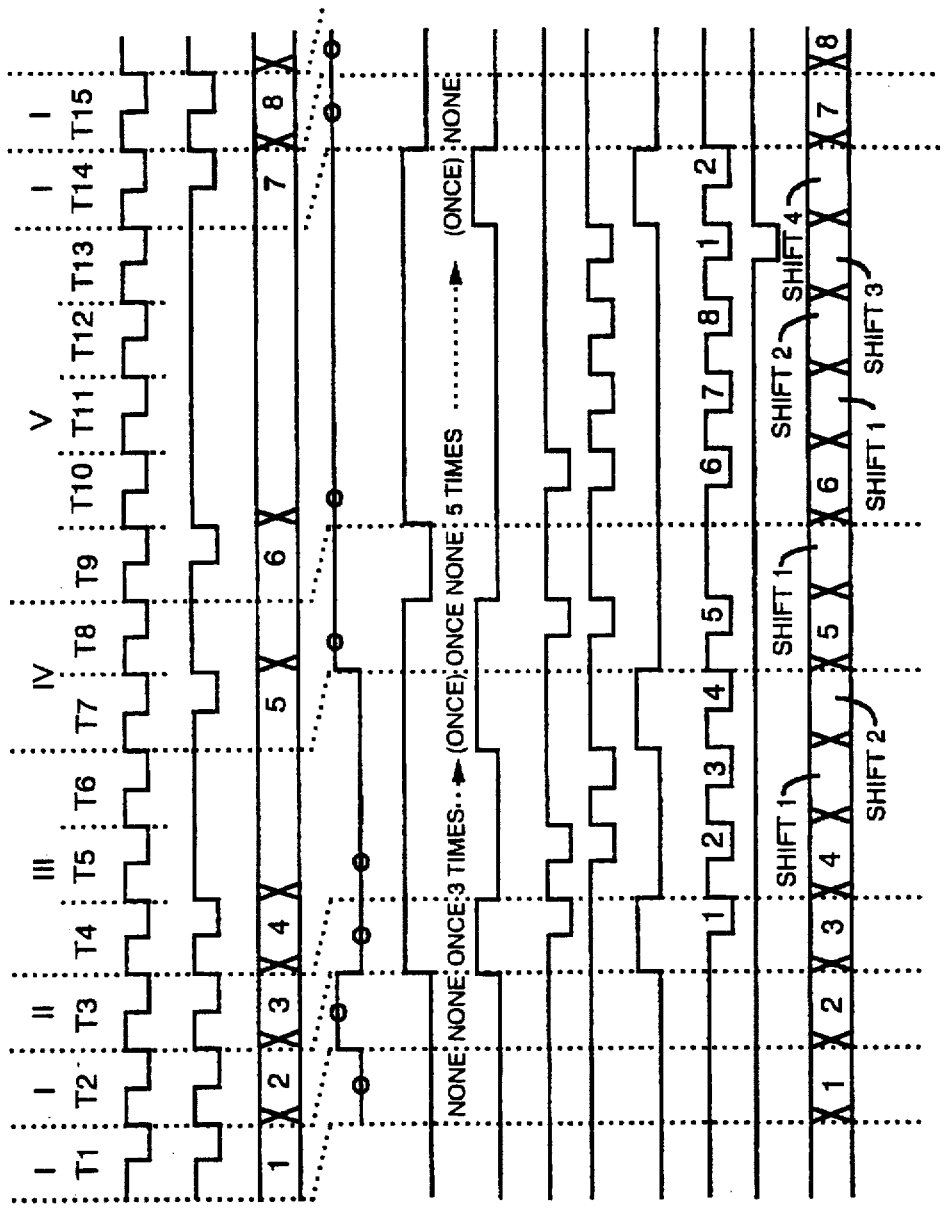
FIGS. 11A–11C are diagrams showing signal waveforms at the main portion in the first–third embodiments of the present invention.

For example, as shown in FIG. 11 I, when the last renormalizing signal shown in FIG. 11F is "1", indicating "normalization will be completed by the last one processing", and the identical context signal shown in FIG. 11D is "0" which does not indicates "identical context", the shift-up selection signal becomes "1" indicating a "shift-up" state. Otherwise, the shift-up selection signal becomes "0" which does not indicates the "shift-up" state.

The renewal clock signal from the control portion 13 is a signal showing a timing signal for renewing a storing data stored in the context table storage device 4. The renewal clock signal from the control portion 13 is generated in the control portion 13 according to a system clock signal, a pixel processing clock signal and a renormalizing signal. More specifically, the renewal clock signal synchronizes with a system clock signal, and becomes the system clock signal when the renormalizing signal indicates "prosecute a normalization processing" in the next cycle of the system clock signal after the appearance of the pixel processing clock signal. Otherwise, the renewal clock signal maintains either one of the levels.

For example, as shown in FIG. 11G, when the rising of the pixel processing clock signal is detected and the renormalizing signal shown in FIG. 11E is "1" indicating "prosecute a normalization processing" at the rising of the system clock signal after the rising of the pixel processing clock signal is detected, the renewal clock signal becomes the same clock as that of the system clock. Otherwise, the renewal clock maintains "H" level, for example, regardless of the system clock.

The renormalizing clock signal, shown in FIG. 11H, from the control portion 13 is a signal for shifting up the contents stored in the register portion 81 of the A register 8 and the C register 10. The renormalizing clock signal from the control portion 13 is generated in the control portion 13 according to a renormalizing signal and a last renormalizing signal from the A register 8, a system clock signal and an identical context signal and synchronizes with the system clock signal.

More specifically, when the renormalizing signal indicates "prosecute a normalization processing", and the last renormalizing signal does not indicate "normalization will be completed by the last one processing", the renormalizing clock signal becomes the same clock as the system clock signal ("set"). When the renormalizing signal indicates "prosecute a normalization processing", the last renormalizing signal indicates "normalization will be completed by the last one processing", and the identical context signal indicates "identical context", the renormalizing clock signal becomes the same clock as the system clock signal ("set"). Otherwise, the renormalizing clock signal becomes in a clock halt state (maintaining either one of the levels or "reset").

When the pixel processing clock signal outputs a clock synchronized with the system clock signal, the renormalizing clock signal maintains either one of the levels, and when the pixel processing clock signal maintains either one of the levels, the renormalizing clock signal outputs a clock synchronized with the system clock signal.

The code output clock signal in (FIG. 11K) from the control portion 13 shows a timing signal for taking-in the contents stored in the C register 10 to the output means 12 via the C selector 11, and for outputting it as an encoded data for transmission. The code output clock signal is generated in the control portion 13 according to a renormalizing signal from the A register 8 and a system clock signal. More specifically, when the renormalizing signal indicates "prosecute a normalization processing", the code output clock signal becomes the same clock signal as the system clock signal. Otherwise, the code output clock signal becomes a pulse, when a predetermined number of clocks of the CT count clock signal is counted, according to a CT count clock signal maintaining either one of the levels (FIG. 11J).

For example, as shown in FIG. 11K, when the renormalizing signal is "1" indicating "prosecute a normalization processing", the code output clock signal firstly generates a count clock signal (for example, FIG. 11J) which becomes a system clock signal. When the number of the clocks of this count clock signal reaches eight, the code output clock signal becomes "L" level, for example, at the next cycle of the system clock signal.

A data storage device 14 in FIG. 1 comprises a LATCH circuit for temporarily storing a storing data (a prediction symbol MPS and LSZ data) from the context table storage device 4 in synchronization with the pixel processing clock signal from the control portion 13, and outputting the stored storing data in synchronization with the next pixel processing clock signal. The data storage device 14 sets the timing to write in a renewal data to the context table storage device 4.

An LSZ renewal logic circuit (LSZ renewal means) 15 receives an LSZ data of a storing data from the data storage device 14, a prediction conversion signal LPS from the arithmetic calculator 7 to output an LSZUP data indicating a mismatching probability of the renewal data for the context table storage device 4, and a SWITCH data instructing whether or not to invert a prediction symbol MPS of the storing data from the context table storage device 4. FIG. 9 is a truth table showing the relationship between an input (LSZ data and a prediction conversion signal LPS) and an output (LSZUP data and SWITCH signal) in the LSZ renewal logic circuit. The LSZ renewal logic circuit comprises a logic circuit of P channel MOS transistors and N channel MOS transistors, for example.

The truth table shown in FIG. 9 is based on the probability estimation table of the JBIG international standard. The truth table has 226 (113×2) combinations of the input/output relationship, because there are 113 combinations of the LSZ data to be inputted, and two combinations of the probability symbol MPS.

Referring to FIG. 9, numbers 0~112 in the No. column correspond to the respective status numbers ST 0~112, i.e. the probability estimation index, when the prediction conversion signal LPS is "0" (prediction matching), and numbers 113~225 in the No. column correspond to the respective status numbers ST 0~112, i.e. the probability estimation index, when the prediction conversion signal LPS is "1" (prediction mismatching). In FIG. 9, all the numbers 0~225 are shown in decimal system.

The LPS column indicates the prediction conversion signal LPS, wherein the number "0" indicates "prediction matching" for 0~112, and the number "1" indicates "prediction mismatching" for 113~225.

The LSZ column indicates the LSZ data (shown in hexadecimal) wherein the numbers 0~112 correspond to the respective status numbers ST 0~112 in the probability estimation table, the numbers 113~225 further correspond to the respective status numbers ST 0~112 in the probability estimation table. In this first embodiment, the LSZ data comprises 15 bits except the most significant bit.

The LSZUP column indicates the LSZUP data, wherein the numbers 0~112 correspond to the value of the LSZ data, having the value of the NMPS data corresponding to the respective status numbers ST 0~112, and the numbers 113~225 correspond to the value of the LSZ data, having the value of the NLPS data corresponding to the respective status numbers ST 0~112. In this first embodiment, the LSZ data comprises 15 bits except the most significant bit.

The SWITCH column indicates the switch data for the respective numbers 0~225, wherein the SWITCH data is "0" for all numbers 0~112, because the prediction conversion signal LPS indicates "prediction matching" and the prediction symbol MPS does not have to be inverted. On the other hand, the SWITCH data for the respective numbers 113~225 are the SWITCH data corresponding to the respective status numbers 0~112 for the numbers 113~225 in the probability estimation table. In this first embodiment, the SWITCH data comprises 1 bit.

An MPS renewal logic circuit (MPS renewal means) 16 in FIG. 1 receives a SWITCH data from the LSZ renewal logic circuit 15 and a prediction symbol of the storing data from the data storage device 14. The MPS renewal logic circuit 16, comprising an exclusive OR circuit, for example, and outputs the value of the received prediction symbol MPS as it is when the received SWITCH data is "0", and outputs the inverted value of the received prediction symbol MPS when the received SWITCH data is "1", as a prediction symbol MPSUP of the renewal data for the context table storage device 4.

The data storage device 14, the LSZ renewal logic circuit 15, and the MPS renewal logic circuit 16 constitute a renewal data generating means. The renewal data generating means receives a storing data read out from the context table storage device 4 and a prediction conversion signal LPS from the arithmetic calculator 7, and outputs a 16-bit renewal data to the context table storage device 4. The 16-bit renewal data comprises 1-bit prediction symbol MPS (MPSUP) and LSZ (LSZUP) data of 15 bits, for example, which is included in a probability estimating data and indicates a mismatching probability.

A kernel portion comprises the arithmetic calculator 7, the A register 8, the A selector 9, the C register 10, the C selector 11 and the renewal data generating means which comprises the data storage device 14, the LSZ renewal logic circuit 15 and the MPS renewal logic circuit 16.

An operation of a digital signal encoding device constructed in the manner explained above is explained below. The operating mode of the above digital signal encoding device is divided into 5 modes I–V, as shown in FIG. 10. The operation in each mode is explained below using the waveforms shown in FIG. 11A–FIG. 11L.

In mode I, there is no renormalization, i.e. normalization processing is not required in which the A data for target coding pixel indicates larger than 0.5 of decimal number.

In mode II, a renormalization is performed, i.e. a normalization processing is required in which the A data for the target coding pixel indicates value less than 0.5 in decimal number, the context for the target coding pixel does not match with the context for the pixel which is immediately subsequent to the target coding pixel, and renormalization is carried out once.

In mode III, a renormalization is performed, the context for the target coding pixel does not match with the context for a pixel which is immediately subsequent to the target coding pixel, and renormalization is carried out more than once.

In the mode IV, a renormalization is performed, the context for the target coding pixel matches with the context for a pixel which immediately subsequent to the target coding pixel, and renormalization is carried out once.

In the mode V, a renormalization is performed, the context for the target coding pixel matches with the context for a pixel which immediately subsequent to the target coding pixel, and renormalization is carried out more than once.

[Mode I]

FIG. 11A shows periods $T_1$ and $T_2$ of the system clock signal which are examples of major signal waveforms in the mode I. In the period $T_1$, a context for the target coding pixel is not identical with the context for a pixel which is immediately subsequent to the target coding pixel. In the period $T_2$, a context for the target coding pixel is identical with the context for a pixel which is immediately subsequent to the target coding pixel.

First, it is assumed that an encoding processing has been done for the first target coding pixel during the period $T_1$ in the mode I. In the period $T_i$, a pixel processing clock signal is raised by the rise of the system clock. Receiving the rise of the pixel processing clock signal, the context generator 2 reads a context for the first target coding pixel from the storage device 1 and outputs the read context to the read address input nodes AR of the context table storage device 4. The code 1 in FIG. 11C indicates that a context has been generated by the context generator 2 for the first target coding pixel.

In the context table storage device 4, a 16-bit storing data (prediction symbol MPS and LSZ data) is read out according to the context inputted into the read address input nodes AR, and outputted from the data output nodes DO to the arithmetic calculator 7.

In the prediction conversion signal generator 71 in the arithmetic calculator 7 (ref. FIG. 6), a prediction symbol MPS of the storing data and a picture data of the first target coding pixel are compared to generate a prediction conversion signal LPS. The prediction conversion signal LPS is outputted to the LSZ renewal logic circuit 15.

In arithmetic calculator 7, when this prediction conversion signal LPS indicates that the prediction symbol MPS matches with the picture data (indicates the MPS), the calculator 72 calculates an A data from an LSZ data of the storing data and the A data of the target coding pixels which precedes the first target coding pixels, according to the above-mentioned equation (1). The calculated A data is outputted to the A register 8. The C data of the target coding pixels which precedes the first target coding pixels is outputted to the C register 10, according to the above-mentioned equation (2).

When this prediction conversion signal LPS indicates that the prediction symbol MPS does not match with the picture data (indicates the LPS), the calculator 72 outputs the LSZ data of the storing data to the A register 8 as an A data, according to the above-mentioned equation (3). The calculator 72 further calculates a C data from the LSZ data of the storing data and both A and C data of the target coding pixels which precede the first target coding pixels, according to the above-mentioned equation (4). The calculated C data is outputted to the C register 10.

Figure 12:
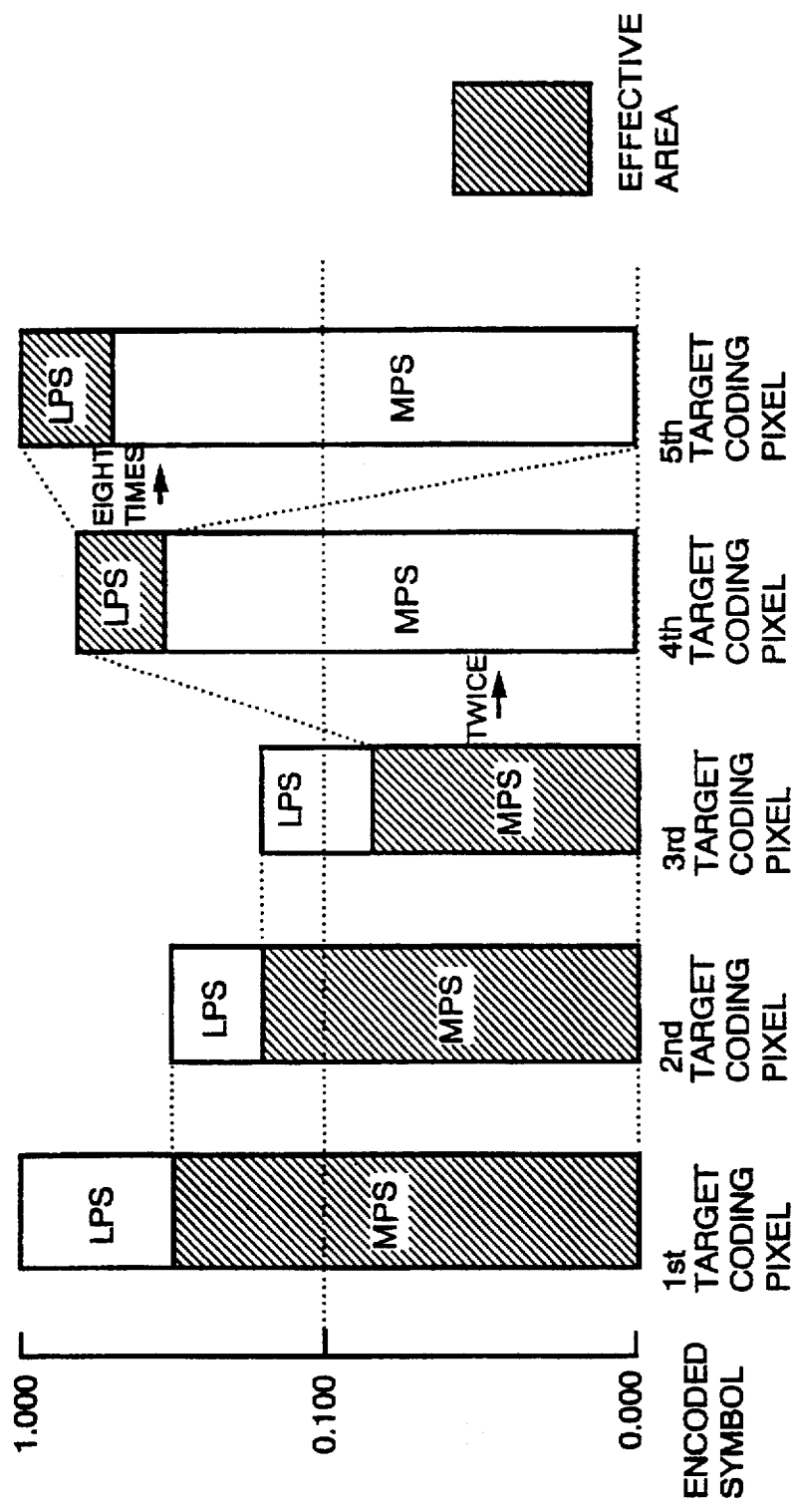
FIG. 12 is a diagram showing the concept of the A data and the C data in the first embodiment of the present invention.

A concept of the A data and the C data at this stage is explained using the bar graph for the first target coding pixel shown in FIG. 12. The bar graph for this first target coding pixel shows a case that a picture data matches with a prediction symbol MPS. The contents stored in the A register 8 is assumed to be 1.000 ..., and that of the C register 10 is assumed to be 0.000 ... at an initial state. The size of the LPS for the first target coding pixel corresponds to the value of the LSZ data of the storing data for the first target coding pixel. The size of the MPS for the first target coding pixel corresponds to the value calculated by subtracting the size of the LPS from the contents stored in the A register 8. That is, the size of the MPS corresponds to the size of the current coding interval for the first target coding pixel.

In other words, the A data calculated and outputted by the calculator 72 in the arithmetic calculator 7 has a value corresponding to the size of the MPS for the first target coding pixel shown in FIG. 12. The C data calculated and outputted by the calculator 72 in the arithmetic calculator 7 has a value corresponding to the bottom of the current coding interval, namely, a value corresponding to the bottom of the MPS for the first target coding pixel shown in FIG. 12.

The A data and the C data calculated by the calculator 72 in this way are inputted to the register portion 81 of the A register 8 (ref. FIG. 7) and to the C register 10 (ref. FIG. 8), respectively, and stored (renewal of the stored contents)

therein at the rising edge of a pixel processing clock signal from the control portion 13 (at period $T_2$).

The A data which is stored in the register portion 81 of the A register 8 at this stage has a value larger than 0.5 in decimal number. Accordingly, the value of the most significant bit is "1", and a renormalizing signal "0" indicating "not-prosecute a normalization processing" is outputted from renormalization generator 82 in the A register 8. The last renormalization generator 83 in the A register 8 then outputs a last renormalizing signal "0".

On the other hand, receiving a context of the second pixel from the context generator 2 and a context of the first target coding pixel from the context storage device 3, the context comparator 6 outputs an "L" level identical context signal indicating that "the contexts do not match with each other" during the period $T_2$ as shown in FIG. 11D.

Accordingly, during this period $T_2$, the mode is recognized. Here, it is recognized that no renormalization is performed, and the contexts do not match with each other and the mode I in the period $T_1$ has been completed for the period $T_1$.

Since recognizing the renormalization is not required in the mode I in the period $T_1$ during the period $T_2$, operations from a context generation to the arithmetic calculation are carried out during the mode I in the next period of $T_2$.

Accordingly, receiving a renormalizing signal from the renormalization generator 82 of the A register 8, the control portion 13 outputs a renewal clock signal and a renormalizing clock signal both having "H" level, in the period $T_2$ as shown in FIG. 11G and H, respectively, because the received renormalizing signal is at "L" level. Receiving an "H" level renewal clock signal, the context table storage device 4 keeps its stored contents without renewal. Receiving an "H" level renormalizing clock signal, the register portion 81 of the A register 8 and the C register 10 does not shift-up the contents stored therein, and keep latching the received contents. The code 1 in FIG. 11L indicates that the first target coding pixels are latched to the A register 8 and the C register 10.

Since the control portion 13 maintains the renormalizing clock signal to "H" level, the CT count clock signal is maintained to "H" level too. The code output clock signal from the control portion 13 therefore, remains at "H" level. Since the code output clock signal from the control portion 13 maintains "H" level, the output means 12 neither takes-in nor outputs the contents stored in the C register 10.

Accordingly, in the mode I in this period $T_1$, it takes only one clock (a cycle) of the system clock to carry out the procedures from a context generation to the arithmetic calculation for the target coding pixel. The A data and the C data calculated by the arithmetic calculator 7 are stored in the A register 8 and the C register 10, respectively and the storing data in the context table storage device 4 are not renewed.

As a result, substantial operating time in the period $T_1$ in the mode I takes no more than one system clock. Moreover, the substantial time required for the one clock equals to the sum of the accessing time of the context table storage device 4 and the accessing time of the arithmetic calculator 7. Since the cycle of the system clock is shortened, this speeds up the processing.

In the mode I during the period $T_1$, the renewal clock signal outputted from the control portion 13 maintains "H" level. Accordingly, the context table storage device 4, given by an "H" level renewal clock signal, does not have the renewed content by means of the LSZUP data from the LSZ renewal logic circuit 15 and the prediction symbol MPSUP from the MPS renewal logic circuit 16.

The respective operations of the data storage device 14, the LSZ renewal logic circuit 15, and the MPS renewal logic circuit 16 are explained below. The contents in the context table storage device 4 are not renewed by means of the LPZUP data and the prediction symbol MPSUP, outputted from the LSZ renewal logic circuit 15 and the MPS renewal logic circuit 16, respectively.

The data storage device 14 temporarily stores the storing data for the first target coding pixel on the fall of the pixel processing clock signal during the period $T_1$. The LSZ data of the temporarily stored storing data is outputted to the LSZ renewal logic circuit 15, and the MPS symbol of that storing data is outputted to the MPS renewal logic circuit 16, on the rise of the pixel processing clock signal during the period $T_2$.

The LSZ renewal logic circuit 15 receives the prediction conversion signal LPS calculated during the period $T_1$ from the prediction conversion signal generator 71 in the arithmetic calculator 7, and the LSZ data of the storing data for the first target coding pixel from the data storage device 14. After the rise of the pixel processing clock signal during the period $T_2$, the LSZ renewal logic circuit 15 outputs the LSZUP data for the first target coding pixel to the context table storage device 4, based on the truth table shown in FIG. 9, and the SWITCH data for the first target coding pixel to the MPS renewal logic circuit 16.

After the rise of the pixel processing clock signal during the period $T_2$, the MPS renewal logic circuit 16 receives the SWITCH data for the first target coding pixel from the LSZ renewal logic circuit 15, and the prediction symbol of the storing data for the first target coding pixel from the data storage device 14, and outputs the prediction symbol MPSUP for the first target coding pixel to the context table storage device 4.

An operation in the mode I in the period $T_2$ is explained below. It is assumed that the encoding processing has been completed for the second target coding pixel in the mode I in the period $T_2$. The mode I in the period $T_2$ is different from the mode I in the period $T_1$ mentioned above only in that the context for the target coding pixel does not match or match with the context for the subsequent target coding pixel.

Accordingly, the operation of the mode I in the period $T_2$ is the same as that of the mode I in the period $T_1$. It takes only one clock (cycle) of the system clock to carry out the context generation by the context generator 2 to the arithmetic calculation by the arithmetic calculator 7 for the second target coding pixel. The A data and the C data calculated by the arithmetic calculator 7 are stored in the A register 8 and the C register 10, respectively. The storing data in the context table storage device 4 are not renewed. The output means 12 neither takes-in nor outputs the contents stored in the C register 10.

As a result, the substantial operation is carried out only within one system clock in the mode I in the period $T_2$. Moreover, the substantial time required for the one clock equals to the sum of the accessing tine of the context table storage device 4 and the accessing time of the arithmetic calculator 7. Since the cycle of the system clock is shortened, this speeds up the processing.

A concept of the A data and the C data at this stage is explained using the bar graph for the second target coding pixel shown in FIG. 12. The bar graph for this second target coding pixel indicates a case where a picture data matches with a prediction symbol MPS. The contents stored in the A register 8 for the first target coding pixel corresponds to the size of the current coding interval of the MPS which is the same MPS as explained in the mode I in the period $T_1$. The contents stored in the C register 10 for the first target coding pixel has the value corresponding to the bottom of the MPS which is the same MPS as that explained in the mode I in the period $T_1$.

The size of the LPS for the second target coding pixel corresponds to the value of the LSZ data of the storing data for the second target coding pixel. The size of the MPS for the second target coding pixel corresponds to the value 2 which is subtracted by the size of the LPS from the contents stored in the A register 8. The size of the MPS corresponds to the size of the current coding interval for the second target coding pixel.

In other words, the A data for the second target coding pixel which is calculated and outputted by the calculator 72 in the arithmetic calculator 7 has a value corresponding to the size of the MPS for the second target coding pixel shown in FIG. 12. The C data for the second target coding pixel which is calculated and outputted by the calculator 72 in the arithmetic calculator 7 has a value corresponding to the bottom of the current coding interval, namely, the bottom of the MPS for the third target coding pixel in FIG. 12.

In the same manner as the recognition of the mode I in the period $T_1$, the mode I in the period $T_2$ is also recognized during the period $T_3$, namely, the subsequent clock in which the context generation is performed. By recognizing that no renormalization is performed and the contexts match with each other, the operation is performed from the context generation to the arithmetic calculation in the next mode, namely, the mode II in the period $T_3$.

[mode II]

FIG. 11A shows period $T_3$ of the system clock signal which are examples of major signal waveforms in the mode II. First, it is assumed that an encoding processing has been done for the third target coding pixel during the mode II in the period $T_3$.

In the period $T_3$, a pixel processing clock signal is raised by the rise of the system clock. Receiving the rise of the pixel processing clock signal, the context generator 2 reads a context for the third target coding pixel from the storage device 1 and outputs the read context to the read address input nodes AR of the context table storage device 4. The code 3 in FIG. 11C indicates that a context has been generated by the context generator 2 for the third target coding pixel.

In the context table storage device 4, a 16-bit storing data (a prediction symbol and LSZ data) is read out according to the context inputted into the read address input nodes AR, and outputted from the data output nodes DO to the arithmetic calculator 7.

The arithmetic calculator 7 (ref. FIG. 6) compares the prediction symbol MPS of the storing data and the picture data of the first target coding pixel by means of the prediction conversion signal generator 71 to generate a prediction conversion signal LPS and output it to the LSZ renewal logic circuit 15.

In the arithmetic calculator 7, when this prediction conversion signal LPS generated in the prediction conversion signal generator 71 indicates that the prediction symbol MPS matches with the picture data (indicates the MPS), the calculator 72 calculates an A data from an LSZ data form the context table storage device 4 and the A data of the second target coding pixels, according to the above-mentioned equation (1). The calculated A data is outputted to the A register 8. The C data of the second target coding pixels is outputted to the C register 10, according to the above-mentioned equation (2).

When this prediction conversion signal LPS indicates that the prediction symbol MPS does not match with the picture data (indicates the LPS), the calculator 72 outputs the LSZ data form the context table storage device 4 to the A register 8 as an A data, according to the above-mentioned equation (3). The calculator 72 further calculates a C data from the LSZ data form the context table storage device 4 and both A and C data of the second target coding pixels, according to the above-mentioned equation (4). The calculated C data is outputted to the C register 10.

A concept of the A data and the C data at this stage is explained using the bar graph for the third target coding pixel shown in FIG. 12. The bar graph for the third target coding pixel indicates that a picture data matches with a prediction symbol MPS. The contents stored in the A register 8 for the second target coding pixel corresponds to the size of the current coding interval of the MPS which is the same MPS as that explained in the mode I in the period $T_2$. The contents stored in the C register 10 for the second target coding pixel has a value corresponding to the bottom of the MPS which is the same MPS as that explained in the mode I in the period $T_2$.

The size of the LPS for the third target coding pixel corresponds to the value of LSZ data of the storing data for the third target coding pixel. The size of the MPS for the third target coding pixel corresponds to the value calculated by subtracting the size of the LPS from the contents stored in the A register 8 and is the size of the current coding interval for the third target coding pixel.

In other words, the A data calculated and outputted by the calculator 72 in the arithmetic calculator 7 has a value corresponding to the size of the MPS for the third target coding pixel. The C data calculated and outputted by the calculator 72 in the arithmetic calculator 7 has a value corresponding to the bottom of the current coding interval, namely, a value corresponding to the bottom of the MPS for the third target coding pixel, shown in FIG. 12.

The A data and the C data calculated by the calculator 72 in the arithmetic calculator 7 in this way are inputted to the register portion 81 of the A register 8 (ref. FIG. 7) and to the C register 10 (ref. FIG. 8), respectively, and stored (renewal of the stored contents) therein at the rising edge of a pixel processing clock signal from the control portion 13 (at period $T_4$).

In the period $T_3$, since a renormalization processing is not required in the mode I in the period $T_2$, a renormalizing signal is "L" level as shown in FIG. 11E, and the renewal clock signal and the renormalizing clock signal outputted from the control portion 13 are "H" level as shown in, FIG. 11G and H, respectively.

Receiving an "H" level renewal clock signal, the context table storage device 4 keeps its stored contents without rewriting. Receiving an "H" level renormalizing clock signal, the register portion 81 of the A register 8 and the C register 10 does not shift-up the contents stored therein, and keep latching the received contents.

During the period T3, since the control portion 13 maintains the renormalizing clock signal to "H" level, the CT count clock signal is maintained to "H" level too. Since the code output clock signal from the control portion 13 remains at "H" level, the output means 12 neither takes-in nor outputs the contents stored in the C register 10.

On the other hand, the A data calculated by the arithmetic calculator 7 and inputted in the register portion 81 of the A register 8 in the period $T_4$ has a value more than 0.25 and less than 0.5 in decimal number. Accordingly, the value of the most significant bit is "0", and the value which is one bit lower from the most significant bit is "1".

Accordingly, the renormalization generator 82 in the A register 8 outputs a renormalizing signal "1" indicating "prosecute a normalization processing", therefore, an "H" level renormalizing signal is obtained at the control portion 13 in the period $T_4$, as shown in FIG. 11E.

The last renormalization generator 83 in the A register 8 outputs a last renormalizing signal "1" indicating "normalization will be completed by the last one processing". An "H" level last renormalizing signal is obtained at the control portion 13 in the period $T_4$, as shown in FIG. 11F.

Receiving a context of the fourth pixel from the context generator 2 and a context of the third target coding pixel from the context storage device 3, the context comparator 6 outputs an "L" level identical context signal indicating that "the contexts do not match with each other" during the period $T_4$ as shown in FIG. 11D.

Accordingly, the mode II is recognized in this period $T_4$ in which the contexts are not identical and one renormalization processing has to be performed.

By this recognition, a renormalization processing is performed in the period $T_4$ shown in FIG. 11A–FIG. 11L. In other words, the storing data in the context table storage device 4 is renewed, and the A data in the A register 8 and the C data in the C register 10 are respectively shifted-up by one bit.

In this first embodiment, the context table storage device 4 comprises a two port RAM, in which the stored contents can be read out and written (renewed) within one clock of the system clock. Also in this first embodiment, when the A selector 9 and the C selector 11 receive the "H" level in the shift-up selection signal, the A selector 9 and the C selector 11 respectively select and output the data obtained by shifting up the A data latched in the A register 8 and the C data latched in the C register 10 by one bit, respectively.

Accordingly in the first embodiment, the renormalization processing can be carried out in the first clock of the system clock in which the encoding processing for the next target coding pixel is performed, in concretely, in the period $T_4$ in the mode III shown in FIG. 11A–FIG. 11L. This renormalization processing will be explained more in detail in the next explanation on the operation of the mode III.

Accordingly, in the mode II, it takes only one clock (a cycle) of the system clock to carry out the procedures from a context generation to the arithmetic calculation for the target coding pixel. The A data and the C data calculated by the arithmetic calculator 7 are stored in the A register 8 and the C register 10, respectively. Moreover, the renormalization processing is performed in the first clock of the system clock in which an encoding processing for the next target coding pixel is performed.

As a result, substantial operation in the mode II is carried out only within one system clock. Moreover, the substantial time required for the one clock equals to the sum of the accessing time of the context table storage device 4 and the accessing time of the arithmetic calculator 7. Since the cycle of the system clock is shortened, this speeds up the processing.

[mode III]

FIG. 11A shows periods $T_4$–$T_6$ of the system clock signal which are examples of major signal waveforms in the mode III (it is assumed that the number of the renormalization processing is three).

First, it is assumed that an encoding processing has been done for the fourth target coding pixel during the period $T_4$ in the mode III. In the period $T_4$, a pixel processing clock signal is raised by the rise of the system clock. Receiving the rise of the pixel processing clock signal, the context generator 2 reads a context for the fourth target coding pixel from the storage device 1 and outputs the read context to the read address input nodes AR of the context table storage device 4.

The code 4 in FIG. 11C indicates that a context has been generated by the context generator 2 for the fourth target coding pixel.

In the context table storage device 4, a 16-bit storing data (a prediction symbol and LSZ data) is read out according to the context inputted into the read address input nodes AR, and outputted from the data output nodes DO to the arithmetic calculator 7.

On the other hand, since one renormalization processing is performed in the above-mentioned mode II, the control portion 13 therefore, receives "1" indicating "prosecute a normalization processing" from the renormalize generator 82 in the A register 8 and "1" indicating "normalization will be completed by the last one processing" from the last renormalization generator 83 in the A register 8, in the period $T_4$ of the first clock of the system clock in the mode III. Accordingly, the control portion 13 obtains a renormalizing signal and a last renormalizing signal, both "H" level, in the period $T_4$, respectively, as shown in FIG. 11E and FIG. 11F. Also the control portion 13 generates a shift-up selection signal which rises in response to the rise of the system clock as shown in FIG. 11I.

When the shift-up selection signal rises, receiving a shift-up selection signal indicating "normalization will be completed by the last one normalization processing", the A selector 9 selects the data obtained by shifting up the A data from the A register 8 by one bit, and also outputs it to the arithmetic calculator 7.

Similarly, receiving the shift-up selection signal, the C selector 11 selects the data obtained by shifting up the C data from the C register 10 by one bit, and outputs it to the arithmetic calculator 7.

In other words, the A data and the C data latched in the A register 8 and the C register 10 respectively are shifted-up by one bit in the mode II in this period $T_4$.

The A data latched in the A register 8 and the C data latched in the C register 10 in this period $T_4$ are resultants calculated in the mode II (at period T3) by the arithmetic calculator 7. In other words, since the renormalizing signal and also the last renormalizing signal become "H" level in the period $T_4$, a renormalizing clock signal becomes "H" level. Therefore, the contents stored in the A register 8 and the C register 10 are not shifted-up and kept unchanged. This state is shown in FIG. 11L. The code 3 in FIG. 11L indicates that the A register 8 and the C register 10 are latched for the third target coding pixel.

In the prediction conversion signal generator 71 in the arithmetic calculator 7 (ref. FIG. 6), compares a prediction symbol MPS of the storing data for the fourth target coding pixel read-out from the context table storage device 4 with a picture data of the fourth target coding pixel, and generates a prediction conversion signal LPS. The generated prediction conversion signal LPS is then outputted.

When this prediction conversion signal LPS indicates that the prediction symbol MPS matches with the picture data (indicates the MPS), the calculator 72 calculates an A data from an LSZ data from the context table storage device 4 and the A data of the third target coding pixels, namely, the data A shifted-up by one bit, according to the above-mentioned equation (1). The calculated A data is outputted to the A register 8. The C data of the third target coding pixels, namely, the C data shifted-up by one bit, is outputted to the C register 10, according to the above-mentioned equation (2).

When this prediction conversion signal LPS indicates that the prediction symbol MPS does not match with the picture data (indicates the LPS), the calculator 72 outputs the LSZ data from the context table storage device 4 to the A register 8 as an A data, according to the above-mentioned equation (3). The calculator 72 further calculates a C data from the LSZ data from the context table storage device 4 and both A and C data of the third target coding pixels, namely, the A data and the C data shifted-up by one bit, respectively, according to the above-mentioned equation (4). The calculated C data is outputted to the C register 10.

A concept of the A data and the C data at this stage is explained using the bar graph for the fourth target coding pixel shown in FIG. 12. The bar graph for this fourth target coding pixel indicates that a picture data does not match with a prediction symbol MPS. The contents stored in the A register 8 for the third target coding pixel corresponds to the size of the current coding interval of the MPS which is the same as that explained in the mode II in the period $T_3$. The contents shifted-up by one bit (twice) corresponds to the substantial size of the current coding interval for the fourth target coding pixel.

The contents stored in the C register 10 for the third target coding pixel has a value corresponding to the bottom of the MPS which is the same as that explained in the mode II in the period $T_3$. The contents shifted-up by one bit corresponds to the substantial size of the current coding interval for the fourth target coding pixel.

The size of the LPS for the fourth target coding pixel corresponds to the value of the LSZ data of the storing data for the fourth target coding pixel. The size of the MPS corresponds to the value calculated by subtracting the size of the LPS from the value which is obtained by shifting up the contents stored in the A register 8 by one bit, and the size of the LPS corresponds to the size of the current coding interval for the fourth target coding pixel.

In other words, the A data calculated and outputted by the calculator 72 has a value corresponding to the size of the LPS for the fourth target coding pixel, and the C data calculated and outputted by the calculator 72 has a value corresponding to the bottom of the current coding interval, namely, a value corresponding to the bottom of the LPS for the fourth target coding pixel.

The A data and the C data calculated by the calculator 72 in this way are inputted to the register portion 81 of the A register 8 (ref. FIG. 7) and to the C register 10 (ref. FIG. 8), respectively, and stored (renewal of the stored contents) therein at the rising edge of a pixel processing clock signal from the control portion 13 (at period $T_5$).

In this period $T_4$, since the mode II requires one renormalization processing, receiving the rise of a pixel processing clock and "1" indicating "prosecute a normalization processing" from the renormalization generator 82 in the A register 8, the control portion 13 which receives the rising edge of the pixel processing clock signal, and outputs a renewal clock signal in synchronization with the system clock as shown in FIG. 11G.

Receiving the fall of the renewal clock signal, the context table storage device 4 writes and stores a renewal data (a prediction symbol MPSUP and LSZUP data) for the third target coding pixel on the context table storing portion at the address based on the context from the context storage device 3, received in the write address input nodes AW, namely, the context of the third target coding pixel in the mode II.

A renewal data including the prediction symbol MPSUP and LSZUP data is generated by a renewal data generation device 20 which comprises the data storage device 14, the LSZ renewal logic circuit 15, and the MPS renewal logic circuit 16.

The data storage device 14 temporarily stores the storing data for the third target coding pixel on the fall of the pixel processing clock signal during the period $T_3$. The LSZ data of the temporarily stored storing data is outputted to the LSZ renewal logic circuit 15, and the MPS symbol of that storing data is outputted to the MPS renewal logic circuit 16, on the rise of the pixel processing clock signal during the period $T_4$.

The LSZ renewal logic circuit 15 receives the prediction conversion signal LPS calculated during the period T3 from the prediction conversion signal generator 71 in the arithmetic calculator 7, and the LSZ data of the storing data for the third target coding pixel from the data storage device 14. After the rise of the pixel processing clock signal during the period $T_4$, the LSZ renewal logic circuit 15 outputs the LSZUP data for the third target coding pixel, based on the truth table shown in FIG. 9 to the data input node DI of the context table storage device 4, and also outputs the SWITCH data for the third target coding pixel to the MPS renewal logic circuit 16.

After the rise of the pixel processing clock signal during the period $T_4$, the MPS renewal logic circuit 16 receives the SWITCH data for the third target coding pixel from the LSZ renewal logic circuit 15, and the prediction symbol MPS of the storing data for the third target coding pixel from the data storage device 14, and outputs the prediction symbol MPSUP for the third target coding pixel to the data input node DI of the context table storage device 4.

The LSZUP data of the renewal data generated by the LSZ renewal logic circuit 15 and the prediction symbol MPSUP of the renewal data generated by the MPS renewal logic circuit 16, are taken in to the data input node DI of the context table storage device 4 on the fall of the renewal clock from the control portion 13, and written on the context table storage device portion at the address based on the context for the third target coding pixel.

For example, in FIG. 3A, the context for the third target coding pixel is, for example, "0000000101", the prediction symbol MPS (prediction value) of the storing data stored in the context table storage device portion at the address based on that context is, for example, "0", and the LSZ data is, for example, "5a7f" (indicated in hexadecimal, but actually it is binary code).

The storing data is read out, temporarily stored in the data storage device 14. The LSZ data "5a7f" of the temporarily stored storing data is given to the LSZ renewal logic circuit 15. On the other hand, the storing data for the third target coding pixel is given to the prediction conversion signal generator 71 in the arithmetic calculator 7, as explained in the above mode II. The prediction conversion signal LPS for the third target coding pixel from the prediction conversion signal generator 71 is "0", and therefore the LPS "0" is given to the LSZ renewal logic circuit 15.

The LSZ renewal logic circuit 15, given the LSZ data "5a7f" and the LPS "0", outputs an LSZUP data "3f25" and a SWITCH data "0" according to the truth table shown in FIG. 9. The LSZUP data "3f25" outputted from the LSZ renewal logic circuit 15 serves as an LSZ data of a renewal data for the third target coding pixel in the context table storage device 4.

Receiving the prediction symbol MPS "0" of the storing data temporarily stored in the data storage device 14 and the SWITCH data "0" from the LSZ renewal logic circuit 15, the MPS renewal logic circuit 16, outputs the prediction symbol MPSUP "0" which is the same value as the prediction symbol MPS "0", because the received SWITCH data is "0".

The LSZUP data "3f25" and the prediction symbol MPSUP "0" are given to the context table storage device 4 as a renewal data. As shown in FIG. 3B, i.e. the context table after renewal. the LSZUP data "3f25" and the prediction symbol MPSUP "0" are written in the context table storage device 4 at the address based on the context "0000000101" for the third target coding pixel.

Accordingly, during the period $T_4$ in this mode III, the procedures from a context generation to the arithmetic calculation for the fourth target coding pixel, and a renormalization processing for the third target coding pixel are carried out within one system clock (a cycle). In other words, the storing data in the context table storage device 4 is renewed and the A data latched in the A register 8 and the C data latched in the C register 10 are respectively upshifted by one bit.

Moreover, the substantial time required for the one clock equals to the sum of the accessing time of the context table storage device 4 and the accessing time of the arithmetic calculator 7. Since the cycle of the system clock is shortened, this speeds up the processing.

The time for renewing the context table storage device 4 substantially equals to the processing time by the LSZ renewal logic circuit 15 and the MPS renewal logic circuit 16, which is less than the time required from the context generation to the arithmetic calculation.

Since this mode III shows an example in which three renormalization processing are required, the A data which is the resultant calculated by the arithmetic calculator 7 taken into the register portion 81 of the A register 8 in the period $T_5$ becomes a value more than 0.0625 and less than 0.125 in decimal number. Accordingly, the value of most the significant bit becomes "0", and the next bit of the most the significant bit becomes "0".

Accordingly, a renormalizing signal "1" indicating "prosecute a normalization processing" is outputted from the renormalization generator 82 in the A register 8. As shown in FIG. 11E, the control portion 13 therefore obtains an "H" level renormalizing signal in the period $T_5$.

The last renormalization generator 83 in the A register 8 outputs a last renormalizing signal "0" indicating "normalization will not be completed by the last one processing". An "L" level last renormalizing signal is obtained at the control portion 13 in the period $T_5$, as shown in FIG. 11F.

Receiving a context of the fifth pixel from the context generator 2 and a context of the fourth target coding pixel from the context storage device 3, the context comparator 6 outputs an "L" level identical context signal indicating that "the contexts do not match with each other" during the period $T_5$ as shown in FIG. 11D.

Accordingly, the mode III is recognized in this period $T_5$ in which the contexts are not identical and at least one renormalization processing has to be performed. By this recognition, a renormalization processing is performed in the period $T_5$ shown in FIG. 11A~FIG. 11L. In other words, the storing data for the fourth target coding pixel in the context table storage device 4 is renewed, and the A data in the A register 8 and the C data in the C register 10 are respectively shifted-up one bit.

As mentioned above, in this period $T_5$, at the rise of a pixel clock signal triggered by the rise of a system clock, the A data and the C data calculated for the fourth target coding pixel are taken into the A register 8 and to the C register 10 respectively and latched therein. Receiving the rise of the pixel processing clock signal, the context generator 2 reads the context for the fifth target coding pixel from the storage device 1 and outputs the read context to the read address input nodes AR in the context table storage device 4 and to the context storage device 3.

The pixel processing clock signal however, maintains "H" level during this period $T_5$, since the renormalization generator 82 of the A register 8 outputs "1" indicating "prosecute a normalization processing" and the last renormalization generator 83 of the A register 8 outputs "0" indicating "normalization processing will not be completed by the last one processing". As a result, the A register 8 and the C register 10 shift none of the contents stored therein. The A data and the C data calculated for the fourth target coding pixel remains to be latched in the A register 8 and the C register 10, respectively.

On the other hand, when the control portion 13 receives "1" indicating "prosecute a normalization processing" from the renormalization generator 82 of the A register 8, the renormalizing clock signal generator is set, and the control portion 13 therefore, outputs a renormalizing clock signal in synchronization with the system clock signal.

Receiving the fall of this renormalizing clock signal, the A register 8 and the C register 10 shift up the A data and the C data by one bit, which are calculated by the arithmetic calculator 7 in the period $T_4$ for the fourth target coding pixel, respectively, and latch themselves again.

Since the control portion 13 receives "1" indicating "prosecute a normalization processing" from the renormalization generator 82 in the A register 8, the control portion 13 outputs a renewal clock signal, when receiving a pixel at the rising edge of a pixel processing clock signal, in synchronization with the system clock as shown in FIG. 11G.

Receiving the fall of the renewal clock signal, the context table storage device 4 writes and stores a renewal data in the context table storing portion at the address based on the context (namely, the context of the fourth target coding pixel) received at the write address input nodes AW from the context storage device 3, in the same way as explained in the period $T_4$. The above renewal data includes the prediction symbol MPSUP and the LSZUP data from the renewal data generating portion, which comprises the data storage device 14, the LSZ renewal logic circuit 15, and the MPS renewal logic circuit 16.

In this period $T_5$, the A data stored in the register portion 81 of the A register 8 has a value more than 0.125 and less than 0.25 in decimal number because it has been shifted-up by one bit. The value of the most significant bit is, however "0", and the value which is one bit lower from the most significant bit is "0".

Accordingly, the renormalization generator 82 in the A register 8 outputs a renormalizing signal "1" indicating "prosecute a normalization processing", therefore, an "H" level renormalizing signal is obtained at the control portion 13 in the period $T_6$, as shown in FIG. 11E.

The last renormalization generator 83 in the A register 8 outputs a last renormalizing signal "0" indicating "normalization will not be completed by the last one processing". An "L" level last renormalizing signal is obtained at the control portion 13 in the period $T_6$, as shown in FIG. 11F.

This means that in the next period $T_6$, the A data and the C data latched in the A register 8 and the C register 10 respectively are shifted-up by one bit in a renormalization processing.

Accordingly in the period $T_6$, when the control portion 13 receives "0" indicating "normalization processing will not be completed by the last one processing" from the last renormalization generator 83 of the A register 8, the renormalizing clock signal generator in the control portion 13 is not reset, the control portion 13 therefore outputs a renormalizing clock signal in synchronization with the system clock signal.

Receiving the fall of this renormalizing clock signal, the A register 8 and the C register 10 shift up the A data and the C data by one bit, which are shifted-up by one bit in the period $T_5$, respectively, and latch themselves again.

Since the last renormalization generator 83 outputs "0" indicating "normalization processing will not be completed by the last one processing", the pixel processing clock signal maintains "H" level even in this period $T_6$. Accordingly, the control portion 13 maintains the renewal clock signal at "H" level as shown in FIG. 11G. As a result, the contents stored in the context table storage device 4 is not renewed.

In this period $T_6$, the A data stored in the register portion 81 of the A register 8 has a value more than 0.25 and less than 0.5 in decimal number, because it has been shifted-up by one bit. The value of the most significant bit is, however "0", and the value which is one bit lower from the most significant bit is "1".

Accordingly, the renormalization generator 82 in the A register 8 outputs a renormalizing signal "1" indicating "prosecute a normalization processing", therefore, an "H" level renormalzing signal is obtained at the control portion 13 in the period $T_7$, as shown in FIG. 11E.

The last renormalization generator 83 in the A register 8 outputs a last renormalizing signal "1" indicating "normalization will be completed by the last one processing". An "H" level last renormalizing signal is obtained at the control portion 13 in the period $T_7$, as shown in FIG. 11F.

This means that in the next period $T_7$, the A data and the C data latched in the A register 8 and the C register 10 respectively, are shifted-up by one bit in a renormalization processing. This also means that the mode III is completed by the last one normalizing processing.

In other words, the last renormalization generator 83 in the A register 8 outputs "1" indicating "normalization will be completed by the last one processing". In the same manner as the operation in the mode II, the renormalization processing can be performed, at the first clock of the system clock in which an encoding processing for the next target coding pixel is performed, namely, the period $T_7$ in the mode IV shown in FIG. 11A~FIG. 11L. This renormalization processing will be explained more in detail in the following explanation on the operation in the mode IV.

Accordingly, in the mode III, for the renormalization processing which are required for three times, the procedures from a context generation to the arithmetic calculation for the target coding pixel, take only one clock time (one cycle) of the system clock to carry out. The A data and the C data calculated by the arithmetic calculator 7, are stored in the A register 8 and the C register 10, respectively. The two renormalization processing need two clocks of the system clock to carry out. The last one renormalization processing is performed in the first clock of the system clock in which an encoding processing for the next target coding pixel is performed.

As a result, substantial operating time in the mode II needs only three clocks of the system clock. Moreover, one clock lasts as long as the procedures from context generation to the calculation by the arithmetic calculator 7 are completed. Accordingly, the substantial time required for the one clock equals to the sum of the accessing time of the context table storage device 4 and the accessing time of the arithmetic calculator 7. Since the cycle of the system clock is shortened, this speeds up the processing.

In the period $T_4$~$T_6$, since the control portion 113 maintains the renormalizing clock signal at "H" level, the CT count clock signal is maintained to the same clock signal as the system clock shown in FIG. 11J. Since the CT count clock signal lasts, however, during three clocks in the period $T_4$~$T_6$, the code output clock signal from the control portion 13 remains "H" level. Accordingly, the output means 12 neither takes-in nor outputs the contents stored in the C register 10.

[mode IV]

FIG. 11A shows an example of major signal waveforms in the mode IV in the period of $T_7$~$T_8$ of the system clock signal. It is assumed that an encoding processing has been done for the fifth target coding pixel in the mode IV.

In the period $T_7$, the context generator 2 has already (in period $T_5$) read the context for the fifth target coding pixel from the storage device 1 and has outputted the read context to the read address input nodes AR of the context table storage device 4. The code 5 in FIG. 11C shows that a context has been generated by the context generator 2 for the fifth target coding pixel.

In the context table storage device 4, a 16-bit storing data (a prediction symbol MPS and LSZ data) is read out according to the context inputted into the read address input nodes AR, and outputted from the data output nodes DO to the arithmetic calculator 7.

On the other hand, since one renormalization processing is performed in the above-mentioned mode III in the period $T_7$, the control portion 13, therefore, receives "1" indicating "prosecute a normalization processing" from the renormalize generator 82 in the A register 8 and "1" indicating "normalization will be completed by the last one processing" from the last renormalization generator 83 in the A register 8, in the period $T_7$ of the first clock of the system clock in the mode IV. Accordingly, the control portion 13 obtains a renormalizing signal and a last renormalizing signal, both "H" level, in the period $T_7$, respectively, as shown in FIG. 11E and FIG. 11F. Also the control portion 13 generates a shift-up selection signal which rises in response to the rise of the system clock as shown in FIG. 11I.

When the shift-up selection signal rises, receiving a shift-up selection signal indicating "normalization will be completed by the last one normalization processing", the A selector 9 selects the data obtained by shifting up the A data from the A register 8 by one bit, and also outputs it to the arithmetic calculator 7.

Similarly, receiving the shift-up selection signal, the C selector 11 selects the data obtained by shifting up the C data from the C register 10 by one bit, and outputs it to the arithmetic calculator 7.

In other words, the processing performed in this period $T_7$ is the same as the "shift-up" processing in the mode III in which the A data and the C data latched in the A register 8 and in the C register 10 respectively are shifted-up by one bit. As a result, three renormalization processing are performed in the mode III during the period $T_5$~$T_7$. The A data and the C data therefore outputted from the A selector 9 and from the C selector 11 respectively are, shifts-up the A data and the C data calculated for the fourth target coding pixel in the period $T_4$ in the mode III by three bits. In other words, both the A data and the C data outputted from respective selectors become eight times as large as the A data and the C data calculated for the fourth target coding pixel.

In the prediction conversion signal generator 71 in the arithmetic calculator 7 (ref. FIG. 6), a prediction symbol MPS of the storing data for the fifth target coding pixel and a picture data for a target coding pixel are compared to generate a prediction conversion signal LPS. The prediction conversion signal LPS is then outputted.

When this prediction conversion signal LPS indicates that the prediction symbol MPS matches with the picture data (indicates MPS), the calculator 72 in the arithmetic calculator 7 calculates an A data, from the LSZ data of the storing data for the fifth target coding pixel from the context table storage device 4 and the A data of the fourth target coding pixel, namely, the A data which is calculated for the fourth target coding pixel by shifting up by three bits, according to the above-mentioned equation (1), and outputs the calculated A data to the A register 8. According to the above-mentioned equation (2), the calculator 72 outputs the C data of the fourth target coding pixel, namely, the C data which is calculated for the fourth target coding pixel by shifting up by three bits, to the C register 10.

When this prediction conversion signal LPS indicates the prediction symbol MPS does not match with the picture data (indicates the LPS), the calculator 72 outputs the LSZ data of the storing data for the fifth target coding pixel to the A register 8 as an A data according to the above-mentioned equation (3). According to the above-mentioned equation (4), the calculator 72 calculates the C data from the LSZ data of the storing data for the fifth target coding pixel, and both the A data and the C data of the fourth target coding pixel, namely, those obtained from the A data and the C data, which are calculated for the fourth target coding pixel, by shifting up by three bits. The calculated C data is outputted to the C register 10.

A concept of the A data and the C data at this stage is explained using the bar graph for the fifth target coding pixel shown in FIG. 12. The bar graph for this fifth target coding pixel indicates that a picture data does not match with a prediction symbol MPS. The contents stored in the A register 8 for the fourth target coding pixel corresponds to the size of the current coding interval of the LPS which is the same LPS as that explained in the mode III in the period $T_6$ (the value obtained from the A data calculated for the fourth target coding pixel by shifting up it two bits). The state that the contents stored in the A register 8 has been shifted-up by one bit corresponds to the substantial size of the current coding interval of the LPS.

The size of the LPS for the fifth target coding pixel corresponds to the value of LSZ data of the storing data for the fifth target coding pixel. The size of the MPS for the fifth target coding pixel corresponds to the value calculated by subtracting the size of the LPS from the value obtained by shifting up the contents stored in the A register 8 by one bit. The size of the LPS corresponds to the size of the current coding interval for the fifth target coding pixel.

In other words, the A data calculated and outputted by the calculator 72 has a value corresponding to the size of the LPS for the fifth target coding pixel. The C data calculated and outputted by the calculator 72 has a value corresponding to the bottom of the current coding interval, namely, a value corresponding to the bottom of the LPS for the fifth target coding pixel.

The A data and the C data calculated by the calculator 72 in this way are inputted to the register portion 81 of the A register 8 (ref. FIG. 7) and to the C register 10 (ref. FIG. 8) respectively, and stored (the stored contents are renewed) therein at the rising edge of a pixel processing clock signal from the control portion 13 (at period $T_8$).

Although the control portion 13 receives "1" indicating "prosecute a normalization processing" from the renormalization generator 82 of the A register 8, the contents stored in the context table storage device 4 is not renewed because the renewal clock signal maintains "H" level in the period $T_7$.

Accordingly, in the period $T_7$ in the mode IV, the procedures from the context for the fifth target coding pixel to the arithmetic calculation, and a last renormalization processing (that is, the processing which shifts-up the A data and the C data latched in the A register 8 and the C register 10, respectively, by one bit) for the fourth target coding pixel are carried out within one system clock (a cycle). Moreover, the substantial time required for the one clock equals to the sum of the accessing time of the context table storage device 4 and the accessing time of the arithmetic calculator 7. Since the cycle of the system clock is shortened, this speeds up the processing.

Since this mode IV shows an example in which one renormalization processing is required, the A data stored in the register portion 81 of the A register 8, has a value more than 0.25 and less than 0.5 in decimal number. Accordingly, the value of its most significant bit becomes "0", and the next bit of the most the significant bit becomes "1".

Accordingly, a renormalizing signal "1" indicating "prosecute a normalization processing" is outputted from the renormalization generator 82. As shown in FIG. 11E, the control portion 13 obtains an "H" level renormalizing signal in the period $T_8$.

The last renormalization generator 83 in the A register 8 outputs a last renormalizing signal "1" indicating "normalization will be completed by the last one processing". An "H" level last renormalizing signal is obtained at the control portion 13 in the period $T_8$, as shown in FIG. 11F.

Receiving a context of the sixth pixel from the context generator 2 and a context of the fifth target coding pixel from the context storage device 3, the context comparator 6 outputs an "H" level identical context signal indicating "the contexts match with each other" during the period $T_8$ as shown in FIG. 11D.

Accordingly, the mode IV is recognized in this period $T_8$ in which the contexts are identical and one renormalization processing has to be performed.

By this recognition, a renormalization processing is performed in the period $T_8$ shown in FIG. 11A–FIG. 11L. In other words, the storing data for the fifth target coding pixel in the context table storage device 4 is renewed, and the A data in the A register 8 and the C data in the C register 10 are respectively shifted-up one bit.

As mentioned above, in this period $T_8$, at the rise of a pixel clock signal triggered by the rise of a system clock, the A data and the C data calculated for the fifth target coding pixel are taken into the A register 8 and to the C register 10 respectively and latched therein. Receiving the rise of the pixel processing clock signal, the context generator 2 reads the context for the sixth target coding pixel from the storage device 1 and outputs the read context to the read address input nodes AR in the context table storage device 4 and to the context storage device 3.

The pixel processing clock signal however, maintains "H" level in this period $T_8$, since the renormalization generator 82 of the A register 8 outputs "1" indicating "prosecute a normalization processing", the last renormalization generator 83 of the A register 8 outputs "1" indicating "normalization processing will be completed by the last one processing", and the identical context signal from the context comparator 6 shows that contexts are identical. The pixel processing clock signal maintains the "H" level during the period $T_8$. As a result, the contents stored in the A register 8 and in the C register 10 are not renewed. The A data and the C data calculated for the fifth target coding pixel remains to be latched in the A register 8 and in the C register 10.

On the other hand, when the control portion 13 receives "1" indicating "prosecute a normalization processing" from the renormalization generator 82 of the A register 8, the renormalizing clock signal generator is set, and the control portion 13 therefore, outputs a renormalizing clock signal in synchronization with the system clock signal.

Receiving the fall of this renormalizing clock signal, the A register 8 and the C register 10 shift up the A data and the C data by one bit, which are calculated by the arithmetic calculator 7 in the period $T_8$ for the fifth target coding pixel, respectively, and latch themselves again.

Since the control portion 13 receives "1" indicating "prosecute a normalization processing" from the renormalization generator 82 in the A register 8, the control portion 13 outputs a renewal clock signal at the rising edge of a pixel processing clock signal in synchronization with the system clock as shown in FIG. 11G.

Receiving the fall of the renewal clock signal, the context table storage device 4 writes and stores a renewal data in the context table storing portion at the address based on the context (namely, the context of the fifth target coding pixel) received at the write address input nodes AW from the context storage device 3, in the same way as explained in the period $T_4$. The above renewal data includes the prediction symbol MPSUP and the LSZUP data from the renewal data generating portion, which comprises the data storage device 14, the LSZ renewal logic circuit 15, and the MPS renewal logic circuit 16.

In this period $T_8$, the A data stored in the register portion 81 of the A register 8 has a value more than 0.5 in decimal number, since it has been shifted-up by one bit. Accordingly, the value of the most significant bit becomes "1".

Accordingly, the renormalization generator 82 in the A register 8 outputs a renormalizing signal "0" indicating "not-prosecute a normalization processing", therefore, an "L" level renormalizing signal is obtained at the control portion 13 in the period $T_9$, as shown in FIG. 11E.

The last renormalization generator 83 in the A register 8 outputs a last renormalizing signal "0" indicating "normalization will not be completed by the last one processing". An "L" level last renormalizing signal is obtained at the control portion 13 in the period $T_9$, as shown in FIG. 11F.

Accordingly, in the mode IV, it means that the renormalization processing has been already completed. In this mode IV, for the renormalization processing which is required for once, the procedures from the context operation for the target coding pixel to the arithmetic calculation take only one clock time (one cycle) of the system clock. The A data and the C data calculated by the arithmetic calculator 7, are stored in the A register 8 and the C register 10, respectively. One renormalization processing is carried out in one clock of the system clock.

As a result, substantial operating time in the mode IV need only two clocks of the system clock. Moreover, one clock lasts as long as the procedures from context generation to the calculation by the arithmetic calculator 7 are completed. Accordingly, the substantial time required for the one clock equals to the sum of the accessing time of the context table storage device 4 and the accessing time of the arithmetic calculator 7. Since the cycle of the system clock is shortened, this speeds up the processing.

In the period $T_7 \sim T_8$, the renormalizing signal shown in FIG. 11E is "H" level. The control portion 13 therefore, makes the CT count clock signal the same clock signal as the system clock signal as shown in FIG. 11J.

However, since the CT count clock holds two clocks and the number of the clocks and the total number of the clock accumulated from the mode IV is five, the code output clock signal from the control portion 13 remains "H" level. Accordingly, the output means 12 neither takes-in nor outputs the contents stored in the C register 11.

[Mode V]

FIG. 11A shows an example of major signal waveforms in the mode V in the period of $T_9 \sim T_{13}$ of the system clock signal.

It is assumed that an encoding processing has been done for the sixth target coding pixel in the mode V. In the period $T_9$, the context generator 2 has already read the context for the sixth target coding pixel from the storage device 1 at period $T_8$ and has outputted the read context to the read address input nodes AR of the context table storage device 4.

The code 6 in FIG. 11C shows that a context has been generated by the context generator 2 for the sixth target coding pixel.

In the context table storage device 4, a 16-bit storing data (a prediction symbol MPS and LSZ data) is read out according to the context inputted into the read address input nodes AR, and outputted from the data output nodes DO to the arithmetic calculator 7.

On the other hand, since the processing has been already completed in the above-mentioned mode IV in the period $T_8$. Accordingly, the control portion 13 obtains a renormalizing signal of "L" level, and a last renormalizing signal, as shown in FIG. 11E and FIG. 11F respectively, and no renormalization processing is performed.

In the period $T_8$, since the pixel processing clock signal maintains "H" level, the pixel processing clock signal remains "H" level, even if the system clock rises in the period $T_9$. Accordingly, the A data and the C data latched in the register 8 and in the C register 10 are obtained from the A data and the C data calculated for the fifth target coding pixel by shifting up them one bit in the period $T_7$ which have been latched in the period $T_8$.

In the prediction conversion signal generator 71 in the arithmetic calculator 7 (ref. FIG. 6), a prediction symbol MPS of the storing data for the sixth target coding pixel and a picture data for the sixth target coding pixel are compared to generate a prediction conversion signal LPS. The generated prediction conversion signal LPS is outputted.

When this prediction conversion signal LPS indicates that the prediction symbol MPS matches with the picture data, the calculator 72 calculates an A data from an LSZ data of the storing data for the sixth target coding pixel from the context table storage device 4 and the A data of the fifth target coding pixels, namely, the data A shifted-up by one bit, according to the above-mentioned equation (1). The calculated A data is outputted to the A register 8. The C data of the fifth target coding pixels, namely, the C data shifted-up by one bit, is outputted to the C register 10, according to the above-mentioned equation (2).

When this prediction conversion signal LPS indicates that the prediction symbol MPS does not match with the picture data, the calculator 72 outputs the LSZ data of the storing data for the sixth target coding pixel from the context table storage device 4 to the A register 8 as an A data, according to the above-mentioned equation (3). The calculator 72 further calculates a C data from the LSZ data of the storing data for the sixth target coding pixel and both A and C data of the fifth target coding pixel, namely, the A data and the C data shifted-up by one bit, respectively, according to the above-mentioned equation (4). The calculated C data is outputted to the C register 10.

The A data and the C data calculated by the calculator 72 in this way are inputted to the register portion 81 of the A register 8 (ref. FIG. 7) and to the C register 10 (ref. FIG. 8) respectively, and stored (the stored contents are renewed) therein at the rising edge of a pixel processing clock signal from the control portion 13 (at period $T_{10}$).

On the other hand, since the renewal clock signal from the control portion 13 maintains "H" level as shown in FIG. 11G, the contents stored in the context table storage device 4 is not renewed.

Since this mode V shows an example in which five renormalization processing are required, the A data stored in the register portion 81 of the A register 8, has a value more than 0.15625 and less than 0.03125 in decimal number. Accordingly, the value of its most significant bit becomes "0", and the next bit of the most the significant bit becomes "0".

Accordingly, a renormalizing signal "1" indicating "prosecute a normalization processing" is outputted from the renormalization generator 82 in the A register 8. As shown in FIG. 11E, the control portion 13 obtains an "H" level renormalizing signal in the period $T_{10}$.

The last renormalization generator 83 in the A register 8 outputs a last renormalizing signal "0" indicating "normalization will not be completed by the last one processing". An "L" level last renormalizing signal is obtained at the control portion 13 in the period $T_{10}$, as shown in FIG. 11F.

Receiving a context of the seventh pixel from the context generator 2 and a context of the sixth target coding pixel from the context storage device 3, the context comparator 6 outputs an "H" level identical context signal indicating that "the contexts match with each other" during the period $T_{10}$ as shown in FIG. 11D.

Accordingly, the mode V is recognized in this period $T_{10}$ in which the contexts are not identical and at least one renormalization processing has to be performed. By this recognition, a renormalization processing is performed in the period $T_{10}$ shown in FIG. 11A–FIG. 11L. In other words, the storing data for the sixth target coding pixel in the context table storage device 4 is renewed, and the A data in the A register 8 and the C data in the C register 10 are respectively shifted-up one bit.

As mentioned above, in this period $T_{10}$, at the rise of a pixel clock signal triggered by the rise of a system clock, the A data and the C data calculated for the sixth target coding pixel are inputted to the A register 8 and to the C register 10 respectively and latched therein.

Receiving the rise of the pixel processing clock signal, the context generator 2 reads the context for the seventh target coding pixel from the storage device 1 and outputs the read context to the read address input nodes AR in the context table storage device 4 and to the context storage device 3.

The pixel processing clock signal however, maintains "H" level during this period $T_{10}$, since the renormalization generator 82 of the A register 8 outputs "1" indicating "prosecute a normalization processing" and the last renormalization generator 83 of the A register 8 outputs "0" indicating "normalization processing will not be completed by the last one processing". As a result, the A register 8 and the C register 10 shift none of the contents stored therein. The A data and the C data calculated for the sixth target coding pixel remains to be latched in the A register 8 and the C register 10, respectively.

On the other hand, when the control portion 13 receives "1" indicating "prosecute a normalization processing" from the renormalization generator 82 of the A register 8, the renormalizing clock signal generator is set, and the control portion 13 therefore, outputs a renormalizing clock signal in synchronization with the system clock signal.

Receiving the fall of this renormalizing clock signal, the A register 8 and the C register 10 shift up the A data and the C data by one bit, which are calculated by the arithmetic calculator 7 in the period $T_9$ for the sixth target coding pixel, respectively, and latch themselves again.

Since the control portion 13 receives "1" indicating "prosecute a normalization processing" from the renormalization generator 82 in the A register 8, the control portion 13 outputs a renewal clock signal in synchronization with the system clock as shown in FIG. 11G.

Receiving the fall of the renewal clock signal, the context table storage device 4 writes and stores a renewal data in the context table storing portion at the address based on the context (namely, the context of the sixth target coding pixel in the mode V) received at the write address input nodes AW from the context storage device 3, in the same way as explained in the period $T_4$. The above renewal data includes the prediction symbol MPSUP and the LSZUP data from the renewal data generating portion, which comprises the data storage device 14, the LSZ renewal logic circuit 15, and the MPS renewal logic circuit 16.

In this period $T_{10}$, the A data stored in the register portion 81 of the A register 8 has a value more than 0.03125 and less than 0.0625 in decimal number because it has been shifted-up by one bit. The value of the most significant bit is however "0", and the value which is one bit lower from the most significant bit is "0".

Accordingly, the renormalization generator 82 in the A register 8 outputs a renormalizing signal "1" indicating "prosecute a normalization processing", therefore, an "H" level renormalizing signal is obtained at the control portion 13 in the period $T_{11}$, as shown in FIG. 11E.

The last renormalization generator 83 in the A register 8 outputs a last renormalizing signal "0" indicating "normalization will not be completed by the last one processing". An "L" level last renormalizing signal is obtained at the control portion 13 in the period $T_{11}$, as shown in FIG. 11F.

This means that in the period $T_{11}$, the A data and the C data latched in the A register 8 and the C register 10 respectively are shifted-up by one bit in a renormalization processing.

Accordingly in the period $T_{11}$, when the control portion 13 receives "0" indicating "normalization processing will not be completed by the last one processing" from the last renormalization generator 83 of the A register 8, the renormalizing clock signal generator in the control portion 13 is not reset, the control portion 13 therefore outputs a renormalizing clock signal in synchronization with the system clock signal.

Receiving the fall of this renormalizing clock signal, the A register 8 and the C register 10 shift up the A data and the C data by one bit, which are shifted-up by one bit in the period $T_{10}$, respectively, and latch themselves again. Since the control portion 13 maintains the renewal clock signal at "H" level in this period $T_{11}$, the contents stored in the context table storage device 4 is not renewed.

In this period $T_{11}$, the A data stored in the register portion 81 of the A register 8 has a value more than 0.0625 and less than 0.125 in decimal number, because it has been shifted-up by one bit. The value of the most significant bit is however "0", and the value which is one bit lower from the most significant bit is also "0".

Accordingly, a renormalizing signal "1" indicating "prosecute a normalization processing" is outputted from the renormalization generator 82 in the A register 8. An "H" level renormalizing signal is obtained in the control portion 13 in the period $T_{12}$, as shown in FIG. 11E.

A last renormalizing signal "0" indicating "normalization will not be completed by the last one processing" is outputted from the last renormalization generator 83 in the A register 8. An "L" level last renormalizing signal is obtained in the control portion 13 in the period $T_{12}$, as shown in FIG. 11F.

This means that in the period $T_{12}$, the A data and the C data latched in the A register 8 and the C register 10 respectively are shifted-up by one bit in a renormalization processing.

Accordingly in the period $T_{12}$, the renormalizing clock signal generator in the control portion 13 is not reset because the control portion 13 receives "0" indicating "normalization processing will not be completed by the last one processing" from the last renormalization generator 83 in the A register 8. The control portion 13 therefore, outputs a renormalizing clock signal in synchronization with the system clock signal.

When the fall of this renormalizing clock signal is received by the A register 8 and the C register 10, the A data and C data latched therein, namely, the A data and C data already shifted-up by one bit in the period $T_{11}$, are again shifted-up by one bit, and latched again in the A register 8 and the C register 10 respectively.

Since the control portion 13 maintains the renewal clock signal at "H" level in this period $T_{12}$ as shown in FIG. 11G, the contents stored in the context table storage device 4 is not renewed.

In this period $T_{12}$, the A data stored in the register portion 81 of the A register 8 has a value more than 0.0625 and less than 0.125 in decimal number, because it has been shifted-up by one bit. The value of the most significant bit is however "0", and the value which is one bit lower from the most significant bit is also "0".

Accordingly, a renormalizing signal "1" indicating "prosecute a normalization processing" is outputted from the renormalization generator 82 in the A register 8. An "H" level renormalizing signal is obtained in the control portion 13 in the period $T_{13}$, as shown in FIG. 11E.

A last renormalizing signal "0" indicating "normalization will not be completed by the last one processing" is outputted from the last renormalization generator 83 in the A register 8. An "L" level 1 last renormalizing signal is obtained in the control portion 13 in the period $T_{13}$ as shown in FIG. 11F.

This means that in the period $T_{13}$, the A data and the C data latched in the A register 8 and the C register 10 respectively, are shifted-up by one bit in a renormalization processing.

Accordingly in the period $T_{13}$, the renormalizing clock signal generator in the control portion 13 is not reset because the control portion 13 receives "0" indicating "normalization processing will not be completed by the last one processing" from the last renormalization generator 83 of the A register 8. The control portion 13 therefore, outputs a renormalizing clock signal in synchronization with the system clock signal.

When the fall of this renormalizing clock signal is received by the A register 8 and the C register 10, the A data and C data latched therein, namely, the A data and C data already shifted-up by one bit in the period $T_{12}$, are again shifted-up by one bit, and latched again in the A register 8 and the C register 10 respectively.

Since the control portion 13 maintains the renewal clock signal at "H" level in this period $T_{13}$ as shown in FIG. 11G, the contents stored in the context table storage device 4 is not renewed.

In this period $T_{13}$, the A data stored in the register portion 81 of the A register 8 has a value more than 0.25 and less than 0.5 in decimal number, because it has been shifted-up by one bit. Accordingly, the value of the most significant bit is "0", and the value which is one bit lower from the most significant bit is "1". Accordingly, a renormalizing signal "1" indicating "prosecute a normalization processing" is outputted from the renormalization generator 82 in the A register 8. An "H" level renormalizing signal is obtained in the control portion 13 in the period $T_{14}$, as shown in FIG. 11E.

The last renormalization generator 83 in the A register 8 outputs a last renormalizing signal "1" indicating "normal-ization will be completed by the last one processing". An "H" level last renormalizing signal is obtained at the control portion 13 in the period $T_{14}$, as shown in FIG. 11F.

This means that in the period $T_{14}$, the A data and the C data latched in the A register 8 and the C register 10 respectively are shifted-up by one bit in a renormalization processing. This also means that the mode V is completed by the last one normalizing processing.

In other words, since the last renormalization generator 83 outputs "1" indicating "normalization will be completed by the last one processing", the renormalization processing is completed in the first clock of the system clock in which an encoding processing for the next target coding pixel is performed, namely, in the period $T_{14}$ shown in FIG. 11A~FIG. 11L.

In other words, receiving the rise of the system clock in the period $T_{14}$, the control portion 13 obtains a renormalizing signal and a last renormalizing signal, both "H" level, as shown in FIG. 11E and FIG. 11F respectively, and generates a shift-up selection signal, which rises by receiving the rise of the system clock as shown in FIG. 11I.

When the shift-up selection signal rises, receiving a shift-up selection signal indicating "normalization will be completed by the last one normalization processing", the A selector 9 selects the data obtained by shifting up the A data from the A register 8 by one bit, and also outputs it to the arithmetic calculator 7.

Similarly, receiving the shift-up selection signal, the C selector 11 selects the data obtained by shifting up the C data from the C register 10 by one bit, and outputs it to the arithmetic calculator 7.

In other words, the processing performed in this period $T_{14}$ is the same as the "shift-up" processing in the mode V in which the A data and the C data latched in the A register 8 and in the C register 10 respectively are shifted-up by one bit. As a result, five renormalization processing are performed in the mode V during the periods $T_{10} \sim T_{14}$. The A data and the C data which are outputted from the A selector 9 and from the C selector 11 are the same as those obtained from the A data and the C data, respectively, calculated for the sixth target coding pixel in the period $T_9$ in the mode V by shifting up them five bits.

Accordingly, in the mode V, for the renormalization processing which are required for five times, the procedures from a context generation to the arithmetic calculation for the target coding pixel, take only one clock time (one cycle) of the system clock to carry out. The A data and the C data calculated by the arithmetic calculator 7, are stored in the A register 8 and the C register 10, respectively. The four renormalization processing need four clocks of the system clock to carry out. The last one renormalization processing is performed in the first clock of the system clock in which an encoding processing for the next target coding pixel is performed. As a result, substantial operating time in the mode V needs only five clocks of the system clock.

Moreover, one clock lasts as long as the procedures from context generation to the calculation by the arithmetic calculator 7 are completed. Accordingly, the substantial time required for the one clock equals to the sum of the accessing time of the context table storage device 4 and the accessing time of the arithmetic calculator 7. Since the cycle of the system clock is shortened, this speeds up the processing.

In the periods $T_{10} \sim T_{13}$, since the control portion 13 maintains the renormalizing clock signal to "H" level, the CT count clock signal is maintained to the same clock signal as the system clock shown in FIG. 11J. The control portion 13 outputs the four CT count clock signals. Accordingly, since there are five total clocks until the mode V, when the control portion 13 counts the same number of the bits of the encoded data for transmission, namely, eight bits in this first embodiment, the control portion 13 outputs a code output clock signal, which becomes "L" level in synchronization with the next system clock as shown in FIG. 11K.

Receiving the code output clock signal from the control portion 13 when it falls to the "L" level, the output means 12 takes-in the C data outputted from the C selector 11. This C data, in other words, is the C data latched in the C register 10, or a part of the C data selectively outputted from those obtained by shifting up this C data latched in the C register 10 by one bit. In case of this first embodiment, the output means 12 takes-in the eight most significant bits and latches them. This C data consisting the eight most significant bits are then outputted as an encoded data.

In conclusion, with regard to the digital signal encoding device having the above mentioned configuration, the number of the processing clocks of the system clock signal is as follows.

In the mode I where there is no renormalization, that is, no normalization processing is required because the A data for a target coding pixel is equal or more than 0.5 in decimal number, the number of the processing clocks is one.

In the mode II where a renormalization is performed, that is, a normalization processing is required because the A data for a target coding pixel is less than 0.5 in decimal number, the context for the target coding pixel does not match with the context for the pixel which is immediately subsequent to the target coding pixel, and renormalization occurs once, the number of the processing clocks is one.

In the mode III where a renormalization is performed, the context for a target coding pixel does not match with the context for a pixel which is immediately subsequent to the target coding pixel, and renormalization occurs more than once, the number of the processing clocks is the same as that of the renormalization processing.

In the mode IV where a renormalization is performed, the context for a target coding pixel matches with the context for a pixel which is immediately subsequent to the target coding pixel, and renormalization occurs once, the number of the processing clocks is two.

In the mode V where a renormalization is performed, the context for a target coding pixel matches with the context for a pixel which is immediately subsequent to the target coding pixel, and renormalization occurs more than once, the number of the processing clocks is the same as that of the renormalization processing.

In other words, in the mode II, III and V, the last renormalization processing is performed together with the processing for the next target coding pixel at the first clock of the system clock for processing the next target coding pixel. Therefore, it is possible to substantially reduce the processing time as much as one clock, and speed up the encoding processing.

With regard to the digital signal encoding device constructed in the above-mentioned manner, it is expected that the processing mode for the most of the target coding pixel will be mode II in case of the worst compression ratio for encoding (compression ratio is about 1). Even in this case, the operation time takes substantially no more than one clock of the system clock to complete the processing for the most of the target coding pixel. Accordingly, this can speed up the encoding processing.

The following is a more precise explanation on this point. An investigation has been done to know the relationship between the distribution and the compression ratio for the above-mentioned modes. In the investigation, a conventional CCITT facsimile chart is used as a character picture; a real picture and an artificially made picture data are used as a pseudo intermediate picture. The real picture is made from color standard picture (SCID) by means of a dither processing or an error scattering processing. The artificially made picture data is made by controlling the frequency of the LPS (Least Probable Symbol) to obtain a picture having an extreme high compression ratio. The experiment is performed with respect to each of the above-mentioned five modes.

In conclusion, it has been made clear that the ratio of the mode II becomes larger as the compression ratio becomes worse. The ratio of the mode II is 60% when the compression ratio is 1. In addition, the combined ratio of the mode I and II becomes more than 80% in most of the cases where the compression ratio is equal or less than 1. Since it takes no more than one clock to complete a processing for one target coding pixel in the mode I and II, this remarkably can speed up the encoding processing.

The total number of the processing clocks T necessary for encoding is calculated according to the following equation 1. The processing speed, namely, the processing clock per pixel, is obtained as about 1.3 clock/pixel when the compression ratio is 1.

Moreover, one clock lasts as long as the procedures from context generation to the calculation by the arithmetic calculator 7 are completed. Accordingly, the substantial time required for the one clock equals to the sum of the accessing time of the context table storage device 4 and the accessing time of the arithmetic calculator 7. Since the cycle of the system clock is shortened, this speeds up the processing.

$$T = P + \sum_{r=2}^{15}(r-1)*N[IIIr] + N[IV] + \sum_{r=2}^{15}(r-1)*N[Vr]$$

where,
P: the number of pixels/page
N[IIr]: the number of pixels/page which satisfies the number of renormalization=r in the mode III
N[IV]: the number of pixels/page in the mode IV
N[Vr]: the number of pixels/page which satisfies the number of renormalization=r in the mode V On the other hand, in the above-mentioned digital information encoding device, the context table storage device 4 can be constructed by a 2-port RAM of a small storage device capacity, because the storing data stored in the context table storage device portion of the context table storage device 4 includes the prediction symbol MPS and the LSZ data. As a result, the context table storage device 4 occupies a relatively small area in the semiconductor integrated circuit of the digital information encoding device. Accordingly, the digital information encoding device of the invention can be suitably integrated into a semiconductor integrated circuit.

Furthermore, the renewal data generating means for giving a renewal data to the context table storage device 4 comprises the data storage device 14, the LSZ renewal logic circuit 15 and the MPS renewal logic circuit 16. The data storage device 14 comprises a latch circuit, the LSZ renewal logic circuit 15 comprises, for example, a logic circuit (of 2 K gate in case of the first embodiment) including P channel MOS transistors and N channel MPS transistors, and the MPS renewal logic circuit 16 comprises, for example, a logic circuit, i.e. an exclusive OR circuit. As a result, the renewal data generating means occupies a relatively small area in the semiconductor circuit of the digital information encoding device. Accordingly, the digital information encoding device of the invention can be suitably integrated into a semiconductor integrated circuit.

Embodiment 2

Figure 13:
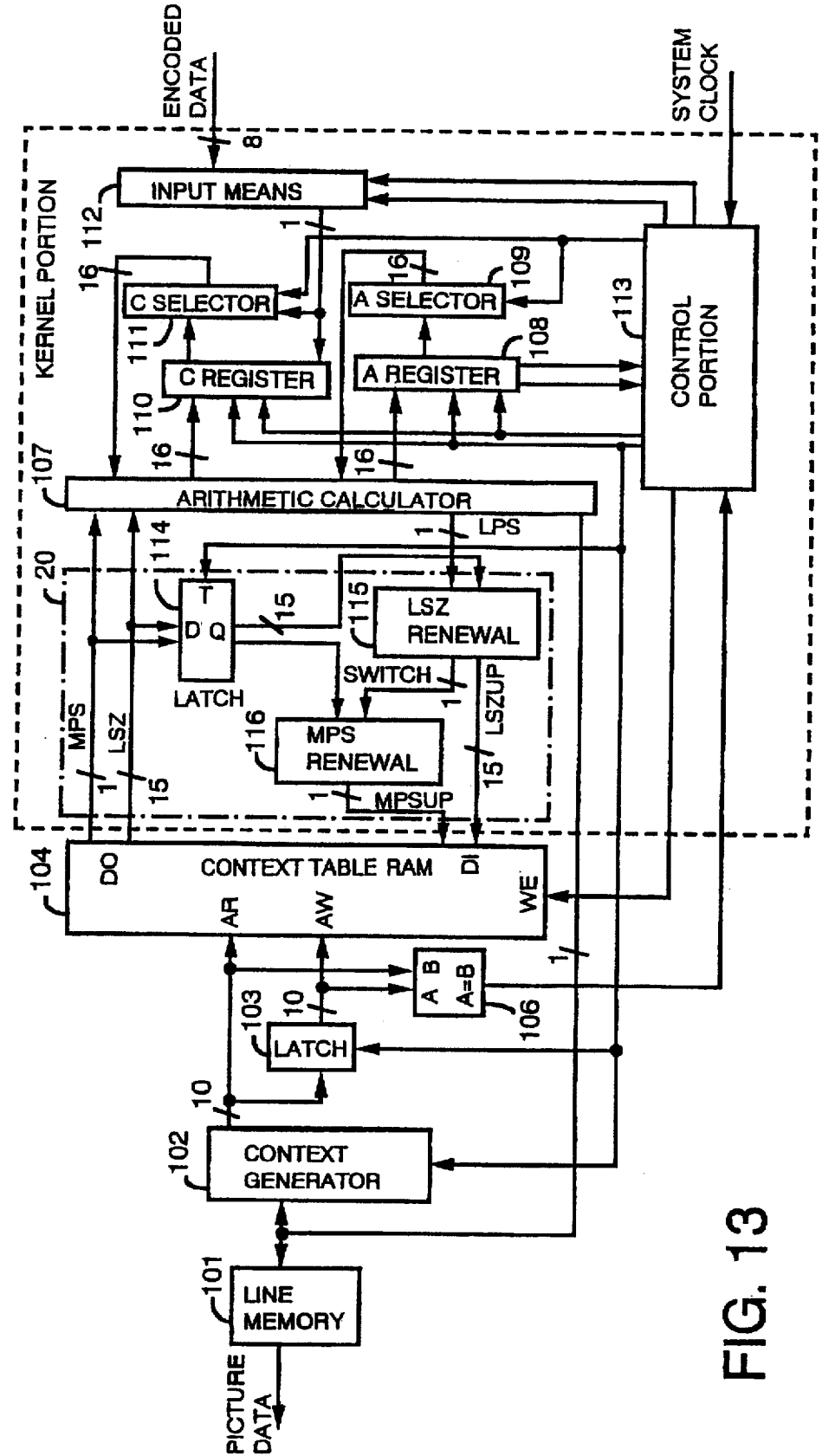
FIG. 13 is a block diagram showing a second embodiment of the present invention.

FIG. 13 shows a digital signal decoding device integrated into a semiconductor integrated circuit which is applied, for example, to a facsimile apparatus of a second embodiment of the present invention. In FIG. 13, a storage device 101 stores a plurality of lines of decoded picture data for every one line, and outputs the stored picture data consisted of digital signals to a picture processing circuit which supplies the stored picture data as picture information (character information, pictorial information, pallet picture information) to a display device such as a printer apparatus. The storage device 101 comprises a plurality of line memories which are the same as the storage device 1 of the first embodiment.

A context generator 102 in FIG. 13 extracts a reference pixel according to a template model from the picture data inputted from the above-mentioned storage device 101. It is the same as the context generator 2 in the above mentioned digital signal encoding device of the first embodiment. A context storage device 103 in FIG. 13 comprises a latch circuit where a context for the target decoding pixel which is received from the above-context generator 102 is temporarily stored in synchronization with the clock of the pixel processing clock signal, and the temporarily stored context is outputted as a context for the target decoding pixel in synchronization with the next clock of the above-mentioned pixel processing clock signal. The context storage device 103 is similar as the context storage device 3 in the above-mentioned digital signal encoding device of the first embodiment.

A context table storage device 104 of FIG. 13 comprises a read address input nodes AR for a plurality of addresses, a plurality of data output nodes DO, a plurality of a write address input nodes AW, a plurality of input nodes DI, a write-enable signal input node WE. The context table storage device 104 further comprises a context table storing portion. The context table storing portion stores and writes/ reads out a plurality bits of storing data including a prediction symbol MPS and an LSZ data which is a part of the probability estimating data and indicates a mismatching probability.

The context table storage device 4 reads out the storing data stored in the context table storing portion based on the context which is received into the read address input nodes AR from the above-mentioned context generator 102, and then outputs from the data output nodes DO. Receiving a renewal clock signal on the write-enable signal input node WE, the context table storage device writes a renewal data inputted from the data input nodes DI (rewrite the renewal data over previously stored data) in the context table storing portion based on the context which is received on the write address input nodes AW which is transmitted from the above-mentioned context storage device 103. The context table storage means 104 comprises a two port RAM and so on and similar to the context table storage means 4 in the above-mentioned digital signal encoding device of the first embodiment.

A context comparator 106 in FIG. 13 compares a context from the context generator 102 and the context from the context storage device 103. If the resultant shows the same, the context comparator 6 outputs "1". Otherwise, it outputs "0". The context comparator 106 is similar to the context comparator 6 in the above-mentioned digital signal encoding device.

Figure 14:
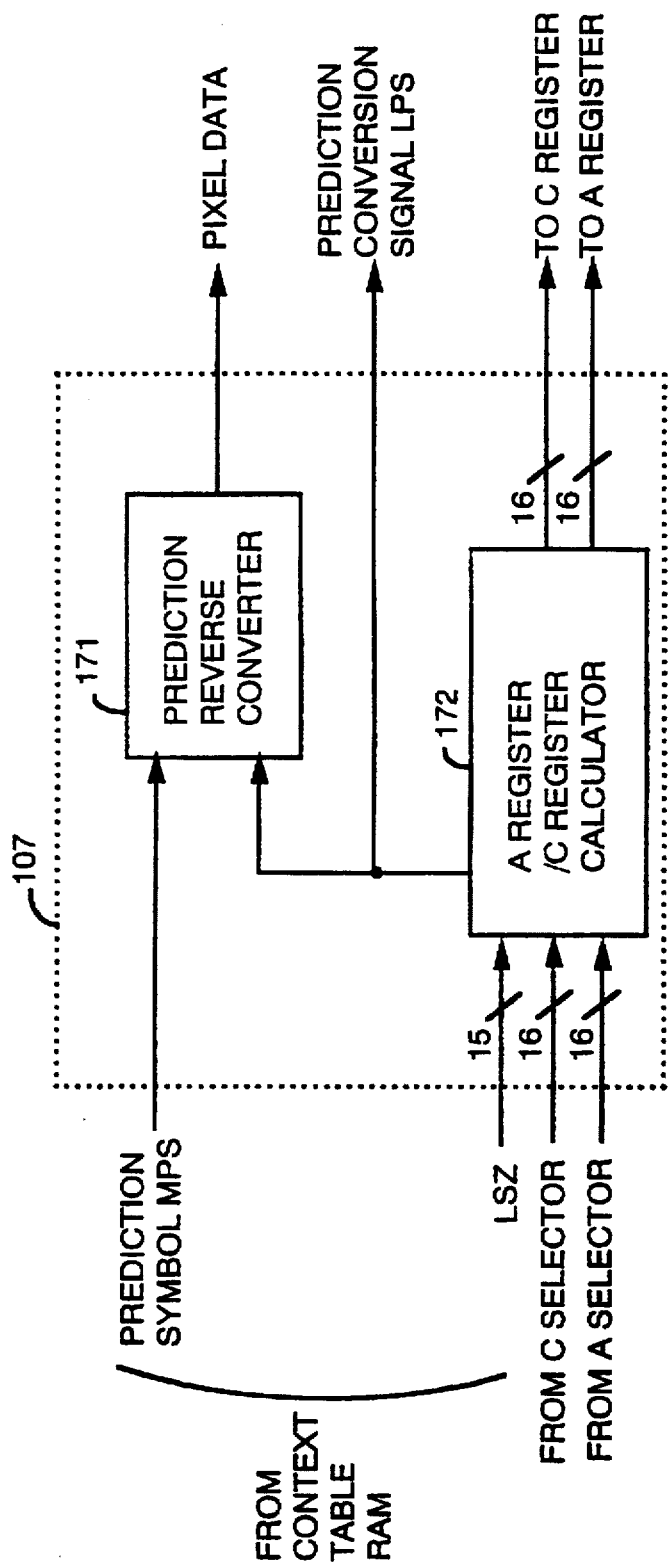
FIG. 14 is a block diagram showing an example of the arithmetic calculator 107 in the second and third embodiments of the present invention.

An arithmetic calculator 107 in FIG. 13 receives a storing data from the context table storage device 104, an A data which shows a size of the current coding interval for the pixel which immediately preceding target decoding pixel (hereinafter, immediately preceding A data), and a C data indicating the trailing bits of the decode stream for the pixel which immediately preceding target decoding pixel (hereinafter, immediately preceding C data). The arithmetic calculator 107 performs a predetermined arithmetic processing and outputs an A data which shows the size of the current coding interval for the target decoding pixel (hereinafter just referred to as A data) and a C data which shows the trailing bits of the decode stream for the target decoding pixel (hereinafter just referred to as C data). The arithmetic calculator 107 further outputs a picture data for the target decoding pixel to the above-mentioned storage device 101. The arithmetic calculator 107 further outputs a prediction conversion signal LPS indicating whether or not the equation (5) mentioned below is satisfied. A detailed configuration of the arithmetic calculator 107 is shown in FIG. 14.

The predetermined arithmetic processing for obtaining A data and C data, and for obtaining a prediction conversion signal LPS is described below.

$$C(k-1) < A(k-1) - LSZ(k) \tag{5}$$

When the equation (5) is satisfied (decoding as an MPS):

$$A(k) = A(k-1) - LSZ(k) \tag{6}$$

$$C(k) = C(k-1) \tag{7}$$

When the equation (5) is not satisfied (decoding as an LPS):

$$A(k) = LSZ(k) \tag{8}$$

$$C(k) = C(k-1) + \{A(k-1) - LSZ(k)\} \tag{9}$$

where, A (k) is an A data of the k-th target decoding pixel, A (k−1) is an A data of the (k−1)-th target decoding pixel, C (k) is a C data of the k-th target decoding pixel, C (k−1) is a C data of the (k−1)-th target decoding pixel, LSZ (k) is an LSZ data of a probability estimating data from the context table storage device 104 for the k-th target decoding pixel, k=1, 2, 3, .... The initial value A (0)=1.0 . . .0, and the initial value C (0), for example, is a decoded data consisted of 16 bits.

In FIG. 14, a picture data generator (prediction inverse conversion means) 171 receives a prediction symbol MPS of a storing data for the target decoding pixel from the context table storage device 104 and a prediction conversion signal LPS which shows whether the above-mentioned equation (5) is satisfied ("0", for example) or not ("1", for example). When the prediction conversion signal LPS matches with the prediction symbol MPS, the picture data generator 171 outputs a picture data, for example, "0" to the storage device 101. The picture data generator 171 outputs a picture data, for example, "1" to the storage device 101, when the prediction conversion signal LPS does not match with the prediction symbol MPS. The picture data generator 171 comprises a comparator such as an exclusive OR circuit, for example.

A calculator 172 in FIG. 14 receives an LSZ data of a storing data for the target coding pixel from the context table storage device 104, the immediately preceding A data and the immediately preceding C data, carries out the calculation according to the equations (5)–(9), and outputs a prediction conversion signal LPS to the picture data generator 171 and to a renewal data generating means which will be mentioned below, and an A data and a C data.

This calculator 172 comprises a prediction conversion signal generating portion receiving the LSZ data and the immediately preceding A data to output the prediction conversion signal LPS according to the equation (5), and an A data generating portion receiving the LSZ data and the immediately preceding A data and the prediction conversion signal LPS to output an A data, and a C data generating portion receiving the LSZ data, the immediately preceding A data, the immediately preceding C data and the prediction conversion signal LPS to output a C data.

Referring back to FIG. 13, an A register 108 receives an A data from the arithmetic calculator 107, the pixel processing clock signal and a renormalizing clock signal. In synchronization with the inputted pixel processing clock signal, the A register receives the A data from the arithmetic calculator 7 and latches them. In synchronization with the inputted renormalizing clock signal, the A register shifts-up the latched data by one bit and latches them again, and outputs them as the A data. The A register 108 outputs a renormalize (normalization) signal for performing a normalization processing (extension of areas) and a last renormalizing signal indicating that normalization will be completed after one more normalization processing. A detailed configuration of the A register 108 is shown in FIG. 15.

Figure 15:
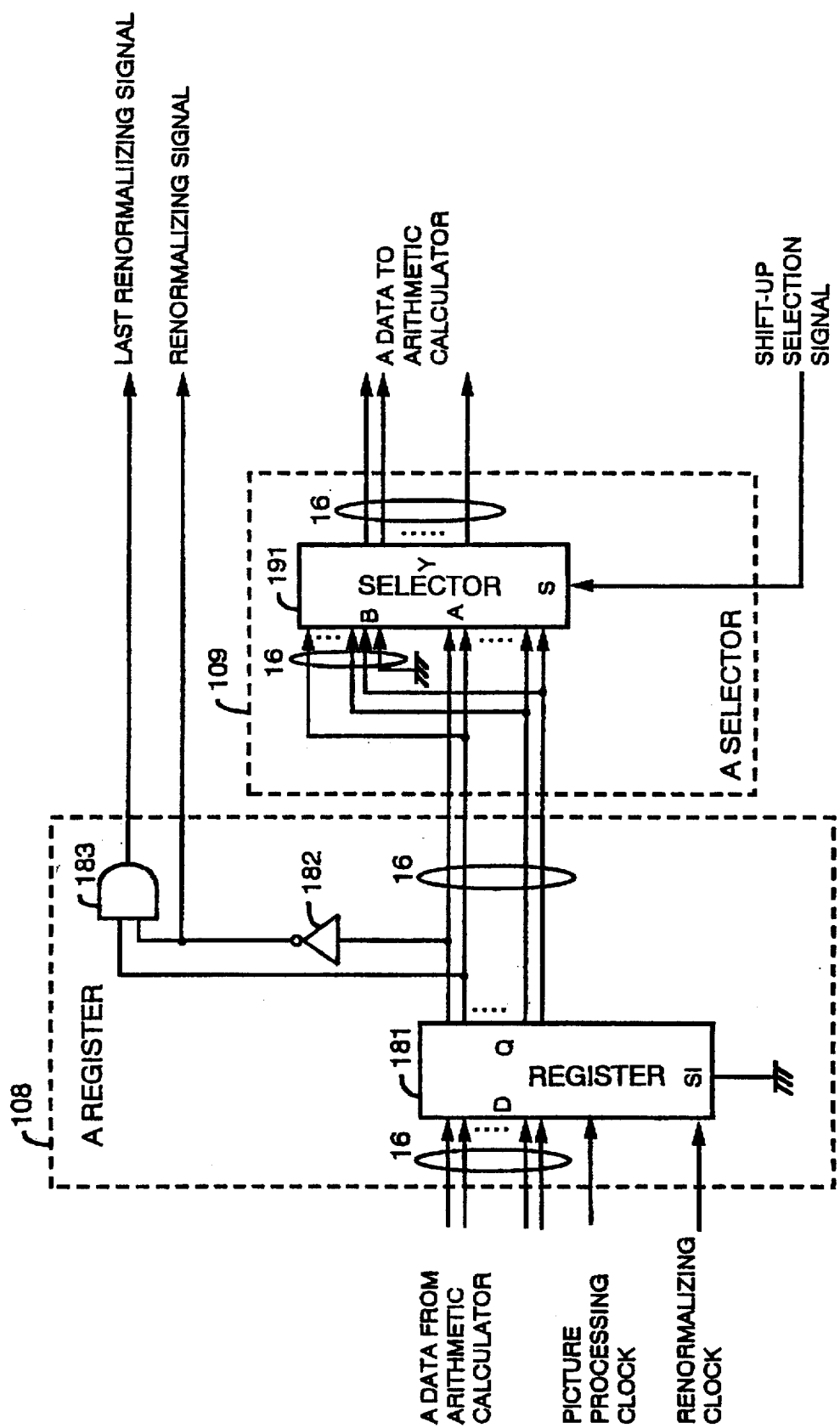
FIG. 15 is a block diagram showing an example of the A register 108 and the A selector 109 in the second and third embodiments of the present invention.

In FIG. 15, an A register portion 181 takes-in the A data from the arithmetic calculator 107 and latches it therein in synchronization with the inputted pixel processing clock signal. In synchronization with the inputted renormalizing clock signal, the register portion 181 shifts-up the data latched by one bit, and latches them again, and outputs them as the A data. If the A data comprises 16 bits, for example, the register portion 181 comprises a shift register, which can perform the data writing (data renewal) for every bit in synchronization with the pixel processing clock signal. The shift register performs data writing (data renewal), each in synchronization with the pixel processing clock signal. Then, the shift register shifts-up the contents by one bit in synchronization with a renormalizing clock signal. In other words, the least significant bit is connected to the earth electric potential node and stores "0", while the contents in the remaining bits are renewed to the latch contents of the immediately preceding stage. At initial state, the contents stored in the most significant latch portion is set to "1",while those in the remaining of 15 latch portions are set to "0".

A renormalization generator 182 in FIG. 15 receives a most significant bit signal (hereinafter, referred to as MSB signal) of the A data which is outputted from the register portion 181. Based on the received MSB signal, the renormalization generator 182 outputs a renormalizing signal, indicating "prosecuting a normalization processing", when the size of the current coding interval becomes less than 50%, namely, the A data becomes less than 0.5 in decimal number. The renormalization generator 182 comprises an inverter circuit which outputs "1", for example, indicating "prosecuting a normalization processing", if the MSB signal is "0" in FIG. 15

A last renormalization generator 183 in FIG. 15 receives a signal (hereinafter, referred to as the MSB-1 signal) which is placed one bit lower from the most significant bit of the A data outputted from the register portion 181 and a renormalizing signal from the renormalization generator 182. When the renormalzing signal from the renormalization generator 182 indicates "prosecuting a normalization processing", and the MSB-1 signal is "1", for example, the last renormalization generator 183 outputs a last renormalizing signal. The last renormalization generator 183 comprises an AND circuit. When the MSB signal is "0" and the MSB-1 signal is "1",the AND circuit outputs "1" which indicates "the normalization processing will be completed by one more normalization processing".

Referring back to FIG. 13, an A selector 109 receives the A data from the A register 108 and a shift-up selection signal generated based on the last renormalizing signal. When the shift-up selection signal indicates "shift-up", the A selector 109 outputs a data which 108 to the arithmetic calculator 107 as an A data which shows the size of the current coding interval of the pixels immediately preceding the target decoding pixel (an immediately preceding A data). Otherwise, the A selector 109 outputs the A data from the A register 108 as it is to the arithmetic calculator 107.

The A selector 109, for example, as shown in FIG. 15, comprises a selector 191. The selector 191 has one input terminal A where the A data is received directly from the A register 108, and the other input terminal B where the A data from the A register 108 is received after the contents of the A data are shifted-up by one bit to the MSB side and its least significant bit is connected to an earth electric potential node. The selector 191 selects either one of the input terminal A and the input terminal B according to the shift-up selection signal, and outputs it to the output terminal Y.

A C register 110 in FIG. 13 receives a C data from the arithmetic calculator 107, the pixel processing clock signal, a renormalizing clock signal, and an encoded data. In synchronization with the inputted pixel processing clock signal, the C register 110 receives the C data from the arithmetic calculator 107 and latches them. In synchronization with the inputted renormalizing clock signal, the C register takes in 1-bit data to be encoded, and shifts-up the latched data by one bit and latches them again, and outputs them as the C data.

Figure 16:
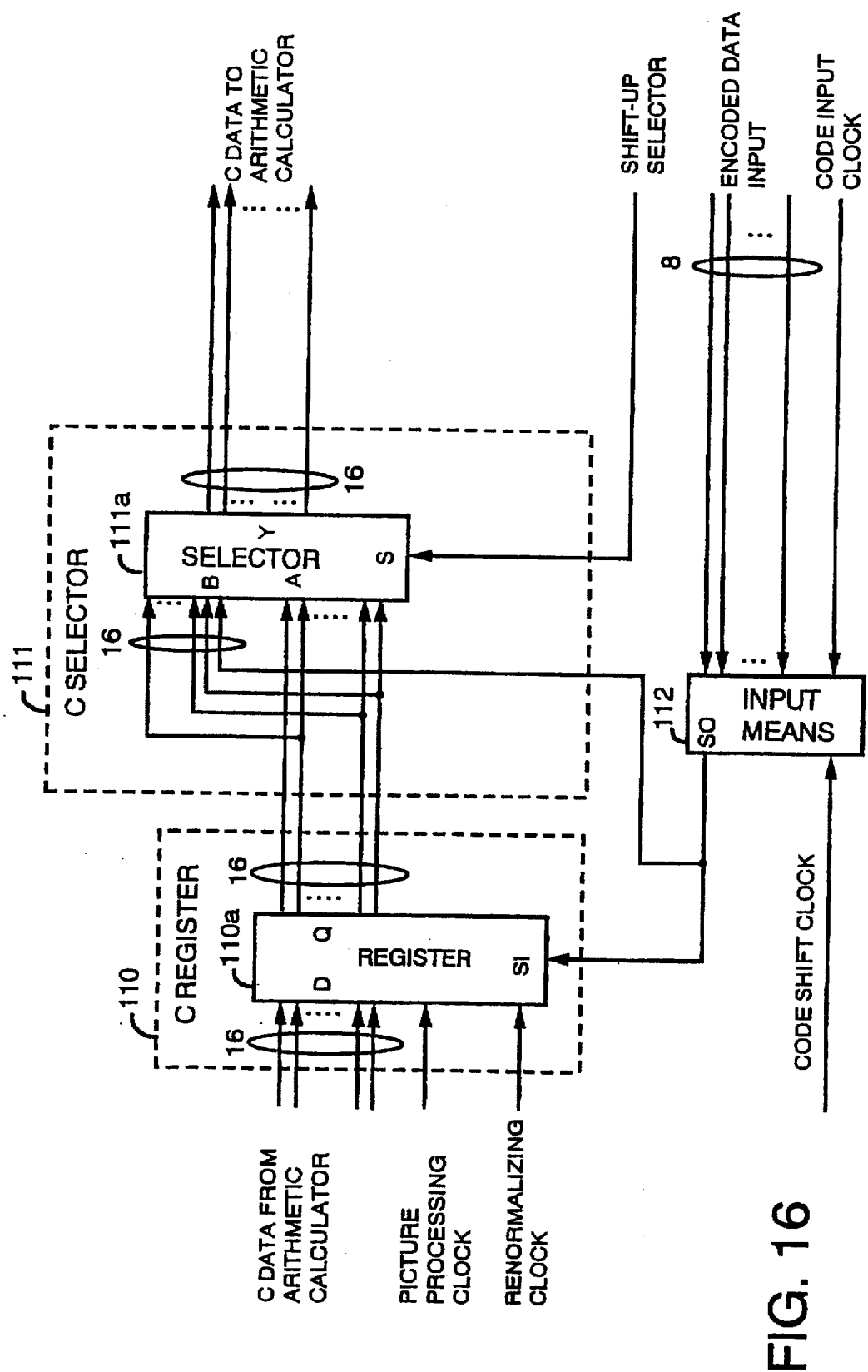
FIG. 16 is a block diagram showing an example of the C register 110 and the C selector 111 in the second, and third embodiments of the present invention.

For example, as shown in FIG. 16, the C register 110 takes-in the C data from the arithmetic calculator 107 and latches in synchronization with the inputted pixel processing clock signal. In synchronization with the inputted renormalizing clock signal, the C register 110 takes-in 1-bit data to be encoded, and shifts-up the latched data by one bit, latches it again and then outputs it as a C data.

The C register 110 comprises a shift register 110a which comprises 16 latch portions, if the C data comprises, for example, 16 bits. The shift register 110a performs data writing (data renewal), each in synchronization with the pixel processing clock signal. The shift register 110a shifts-up the contents one bit in synchronization with a renormalizing clock signal. In other words, one bit of the decoded data is inputted to the least significant bit and stored therein, while in the remaining of the bits, the contents latched in each bit is shifted-up by one bit and written on therein. At initial state, the stored contents in the 16 latch portions are the inputted 16 bits decoded data.

A C selector 111 receives a C data from the C register 110, the shift-up selection signal, and a data to be encoded. The C selector 111 outputs a data which is shifted-up by one bit from the C data (i.e. the 1-bit data to be encoded which is taken-in in the least significant bit), when the shift-up selection signal indicates "shift-up", and outputs a data as it is when the shift-up selection signal does not indicate "shift-up", to the arithmetic calculator 107 as a C data showing a decode word for the pixel immediately preceding target decoding pixel (an immediately preceding C data).

Otherwise, the C data as transmitted from the C register 110 is given to the arithmetic calculator 107 as an immediately preceding C data mentioned in the above, and outputted to the arithmetic calculator 107 as an encoded data for transmitting a predetermined number of most significant bits.

The C selector 111, as shown in FIG. 16, comprises, for example, a selector 111a comprises a selector 111a. The selector 111a has one input terminal A where the C data is received directly from the C register 110, and the other input terminal B where the C data from the C register 110 is received after the contents of this C data are shifted-up by one bit to the MSB side and one bit of the data to be decoded is inputted to the least significant bit of this C data. The selector 111a selects either one of the input terminal A and the input terminal B according to the shift-up selection signal, and outputs it to the output terminal Y.

An input means 112 receives an encoded data and a code input clock signal, and code shift clock signal. In synchronization with the inputted code input clock signal, the input means 112 latches the encoded data therein. In synchronization with the inputted code shift clock signal, the input means 112 shifts-up the encoded data latched therein, and outputs the contents of the most significant bit of the latched encoded data to the C register 110 and the C selector 111.

For example, as shown in FIG. 16, if the inputted encoded data comprises eight bits, the input means 112 has eight latch portions. The eight latch portions take-in an encoded data consisting eight bits in parallel in synchronization with the inputted code input clock signal. The input means 112, which comprises a shift register and so on, outputs in serial the encoded data which the input means takes-in parallel in synchronization with the code shift clock signal.

A control portion 113 in FIG. 13 receives a system clock signal, an identical context signal from the context comparator 106, a renormalizing signal and a last renormalizing signal from the A register 108. The control portion 113 then outputs a pixel processing clock signal to the context generator 102, the context storage device 103, the A register 108 and the C register 110. The control portion 113 further outputs a renewal clock to the context table storage device 104 and a renormalizing clock signal to the A register 108 and the C register 110. The control portion 113 further outputs a shift-up selection signal to the A selector 109 and the C selector 111, and a code input lock signal and the code shift signal to the input means 112.

The pixel processing clock signal from the control portion 113 is a signal showing a timing for processing the data for the target coding pixel. The pixel processing clock signal is generated by the control portion 113 according to a system clock signal, a renormalizing signal, a last renormalizing signal and an identical context signal and synchronizes with a system clock signal. More specifically, the pixel processing clock signal from the control portion 113 maintains either one of the levels, when the renormalizing signal indicates "prosecute a normalization processing", and the last renormalizing signal does not indicate "normalization will be completed by the last one processing". The pixel processing clock signal from the control portion 113 also maintains either one of the levels, when the renormalizing signal indicates "prosecute a normalization processing", the last renormalizing signal indicates "normalization will be completed by the last one processing", and the identical context signal indicates "identical context". Otherwise, the pixel processing clock signal from the control portion 113 becomes the same signal as the system clock signal.

For example, as shown in FIG. 17B, when the renormalizing signal (FIG. 17E) is "1" indicating "prosecute a normalization processing", and the last renormalizing signal (FIG. 17F) is "0", not indicating "normalization will be completed by the last one processing", (where "1" indicates "H" level and "0" indicates "V" level in this second embodiment in the below, except some specific cases), the pixel processing clock signal from the control portion 113 becomes "H" level regardless of the system clock.

When the renormalizing signal is "1" indicating "prosecute a normalization processing", the last renormalizing signal is "1" indicating "normalization will be completed by the last one processing", and the identical context signal (FIG. 17D) is "1" indicating "identical context", the pixel processing clock signal from the control portion 113 becomes "H" level regardless of the system clock. Otherwise, the pixel processing clock signal from the control portion 113 becomes the same signal as the system clock signal.

The renormalizing signal shown in FIG. 17E is generated from the renormalizing signal from the A register 108 in synchronization with the system clock signal. It may be generated in the control portion 113.

For example, based on the renormalizing signal from the A register 108, the renormalizing signal of FIG. 17E is generated so that it synchronizes with the rising edge of the system clock. In other words, the renormalizing signal of FIG. 17E is generated in order to decide whether the target decoding pixel is normalized or not at the subsequent timing of the system clock used when the context generator 102 takes-in a context for the target decoding pixel.

Similarly, the last renormalizing signal shown in FIG. 17F is generated from the last renormalizing signal from the A register 108 in synchronization with the system clock signal. It may be generated in the control portion 113. For example, based on the last renormalizing signal from the A register 108, the last renormalizing signal of FIG. 17(f) is generated so that it synchronizes with the rising edge of the system clock. In other words, the last renormalizing signal of FIG. 17F is generated in order to specify the last normalizing signal at the subsequent timing of the system clock used when the context generator 102 takes-in a context for the target decoding pixel.

The shift-up selection signal from the control portion 113 is generated in the control portion 113 according to the last renormalizing signal from the A register 108, the system clock signal and the identical context signal and synchronizes with the system clock signal. More specifically, when the last renormalizing signal shown in FIG. 17F synchronized with the system clock signal indicates "normalization will be completed by the last one processing", and the identical context signal does not indicates "identical context", the shift-up selection signal indicates a "shift-up" state. Otherwise, the shift-up selection signal does not indicates the "shift-up" state.

For example, as shown in FIG. 17I, when the last renormalizing signal shown in FIG. 17F is "1", indicating "normalization will be completed by the last one processing", and the identical context signal shown in FIG. 17D is "0" which does not indicates "identical context", the shift-up selection signal becomes "1" indicating a "shift-up" state. Otherwise, the shift-up selection signal becomes "0" which does not indicates the "shift-up" state.

The renewal clock signal from the control portion 113 is a signal showing a timing signal for renewing a storing data stored in the context table storage device 104. The renewal clock signal from the control portion 113 is generated in the control portion 113 according to a system clock signal, a pixel processing clock signal and a renormalizing signal.

The renewal clock signal synchronizes with a system clock signal, and more specifically, it becomes the system clock signal when the renormalizing signal indicates "prosecute a normalization processing" in the next cycle of the system clock signal after the appearance of the pixel processing clock signal. Otherwise, the renewal clock signal maintains either one of the levels.

For example, as shown in FIG. 17G, when the rising of the pixel processing clock signal is detected and the renormalizing signal shown in FIG. 17E is "1" indicating "prosecute a normalization processing" at the rising of the system clock signal after the rising of the pixel processing clock signal is detected, the renewal clock signal becomes the same clock as that of the system clock. Otherwise, the renewal clock maintains "H" level, for example, regardless of the system clock.

The renormalizing clock signal from the control portion 113 is a signal for shifting up the contents stored in the register portion 181 of the A register 108 and the C register 110. The renormalizing clock signal from the control portion 113 is generated in the control portion 113 according to a renormalizing signal and a last renormalizing signal from the A register 108, a system clock signal and an identical context signal and synchronizes with the system clock signal.

More specifically, as shown in FIG. 17H, when the renormalizing signal indicates "prosecute a normalization processing", and the last renormalizing signal does not indicate "normalization will be completed by the last one processing", the renormalizing clock signal becomes the same clock as the system clock signal ("set"). When the renormalizing signal indicates "prosecute a normalization processing", the last renormalizing signal indicates "normalization will be completed by the last one processing", and the identical context signal indicates "identical context", the renormalizing clock signal becomes the same clock as the system clock signal ("set"). Otherwise, the renormalizing clock signal becomes in a clock halt state (maintaining either one of the levels or "reset").

When the pixel processing clock signal outputs a clock synchronized with the system clock signal, the renormalizing clock signal maintains either one of the levels, and when the pixel processing clock signal maintains either one of the levels, the renormalizing clock signal outputs a clock synchronized with the system clock signal.

The code output clock signal from the control portion 113 shows a timing signal for taking-in the encoded data transmitted to the input means 112. The code output clock signal is generated in the control portion 113 according to a renormalizing signal from the A register 108 and a system clock signal. More specifically, when the renormalizing signal indicates "prosecute a normalization processing", the code output clock signal becomes the same clock signal as the system clock signal. Otherwise, the code output clock signal becomes a pulse, when a predetermined number of clocks of the CT count clock signal is counted, according to a CT count clock signal maintaining either one of the levels (FIG. 17J).

For example, as shown in FIG. 17K, when the renormalizing signal is "1" indicating "prosecute a normalization processing", the code output clock signal firstly generates a count clock signal (for example, FIG. 17J) which becomes a system clock signal. When the number of the clocks of this count clock signal reaches eight, the code output clock signal becomes "L" level, for example, at the next cycle of the system clock signal.

The code shift clock signal from the control portion 113 shows a timing signal for shifting up the encoded data latched in the input means 112 by one bit. The control portion 113 generates a code shift clock signal from a renormalizing signal and a system clock signal from the A register 108. More specifically, according to the CT count clock signal (FIG. 17J) and the code input clock signal (FIG. 17K), the code shift clock signal becomes the same clock signal as the CT count clock signal (for example, FIG. 17M), when the code input clock signal does not output any clock, namely, at "H" level in this case.

A data storage device 114 in FIG. 13 comprises a LATCH circuit for temporarily storing a storing data (a prediction symbol MPS and LSZ data) from the context table storage device 104 in synchronization with the pixel processing clock signals from the control portion 113, and outputting the stored storing data in synchronization with the next pixel processing clock signal. The data storage device 114 sets the timing to write in a renewal data to the context table storage device 104, and it is of the same kind as the data storage device 14 of the first embodiment.

An LSZ renewal logic circuit (LSZ renewal means) 115 receives an LSZ data of a storing data from the data storage device 114, a prediction conversion signal LPS from the arithmetic calculator 107 to output an LSZUP data indicating a mismatching probability of the renewal data for the context table storage device 104, and a SWITCH data instructing whether or not to invert a prediction symbol MPS of the storing data from the context table storage device 104. FIG. 9 is a truth table showing the relationship between an input (LSZ data and a prediction conversion signal LPS) and an output (LSZUP data and SWITCH signal) in the LSZ renewal logic circuit. The LSZ renewal logic circuit comprises a logic circuit (GATE circuit) of a P channel MOS transistor and an N channel MOS transistor, and it is of the same kind as the LSZ renewal logic circuit 15 of the first embodiment.

An MPS renewal logic circuit (MPS renewal means) 116 in FIG. 13 receives a SWITCH data from the LSZ renewal logic circuit 115, a prediction symbol of the storing data from the data storage device 114. The MPS renewal logic circuit 116, comprising an exclusive OR circuit, outputs the value of the received prediction symbol MPS when the received SWITCH data is "0", and outputs the inverted value of the received prediction symbol MPS when the received SWITCH data is "1", as a prediction symbol MPSUP of the renewal data for the context table storage device 104. The MPS renewal logic circuit 116 is of the same kind as the MPS renewal logic circuit 16 of the first embodiment.

The data storage device 114, the LSZ renewal logic circuit 115, and the MPS renewal logic circuit 116 constitute a renewal data generating means to output 16-bit renewal data to the context table storage device 104 according to a storing data read out from the context table storage device 104 and a prediction conversion signal LPS from the arithmetic calculator. The 16-bit renewal data comprises 1-bit prediction symbol MPS (MPSUP) and LSZ (LSZUP) data of 15 bits for example, which is included in a probability estimating data and indicates a mismatching probability.

A kernel portion comprises the arithmetic calculator 107, the A register 108, the A selector 109, the C register 110, the C selector 111 and the renewal data generating means of the data storage device 114, the LSZ renewal logic circuit 115 and the MPS renewal logic circuit 116.

An operation of a digital signal decoding device having the above-mentioned configuration is explained below.

In the same manner as the digital signal encoding device in the first embodiment, the operating mode of the digital signal decoding device is also divided into 5 modes, I–V, as shown in FIG. 17 according to the transmitted encoded data. The operation in each mode is explained in the following using the waveforms shown in FIG. 17.

|Mode I|

FIG. 17A shows periods $T_1$ and $T_2$ of the system clock signal which are examples of major signal waveforms in the mode I. In the period $T_1$, a context for the target decoding pixel is not identical with the context for a pixel which is immediately subsequent to the target decoding pixel. In the period $T_2$, a context for the target decoding pixel is identical with the context for a pixel which is immediately subsequent to the target decoding pixel.

First, it is assumed that a decoding processing has been done for the first target decoding pixel during the period $T_1$ in the mode I. In the period $T_1$, a pixel processing clock signal is raised by the rise of the system clock. Receiving the rise of the pixel processing clock signal, the context generator 102 reads a context for the first target coding pixel from the storage device 101 and outputs the read context to the read address input nodes AR of the context table storage device 104.

The code 1 in FIG. 17C indicates that a context has been generated by the context generator 102 for the first target decoding pixel.

In the context table storage device 104, a 16-bit storing data (a prediction symbol MPS and LSZ data) is read out according to the context inputted into the read address input nodes AR, and outputted from the data output nodes DO to the arithmetic calculator 107.

In the arithmetic calculator 107 (ref. FIG. 14), the calculator 172 generates a prediction conversion signal LPS from the LSZ data of the storing data for the first target decoding pixel from the context table storage device 104, the A data of the target decoding pixel which precedes the first target decoding pixel, and the C data of the target decoding pixel which precedes the first target decoding pixel, according to the above-mentioned equation (5).

At initial state, the A data comprises "1" in its most significant bit and "0" in the remaining bits. The contents of the C data is the same as the transmitted encoded data which comprises 16 bits.

When the prediction conversion signal LPS from the calculator 172 matches with the prediction symbol MPS of the storing data for the first target decoding pixel from the context table storage device 104, the picture data generator 171 generates picture data showing, for example, "1" and when the prediction conversion signal LPS does not match with the prediction symbol MPS, the picture data generator 171 generates the picture data showing, for example, "0" in the storage device 101. The generated picture data is stored in the storage device as a picture data of a first target decoding pixel.

On the other hand, when the prediction conversion signal LPS shows that the equation (5) is satisfied, the calculator 172 calculates an A data from an LSZ data of the storing data for the first target decoding pixel from the context table storage device 104 and the A data of the target decoding pixel which precedes the first target decoding pixel, according to the above-mentioned equation (6). The calculated A data is outputted to the A register 108. The C data of the target decoding pixel which precedes the first target decoding pixel is outputted to the C register 110, according to the above-mentioned equation (7).

When the prediction conversion signal LPS shows that the equation (5) is not satisfied, the calculator 172 outputs the LSZ data of the storing data for the first target decoding pixel from the context table storage device 104 to the A register 108 as an A data, according to the above-mentioned equation (8). The calculator 172 calculates a C data from the LSZ data of the storing data for the first target decoding pixel from the context table storage device 104 and both A and C data of the target decoding pixel which precedes the first target decoding pixel, according to the above-mentioned equation (9). The calculated C data is outputted to the C register 110.

The A data and the C data calculated by the calculator 172 in this way are inputted to the register portion 181 of the A register 108 (ref. FIG. 15) and to the C register 110 (ref. FIG. 16) respectively, and stored (the stored contents in each register has been renewed) therein (on the rise of a pixel processing clock signal from the control portion 113 (at period $T_2$).

The A data which is stored in the register portion 181 of the A register 108 at this stage has a value larger than 0.5 in decimal number, since no renormalize processing is required in the mode I. Accordingly, the value of the most significant bit is "1", and a renormalizing signal "0" indicating "not-prosecute a normalization processing" is outputted from renormalization generator 182 in the A register 108. The last renormalization generator 183 in the A register 108 then outputs a last renormalizing signal "0".

On the other hand, receiving a context of the second pixel from the context generator 102 and a context of the first target decoding pixel from the context storage device 103, the context comparator 106 outputs an "L" level identical context signal indicating that "the contexts do not match with each other" in the period $T_2$ as shown in FIG. 17D.

Accordingly, during this period $T_2$, the mode is recognized. Here, it is recognized that no renormalization is performed, and the contexts do not match with each other and the mode I in the period $T_1$ has been completed for the period $T_1$.

Since recognizing the renormalization is not required in the mode I in the period $T_1$ during the period $T_2$, operations from a context generation to the arithmetic calculation are carried out during the mode I in the next period of $T_2$.

Accordingly, receiving a renormalizing signal from the renormalization generator 182 of the A register 108, the control portion 113 outputs the renewal clock signal and a renormalizing clock signal, both at "H" level, in the period $T_2$ as shown in FIG. FIG. 17G and H respectively, because the received renormalizing signal is at "L" level.

Receiving an "H" level renewal clock signal, the context table storage device 104 keeps its stored contents intact. Receiving an "H" level renormalizing clock signal, the register portion 181 of the A register 108 and the C register 110 does not shift-up the contents stored therein, and keep latching the received contents.

The code 1 in FIG. 17L indicates that the first target decoding pixels are latched to the A register 108 and the C register 110. Since the control portion 113 maintains the renormalizing clock signal at "H" level, the CT count clock signal is maintained at "H" level too. The code input clock signal and the code shift clock from the control portion 113 therefore, remains "H" level. Accordingly, the input means 112 neither takes-in an encoded data nor shifts-up the encoded data latched therein by one bit.

Accordingly, in the mode I in this period $T_1$, it takes only one clock (a cycle) of the system clock to carry out the procedures from a context generation to the arithmetic calculation for the first target decoding pixel. The A data and the C data calculated by the arithmetic calculator 107 are stored in the A register 108 and the C register 110 respectively, and the storing data in the context table storage device 104 are not renewed. As a result, substantial operating time in the period $T_1$ in the mode I takes no more than one system clock. Moreover, the substantial time required for the one clock equals to the sum of the accessing time of the context table storage device 104 and the accessing time of the arithmetic calculator 107. Since the cycle of the system clock is shortened, this speeds up the processing.

An operation in the mode I in the period $T_2$ is explained below. It is assumed that the decoding processing has been completed for the second target decoding pixel in the operation in the mode I in the period $T_2$. The mode I in the period $T_2$ is different from the mode I in the period $T_1$ mentioned in the above only in that the context for the target decoding pixel does not match or match with the context for the subsequent target decoding pixel. The operation is the same as the mode I in the period $T_1$.

Accordingly, it takes only one clock (a cycle) of the system clock to carry out the procedures from the context generation by the context generator 102 to the arithmetic calculation by the arithmetic calculator 107 for the second target decoding pixel. The A data and the C data calculated by the arithmetic calculator 107 are stored in the A register 108 and the C register 110 respectively. The storing data in the context table storage device 104 are not renewed. Accordingly, the input means 112 neither takes-in an encoded data nor shifts-up the encoded data latched therein by one bit.

As a result, the substantial operation is carried out only within one system clockin the mode I in the period $T_2$. Moreover, the substantial time required for the one clock equals to the sum of the accessing time of the context table storage device 104 and the accessing time of the arithmetic calculator 107. Since the cycle of the system clock is shortened, this speeds up the processing.

According to the above equation (5), the picture data, namely the result calculated by the arithmetic calculator 107, indicates, for example, "1", when the prediction symbol MPS of the storing data for the second target decoding pixel from the context table storage device 104 matches with the prediction conversion signal LPS which is generated from the LSZ data of the storing data for the second target decoding pixel from the context table storage device 104, the A data for the first target decoding pixel and the C data for the first target decoding pixel. When the prediction conversion signal LPS does not match with the prediction symbol MPS, the picture data indicates, for example, "0". This picture data, namely the result calculated by the arithmetic calculator 107, is stored as a picture data for the second target decoding pixel.

In the same manner as the recognition of the mode I in the period $T_1$, the mode I in the period $T_2$ is also recognized during the period $T_3$, namely, the next clock following the clock in which the context generation is performed. By recognizing that no renormalization is performed and the contexts match with each other, the operation is performed from the context generation to the arithmetic calculation in the next mode, namely, the mode II in the period $T_3$.

[mode II]

FIG. 17A shows an example of each major signal waveform in the mode II in the period $T_3$ of the system clock signal.

First, it is assumed that an decoding processing has been done for the third target decoding pixel in the mode II in the period $T_3$. In the period $T_3$, a pixel processing clock signal is raised by the rise of the system clock. Receiving the rise of the pixel processing clock signal, the context generator 2 reads a context for the third target decoding pixel from the storage device 101 and outputs the read context to the read address input nodes AR of the context table storage device 4. The code 3 in FIG. 17C indicates that a context has been generated by the context generator 102 for the third target decoding pixel.

In the context table storage device 4, the 16-bit storing data (prediction symbol MPS and LSZ data) is read out according to the context inputted into the read address input nodes AR, and outputted from the data output nodes DO to the arithmetic calculator 107.

In the arithmetic calculator 107 (ref. FIG. 14), a prediction conversion signal LPS is generated by the calculator 172 from the LSZ data of the storing data for the third target decoding pixel from the context table storage device 104, the A data of the second target decoding pixel, and the C data of the second target decoding pixel according to the above-mentioned equation (5).

When the prediction conversion signal LPS form the calculator 172 matches with the prediction symbol MPS of the storing data for the third target decoding pixel, the picture data generator 171 outputs the picture data indicating, for example, "1", to the storage device 101 as the picture data for the third target decoding pixel. When the prediction conversion signal LPS does not match with the prediction symbol MPS, the picture data generator 171 outputs the picture data indicating, for example, "0" to the storage device 101 as the picture data for the third target decoding pixel. The storage device 101 stores this picture data.

On the other hand, when the prediction conversion signal LPS shows that the equation (5) is satisfied, the calculator 172 calculates an A data according to an LSZ data of the storing data for the third target decoding pixel from the context table storage device 104 and the A data of the second target decoding pixel, according to the equation (6). The calculated A data is then outputted to the A register 108. The C data of the second target decoding pixel is outputted to the C register 110 according to the above-mentioned equation (7).

When prediction conversion signal LPS shows that the equation (5) is not satisfied, the calculator 172 outputs the LSZ data of the storing data for the third target decoding pixel from the context table storage device 104 to the A register 108 as an A data, according to the above-mentioned equation (8). The calculator 172 calculates a C data from the LSZ data of the storing data for the third target decoding pixel from the context table storage device 104 and both A and C data of the second target decoding pixel, according to the above-mentioned equation (9). The calculated C data is outputted to the C register 110.

The A data and the C data calculated by the calculator 172 in this way are inputted to the register portion 181 of the A register 108 (ref. FIG. 15) and to the C register 110 (ref. FIG. 16) respectively, and stored (the stored contents in each register has been renewed) therein on the rise of a pixel processing clock signal from the control portion 113 (at period $T_4$).

In the period $T_3$, since a renormalization processing is not required in the mode I in the period $T_2$, a renormalizing signal is at "L" level as shown in FIG. 17E, and a renewal clock signal and a renormalizing clock signal outputted from the control portion 113 are at "H" level as shown in, FIG. FIG. 17G and H, respectively.

Receiving an "H" level renewal clock signal, the context table storage device 104 keeps its stored contents without rewriting. Receiving an "H" level renormalizing clock signal, the register portion 181 of the A register 108 and the C register 110 shift up none of the contents stored therein, and keep them latched.

During the period $T_3$, since the control portion 113 maintains the renormalizing clock signal to "H" level, the CT count clock signal is maintained to "H" level too. The code input clock signal and the code shift clock signal from the control portion 113 therefore, remains "H" level. Accordingly, the input means 112 neither takes-in an encoded data nor shifts-up a data by one bit.

On the other hand, since one renormalization processing is required in the mode II, the A data calculated by the arithmetic calculator 107 and inputted in the register portion 181 of the A register 108 in the period $T_4$ has a value more than 0.25 and less than 0.5 in decimal number. Accordingly, the value of the most significant bit is "0", and the value which is one bit lower from the most significant bit is "1".

Accordingly, the renormalization generator 182 in the A register 108 outputs a renormalizing signal "1" indicating "prosecute a normalization processing", therefore, an "H" level renormalizing signal is obtained at the control portion 113 in the period $T_4$, as shown in FIG. 17E.

The last renormalization generator 183 in the A register 108 outputs a last renormalizing signal "1" indicating "normalization will be completed by the last one processing". An "H" level last renormalizing signal is obtained at the control portion 113 in the period $T_4$, as shown in FIG. 17F.

Receiving a context of the fourth target decoding pixel from the context generator 102 and a context of the third target decoding pixel from the context storage device 103, the context comparator 106 outputs an "L" level identical context signal indicating that "the contexts do not match with each other" during the period $T_4$ as shown in FIG. 17D.

Accordingly, the mode II is recognized in this period $T_4$ in which the contexts are not identical and one renormalization processing has to be performed.

By this recognition, a renormalization processing is performed in the period $T_4$ shown in FIG. 17. In other words, the storing data in the context table storage device 104 is renewed, and the A data in the A register 108 and the C data in the C register 110 are respectively shifted-up by one bit.

In this second embodiment, the context table storage device 104 comprises a two port RAM, in which the stored contents can be read out and written on(renewed) within one clock of the system clock. Also in this second embodiment, when the A selector 109 and the C selector 111 receive the "H" level in the shift-up selection signal, the A selector 109 and the C selector 111 respectively selects and outputs the data obtained by shifting up the A data and the C data latched in the A register 108 and in the C register 110 by one bit, respectively. Accordingly, the renormalization processing can be carried out in the first clock of the system clock in which the decoding processing for the next target decoding pixel is performed, in concretely, in the period $T_4$ in the mode III shown in FIG. 17. This renormalization processing will be explained more in detail in the next explanation on the operation of the mode III.

Accordingly, in this mode II, it takes only one clock (a cycle) of the system clock to carry out the procedures from a context generation to the arithmetic calculation for the third target decoding pixel. The A data and the C data calculated by the arithmetic calculator 107 are stored in the A register 108 and the C register 110 respectively. The renormalization processing is performed in the first clock of the system clock in which a decoding processing for the next target decoding pixel is performed. As a result, substantial operation in the mode II is carried out only within one system clock. Moreover, the substantial time required for the one clock equals to the sum of the accessing time of the context table storage device 104 and the accessing time of the arithmetic calculator 107. Since the cycle of the system clock is shortened, this speeds up the processing.

|mode III|

FIG. 17A shows periods $T_4$–$T_6$ of the system clock signal which are examples of major signal waveforms in the mode III (it is assumed that the number of the renormalization processing is three).

First, it is assumed that a decoding processing has been done for the fourth target decoding pixel during the period $T_4$ in the mode III. In the period $T_4$, a pixel processing clock signal is raised by the rise of the system clock. Receiving the rise of the pixel processing clock signal, the context generator 102 reads the contexts for the fourth target decoding pixel from the storage device 101 and outputs the read context to the read address input nodes AR in the context table storage device 104. The code 4 in FIG. 17C indicates that a context has been generated by the context generator 102 for the fourth target decoding pixel.

In the context table storage device 4, the 16-bit storing data (prediction symbol MPS and LSZ data) is read out according to the context inputted into the read address input nodes AR, and outputted from the data output nodes DO to the arithmetic calculator 107.

On the other hand, since one renormalization processing is performed in the above-mentioned mode II, when the control portion 13 has therefore, receives "1" indicating "prosecute a normalization processing" from the renormalize generator 82 in the A register 108 and "1" indicating "normalization will be completed by the last one processing" from the last renormalization generator 183 in the A register 108, in the period $T_4$ of the first clock of the system clock in the mode III, the control portion 13 obtains a renormalizing signal and a last renormalizing signal, both "H" level, in the period $T_4$, respectively, as shown in FIG. 17E and FIG. 17F. Also the control portion 13 generates a shift-up selection signal which rises in response to the rise of the system clock as shown in FIG. 17I.

When the shift-up selection signal rises, receiving a shift-up selection signal indicating "normalization will be completed by the last one normalization processing", the A selector 109 selects the data obtained by shifting up the A data from the A register 108 by one bit, and also outputs it to the arithmetic calculator 107.

Similarly, receiving the shift-up selection signal, the C selector 111 selects the data obtained by shifting up the C data from the C register 110 by one bit, and outputs it to the arithmetic calculator 107. The least significant bit of this C data shifted-up by one bit will be the encoded data of the most significant bit which is outputted from the input means 112, and latched in the input means 112. In the following, the C data shifted-up by one bit means the data of this kind.

In other words, the A data and the C data latched in the A register 108 and the C register 110 respectively are shifted-up by one bit in the mode II in this period $T_4$.

The A data latched in the A register 108 and the C data latched in the C register 110 in this period $T_4$ are the results calculated in the mode II (at period $T_3$) by the arithmetic calculator 107. In other words, since the renormalizing signal and also the last renormalizing signal become "H" level in the period $T_4$, a renormalizing clock signal becomes "H" level. Therefore, the contents stored in the A register 108 and the C register 110 are not shifted-up and kept unchanged. This state is shown in FIG. 11L. The code 3 in FIG. 17L indicates that the A register 108 and the C register 110 are latched for the third target decoding pixel.

In the arithmetic calculator 107 (ref. FIG. 14), a prediction conversion signal LPS is generated by the calculator 172 according to the LSZ data of the storing data for the fourth target decoding pixel from the context table storage device 104, the A data of the third target decoding pixel, namely, the A data shifted-up by one bit, and the C data of the third target decoding pixel, namely, the C data which has been shifted-up by one bit, according to the above-mentioned equation (5). The generated prediction conversion signal LPS is outputted.

When the prediction conversion signal LPS matches with the prediction symbol MPS of the storing data for the fourth target decoding pixel from the context table storage device 104, the picture data generator 171 outputs the picture data indicating, for example, "1" to the storage device 101 as the picture data for the fourth target decoding pixel. When the prediction conversion signal LPS does not match with the prediction symbol MPS of the storing data for the fourth target decoding pixel from the context table storage device 104, the picture data generator 171 outputs the picture data indicating, for example, "0" to the storage device 101 as the picture data for the fourth target decoding pixel. The storage device 101 stores the picture data.

On the other hand, when the prediction conversion signal LPS shows that the equation (5) is satisfied, the calculator 172 calculates an A data according to an LSZ data of the storing data for the fourth target decoding pixel from the context table storage device 104 and the A data of the third target decoding pixel, namely, the A data shifted-up by one bit, according to the equation (6), and outputs the A data to the A register 108. The calculator 172 also calculates the C data of the third target decoding pixel, namely, the C data shifted-up by one bit according to the above-mentioned equation (7) and outputs the C data to the C register 110.

When prediction conversion signal LPS shows that the equation (5) is not satisfied, the calculator 172 outputs the LSZ data of the storing data for the fourth target decoding pixel from the context table storage device 104 to the A register 108 as an A data, according to the above-mentioned equation (8). The calculator 172 also calculates a C data from the LSZ data of the storing data for the fourth target decoding pixel from the context table storage device 104 and both the A data and the C data of the third target decoding pixel, namely, the A data and the C data shifted-up by one bit, according to the above-mentioned equation (9) and outputs the calculated C data to the C register 110.

The A data and the C data calculated by the calculator 172 in this way are inputted to the register portion 181 of the A register 108 (ref. FIG. 15) and to the C register 110 (ref. FIG. 16) respectively, and stored (the stored contents in each register has been renewed) therein on the rise of a pixel processing clock signal from the control portion 113 (at period $T_5$).

In this period $T_4$, since the mode II requires one renormalization processing, receiving the rise of a pixel processing clock and "1" indicating "prosecute a normalization processing" from the renormalization generator 182 in the A register 108. Accordingly, the control portion 113 outputs a renewal clock signal in synchronization with the system clock as shown in FIG. 17G.

Receiving the fall of the renewal clock signal, the context table storage device 104 writes and stores a renewal data for the third target decoding pixel (prediction symbol MPSUP and LPZUP data) on the context table storing portion at the address based on the context from the context storage device 103, received in the write address input nodes AW, namely, the context of the third target decoding pixel in the mode II.

A renewal data including the prediction symbol MPSUP and LSZUP data is generated by the renewal data storage means which comprises the data storage device 114, the LSZ renewal logic circuit 115, and the MPS renewal logic circuit 116.

The data storage device 114 temporarily stores the storing data for the third target coding pixel on the fall of the pixel processing clock signal during the period $T_3$. The LSZ data of the temporarily stored storing data is outputted to the LSZ renewal logic circuit 115, and the MPS symbol of that storing data is outputted to the MPS renewal logic circuit 116, on the rise of the pixel processing clock signal during the period $T_4$.

The LSZ renewal logic circuit 115 receives the prediction conversion signal LPS calculated during the period $T_3$ from the prediction conversion signal generator 171 in the arithmetic calculator 107, and the LSZ data of the storing data for the third target coding pixel from the data storage device 114. After the rise of the pixel processing clock signal during the period $T_4$, the LSZ renewal logic circuit 115 outputs the LSZUP data for the third target coding pixel, based on the truth table shown in FIG. 9 to the data input node DI of the context table storage device 104, and also outputs the SWITCH data for the third target coding pixel to the MPS renewal logic circuit 116.

After the rise of the pixel processing clock signal during the period $T_4$, the MPS renewal logic circuit 116 receives the SWITCH data for the third target coding pixel from the LSZ renewal logic circuit 115, and the prediction symbol MPS of the storing data for the third target coding pixel from the data storage device 114, and outputs the prediction symbol MPSUP for the third target coding pixel to the data input node DI of the context table storage device 104.

The LSZUP data of the renewal data generated by the LSZ renewal logic circuit 115 and the prediction symbol MPSUP of the renewal data generated by the MPS renewal logic circuit 116, are taken in to the data input node DI of the context table storage device 104 on the fall of the renewal clock from the control portion 113, and written on the context table storage device portion at the address based on the context for the third target coding pixel.

The control portion 113 obtains a CT count clock signal which will be a clock as shown in FIG. 17J, and generates a code shift clock signal in synchronization with the system clock signal in the period $T_4$ as shown in FIG. 17M. Receiving the fall of this code shift clock signal, the input means 112 shifts-up the stored contents latched therein by one bit, and stores it again.

Since the code input clock signal remains "H" level as shown in FIG. 17K, the input means 112 however, does not newly takes-in an encoded data again.

Accordingly, in the period $T_4$ in this mode III, the procedures from a context generation to the arithmetic calculation for the fourth target decoding pixel, and a renormalization processing for the third target decoding pixel are carried out within one system clock (a cycle). That is, the storing data in the context table storage device 104 is renewed and the A data latched in the A register 108 and the C data latched in the C register 110 are respectively shifted-up by one bit.

Since this mode III shows an example in which three renormalization processing are required, the A data which is the resultant calculated by the arithmetic calculator 107 taken into the register portion 181 of the A register 108 in the period $T_5$ becomes a value more than 0.0625 and less than 0.125 in decimal number. Accordingly, the value of most the significant bit becomes "0", and the next bit of the most the significant bit becomes "0".

Accordingly, a renormalizing signal "1" indicating "prosecute a normalization processing" is outputted from the renormalization generator 182 in the A register 108. As shown in FIG. 17E, the control portion 113 therefore obtains an "H" level renormalizing signal in the period $T_5$.

The last renormalization generator 183 in the A register 108 outputs a last renormalizing signal "0" indicating "normalization will not be completed by the last one processing". An "L" level last renormalizing signal is obtained at the control portion 113 in the period $T_5$, as shown in FIG. 17F.

Receiving a context of the fifth target decoding pixel from the context generator 102 and a context of the fourth target decoding pixel from the context storage device 103, the context comparator 106 outputs an "L" level identical context signal indicating that "the contexts do not match with each other" during the period $T_5$ as shown in FIG. 17D.

Accordingly, the mode III is recognized in this period $T_5$ in which the contexts are not identical and at least one renormalization processing has to be performed.

By this recognition, a renormalization processing is performed in the period $T_5$ shown in FIG. 17. In other words, the storing data in the context table storage device 104 is renewed, and the A data in the A register 108 and the C data in the C register 110 are respectively shifted-up by one bit.

As mentioned above, in this period $T_5$, on the rise of a pixel clock signal triggered by the rise of a system clock, the A data and the C data calculated for the fourth target decoding pixel are inputted to the A register 108 and to the C register 110 respectively and latched therein. Receiving the rise of the pixel processing clock signal, the context generator 102 reads the context for the fifth target decoding pixel from the storage device 101 and outputs the read context to the read address input nodes AR in the context table storage device 104 and to the context storage device 103.

The pixel processing clock signal however, maintains "H" level in this period $T_5$, since the renormalization generator 182 of the A register 108 outputs "1" indicating "prosecute a normalization processing" and the last renormalization generator 183 of the A register 108 outputs "0" indicating "normalization processing will not be completed by the last one processing". As a result, the A register 108 and the C register 110 shift up none of the contents stored therein. The A data and the C data calculated for the fourth target decoding pixel remains to be latched in the A register 108 and the C register 110, respectively.

On the other hand, when the control portion 113 receives "1" indicating "prosecute a normalization processing" from the renormalization generator 182 of the A register 108, the renormalizing clock signal generator is set, and the control portion 113 therefore, outputs a renormalizing clock signal and a code shift clock signal in synchronization with the system clock signal.

Receiving the fall of this code shift clock signal, the input means 112 shifts-up the encoded data latched therein by one bit and latches the data again.

Receiving the fall of this renormalizing clock signal, the A register 108 and the C register 110 shift up the A data and the C data by one bit, which are calculated by the arithmetic calculator 107 in the period $T_4$ for the fourth target decoding pixel, respectively, and latch themselves again.

Since the control portion 113 receives "1" indicating "prosecute a normalization processing" from the renormalization generator 182 in the A register 108, the control portion 113 outputs a renewal clock signal in synchronization with the system clock as shown in FIG. 17G.

Receiving the fall of the renewal clock signal, the context table storage device 104 writes and stores a renewal data including the prediction symbol MPSUP and the LSZUP data from the renewal data generating means (i.e. the data storage device 114, the LSZ renewal logic circuit 115, and the MPS renewal logic circuit 116) on the context table storing portion at the address based on the context from the context storage device 103, received in the write address input nodes AW, namely, the context of the fourth target decoding pixel, as explained in the period $T_4$.

In this period $T_5$, the A data stored in the register portion 181 of the A register 108 has a value more than 0.125 and less than 0.25 in decimal number because it has been shifted-up by one bit. The value of the most significant bit is, however "0", and also that of the next bit is "0".

Accordingly, the renormalization generator 182 in the A register 108 outputs a renormalizing signal "1" indicating "prosecute a normalization processing", therefore, an "H" level renormalizing signal is obtained at the control portion 113 in the period $T_6$, as shown in FIG. 17E.

The last renormalization generator 183 in the A register 108 outputs a last renormalizing signal "0" indicating "normalization will not be completed by the last one processing". An "V" level last renormalizing signal is obtained at the control portion 113 in the period $T_6$, as shown in FIG. 17F.

This means that in the next period $T_6$, the A data and the C data latched in the A register 108 and the C register 110 respectively are shifted-up by one bit in a renormalization processing.

Accordingly in the period $T_6$, the renormalizing clock signal generator in the control portion 113 is not reset because the control portion 113 receives "0" indicating "normalization processing will not be completed by the last one processing" from the last one renormalization generator 183 of the A register 108. The control portion 113 therefore, outputs a renormalizing clock signal in synchronization with the system clock signal and a code shift clock signal in synchronization with the system clock signal.

Receiving the fall of this code shift clock signal, the input means 112 shifts-up the encoded data latched therein by one bit and latches the data again.

Receiving the fall of this renormalizing clock signal, the A register 108 and the C register 110 shift up the A data and the C data by one bit, which are shifted-up by one bit in the period $T_5$, respectively, and latch themselves again.

Since the last one renormalization generator 183 outputs "0" indicating "normalization processing will not be completed by the last one processing", the pixel processing clock signal maintains "H" level even in this period $T_6$. Accordingly, the control portion 113 maintains the renewal clock signal at "H" level as shown in FIG. 17G. As a result, the contents stored in the context table storage device 104 is not renewed.

In this period $T_6$, the A data stored in the register portion 181 of the A register 108 has a value more than 0.25 and less than 0.5 in decimal number, because it has been shifted-up by one bit. The value of the most significant bit is, however "0", and the value which is one bit lower from the most significant bit is "1".

Accordingly, the renormalization generator 182 in the A register 108 outputs a renormalizing signal "1" indicating "prosecute a normalization processing", therefore, an "H" level renormalizing signal is obtained at the control portion 113 in the period $T_7$, as shown in FIG. 17E.

The last renormalization generator 183 in the A register 108 outputs a last renormalizing signal "1" indicating "normalization will be completed by the last one processing". An "H" level last renormalizing signal is obtained at the control portion 113 in the period $T_7$, as shown in FIG. 17F.

This means that in the next period $T_7$, the A data and the C data latched in the A register 108 and the C register 110 respectively, are shifted-up by one bit in a renormalization processing. This also means that the mode III is completed by the last one normalizing processing.

In other words, the last renormalization generator 183 in the A register 108 outputs "1" indicating "normalization will be completed by the last one processing". In the same manner as the operation in the mode II, the renormalization processing can be performed, at the first clock of the system clock in which a decoding processing for the next target decoding pixel is performed, namely, the period $T_7$ in the mode IV shown in FIG. 17. This renormalization processing will be explained more precisely in the following explanation on the operation in the mode IV.

Accordingly, in the mode III, for the renormalization processing which are required for three times, the procedures from a context generation to the arithmetic calculation for the target decoding pixel, take only one clock time (one cycle) of the system clock to carry out. The A data and the C data calculated by the arithmetic calculator 107, are stored in the A register 108 and the C register 110, respectively. The two renormalization processing need two clocks of the system clock to carry out. The last one renormalization processing is performed in the first clock of the system clock in which a decoding processing for the next target decoding pixel is performed. As a result, substantial operating time in the mode III needs only three clocks of the system clock.

In the period $T_4$–$T_6$, since the control portion 113 maintains the renormalizing clock signal at "W" level, the CT count clock signal is maintained to the same clock signal as the system clock shown in FIG. 17J. Since the CT count clock signal lasts, however, during three clocks, the code output clock signal from the control portion 113 remains "H" level. Accordingly, the input means 112 does not takes-in an encoded data.

[mode IV]

FIG. 17A shows an example of each major signal waveform in the mode IV in the period of $T_7$–$T_8$ of the system clock signal. It is assumed that a decoding processing has been done for the fifth target decoding pixel in the mode IV. In the period $T_7$, the context generator 102 has already (in period $T_5$) read the context for the fifth target decoding pixel from the storage device 101 and has outputted the read context to the read address input nodes AR of the context table storage device 104.

The code 5 in FIG. 17C shows that a context has been generated by the context generator 102 for the fifth target decoding pixel.

In the context table storage device 104, the 16-bit storing data (prediction symbol MPS and LSZ data) is read out according to the context inputted into the read address input nodes AR, and outputted from the data output nodes DO to the arithmetic calculator 107.

On the other hand, since the last renormalization processing is performed in the above-mentioned mode III in the period $T_6$, the control portion 113 therefore, receives "1" indicating "prosecute a normalization processing" from the renormalize generator 82 in the A register 108 and "1" indicating "normalization will be completed by the last one processing" from the last renormalization generator 183 in the A register 108, in the period $T_7$ of the first clock of the system clock in the mode IV. Accordingly, the control portion 113 obtains a renormalizing signal and a last renormalizing signal, both "H" level, in the period $T_7$, respectively, as shown in FIG. 17E and FIG. 17F. Also the control portion 113 generates a shift-up selection signal which rises in response to the rise of the system clock as shown in FIG. 17I.

When the shift-up selection signal rises, receiving a shift-up selection signal indicating "normalization will be completed by the last one normalization processing", the A selector 109 selects the data obtained by shifting up the A data from the A register 108 by one bit, and also outputs it to the arithmetic calculator 107.

Similarly, receiving the shift-up selection signal, the C selector 111 selects the data obtained by shifting up the C data from the C register 110 by one bit, and outputs it to the arithmetic calculator 107.

In other words, the processing performed in this period $T_7$ is the same as the "shift-up" processing in the mode III in which the A data and the C data latched in the A register 108 and in the C register 110 respectively are shifted-up by one bit. As a result, three renormalization processing are performed in the mode III during the period $T_5$–$T_7$. The A data and the C data therefore outputted from the A selector 109 and from the C selector 111 respectively are, shifts-up the A data and the C data calculated for the fourth target coding pixel in the period $T_4$ in the mode III by three bits. In other words, both the A data and the C data outputted from respective selectors become eight times as large as the A data and the C data calculated for the fourth target decoding pixel.

In the arithmetic calculator 107 (ref. FIG. 14), a prediction conversion signal LPS is generated by the calculator 172 from the LSZ data of the storing data for the fifth target decoding pixel from the context table storage device 104, the A data of the fourth target decoding pixel, namely, the A data shifted-up by three bits, and the C data of the fourth target decoding pixel, namely, the C data shifted-up by three bits, according to the above-mentioned equation (5). The generated prediction conversion signal LPS is outputted.

When the prediction conversion signal LPS matches with the prediction symbol MPS of the storing data for the fifth target decoding pixel from the context table storage device 104, the picture data generator 171 outputs the picture data indicating, for example, "1" from to the storage device 101 as the picture data for the fifth target decoding pixel. When the prediction conversion signal LPS does not match with the prediction symbol MPS, the picture data generator 171 outputs the picture data indicating, for example, "0" to the storage device 101 as the picture data for the fifth target decoding pixel. The storage device 101 stores the picture data.

On the other hand, when the prediction conversion signal LPS shows that the equation (5) is satisfied, the calculator 172 calculates an A data according to an LSZ data of the storing data for the fifth target decoding pixel from the context table storage device 104 and the A data of the fourth target decoding pixel, namely, the calculated A data of the fourth target decoding pixel which is shifted-up by three bits, according to the equation (6). The calculated A data is then outputted to the A register 108. The C data of the fourth target decoding pixel, namely, the calculated C data of the fourth target decoding pixel which is shifted-up by three bits, is also outputted to the C register 110 according to the above-mentioned equation (7).

When the prediction conversion signal LPS shows that the equation (5) is not satisfied, the calculator 172 outputs the LSZ data of the storing data for the fifth target decoding pixel from the context table storage device 104 to the A register 108 as an A data according to the above-mentioned equation (8). The calculator 172 calculates a C data according to the LSZ data of the storing data for the fifth target decoding pixel from the context table storage device 104 and both the A data and the C data of the fourth target decoding pixel, namely, the A data and the calculated C data which is shifted-up by three bits, according to the above-mentioned equation (9). The calculated C data is outputted to the C register 110.

The A data and the C data calculated by the calculator 172 in this way are inputted to the register portion 181 of the A register 108 (ref. FIG. 15) and to the C register 110 (ref. FIG. 16) respectively, and stored (the stored contents in each register has been renewed) therein on the rise of a pixel processing clock signal from the control portion 113 (at period $T_8$).

Although the control portion 113 receives "1" indicating "prosecute a normalization processing" from the renormalization generator 182 of the A register 108, the contents stored in the context table storage device 104 is not renewed because the renewal clock signal maintains "H" level in the period $T_7$.

The control portion 113 obtains a CT count clock signal which will be a clock synchronized with the system clock signal as shown in FIG. 17J, and generates a code shift clock signal in synchronization with the system clock signal in the period $T_7$ as shown in FIG. 17M. Receiving the fall of this code shift clock signal, the input means 112 shifts-up the stored contents latched therein one bit, and stores it again.

Accordingly, in the period $T_7$ in the mode IV, the procedures from a context generation to the arithmetic calculation for the fifth target decoding pixel, and a last renormalization processing for the fourth target decoding pixel are carried out within one system clock (a cycle). That is, the processing which shifts-up the A data and the C data latched in the A register 108 and the C register 110, respectively, by one bit, are carried out within one system clock (one cycle).

Since this mode IV shows an example in which one renormalization processing is required, the A data stored in the register portion 181 of the A register 108, has a value more than 0.25 and less than 0.5 in decimal number. Accordingly, the value of its most significant bit becomes "0", and the next bit of the most the significant bit becomes "1".

Accordingly, a renormalizing signal "1" indicating "prosecute a normalization processing" is outputted from the renormalization generator 182. As shown in FIG. 17E, the control portion 113 obtains an "H" level renormalizing signal in the period $T_8$.

The last renormalization generator 183 in the A register 108 outputs a last renormalizing signal "1" indicating "normalization will be completed by the last one processing". An "H" level last renormalizing signal is obtained at the control portion 113 in the period $T_8$, as shown in FIG. 17F.

Receiving a context of the sixth target decoding pixel from the context generator 102 and a context of the fifth target decoding pixel from the context storage device 103, the context comparator 106, in the period $T_8$, outputs an "H" level identical context signal indicating that "the contexts match with each other" as shown in FIG. 17D.

Accordingly, the mode IV is recognized in this period $T_8$ in which the contexts are identical and one renormalization processing has to be performed.

By this recognition, a renormalization processing is performed in the period $T_8$ shown in FIG. 17. In other words, the storing data in the context table storage device 104 is renewed, and the A data in the A register 108 and the C data in the C register 110 are respectively shifted-up by one bit.

As mentioned above, in this period $T_8$, on the rise of a pixel clock signal triggered by the rise of a system clock, the A data and the C data calculated for the fifth target decoding pixel are inputted to the A register 108 and to the C register 110 respectively and latched therein. Receiving the rise of the pixel processing clock signal, the context generator 102 reads the context for the sixth target decoding pixel from the storage device 101 and outputs the read context to the read address input nodes AR in the context table storage device 104 and to the context storage device 103.

The pixel processing clock signal however, maintains "H" level in this period $T_8$, since the renormalization generator 182 of the A register 108 outputs "1" indicating "prosecute a normalization processing", the last renormalization generator 183 of the A register 108 outputs "1" indicating "normalization processing will be completed by the last one processing", and the identical context signal from the context comparator 106 shows that contexts are identical. The pixel processing clock signal maintains the "H" level during the period $T_8$. As a result, the contents stored in the A register 108 and in the C register 110 are not renewed. The A data and the C data calculated for the fifth target decoding pixel are latched in the A register 108 and in the C register 110.

On the other hand, when the control portion 113 receives "1" indicating "prosecute a normalization processing" from the renormalization generator 182 of the A register 108, the renormalizing clock signal generator is set, and the control portion 113 therefore, outputs a renormalizing clock signal and a code shift clock signal in synchronization with the system clock signal.

Receiving the fall of this code shift clock signal, the input means 112 shifts-up the encoded data latched therein by one bit and latches the data again. Receiving the fall of this renormalizing clock signal, the A register 108 and the C register 110 shift up the A data and the C data by one bit, which are calculated by the arithmetic calculator 107 in the period $T_8$ for the fifth target decoding pixel, respectively, and latch themselves again.

Since the control portion 113 receives "1" indicating "prosecute a normalization processing" from the renormalization generator 182 in the A register 108, the control portion 113 outputs a renewal clock signal in synchronization with the system clock as shown in FIG. 17G.

Receiving the fall of the renewal clock signal, the context table storage device 104 writes and stores a renewal data including the prediction symbol MPSUP and the LSZUP data from the renewal data generating means (i.e. the data storage device 114, the LSZ renewal logic circuit 115, and the MPS renewal logic circuit 116) on the context table storing portion at the address based on the context from the context storage device 103, received in the write address input nodes AW, namely, the context of the fifth target decoding pixel.

In this period T₈, the A data stored in the register portion 181 of the A register 108 has a value more than 0.5 in decimal number, since it has been shifted-up by one bit. Accordingly, the value of the most significant bit becomes "1".

Accordingly, the renormalization generator 182 in the A register 108 outputs a renormalizing signal "0" indicating "not-prosecute a normalization processing", therefore, an "L" level renormalizing signal is obtained at the control portion 113 in the period T₉, as shown in FIG. 17E.

The last renormalization generator 183 in the A register 108 outputs a last renormalizing signal "0" indicating "normalization will not be completed by the last one processing". An "L" level last renormalizing signal is obtained at the control portion 113 in the period T₉, as shown in FIG. 17F.

Accordingly, in the mode IV, it is meant that the renormalization processing has been already completed. For the renormalization processing which is required for once, the procedures from a context generation to the arithmetic calculation for the fifth target coding pixel, take only one clock time (one cycle) of the system clock to carry out. The A data and the C data calculated by the arithmetic calculator 107, are stored in the A register 108 and the C register 110, respectively. One renormalization processing takes one clock of the system clock to carry out. As a result, substantial operating time in the mode IV need only two clocks of the system clock.

In the period T₇–T₈, the renormalizing signal shown in FIG. 17E is "H" level. The control portion 113 therefore, makes the CT count clock signal the same clock signal as the system clock signal as shown in FIG. 17J. However, since the CT count clock holds two clocks and the number of the clocks and the total number of the clock accumulated from the mode IV is 5, the code output clock signal from the control portion 113 remains "H" level. Accordingly, the input means 112 neither takes-in nor outputs the contents stored in the C register 11.

[mode V]

FIG. 17A shows an example of each major signal waveform in the mode V in the period of T₉–T₁₃ of the system clock signal. It is assumed that a decoding processing has been done for the sixth target decoding pixel in the mode V. In the period T₉, the context generator 102 has already read the context for the sixth target decoding pixel from the storage device 101. The read context is outputted to the read address input nodes AR of the context table storage device 4. The code 6 in FIG. 17C shows that a context has been generated by the context generator 102 for the sixth target decoding pixel.

In the context table storage device 4, the 16-bit storing data (prediction symbol MPS and LSZ data) is read out according to the context inputted into the read address input nodes AR, and outputted from the data output nodes DO to the arithmetic calculator 107.

On the other hand, since the processing has been already completed in the above-mentioned mode IV in the period T₈, the control portion 113 obtains a renormalizing signal of "V" level, and a last renormalizing signal, as shown in FIG. 17E and FIG. 17F respectively, and no renormalization processing is performed.

In the period T₈, since the pixel processing clock signal maintains "H" level, the pixel processing clock signal remains "H" level, even if the system clock rises in the period T₉. The A data and the C data latched in the register 8 and in the C register 110 are obtained from the A data and the C data calculated for the fifth target coding pixel by shifting up them one bit in the period T₇ which have been latched in the period T₈.

In the arithmetic calculator 107 (ref. FIG. 14), a prediction conversion signal LPS is generated, and then outputted by the calculator 172 from the LSZ data of the storing data for the sixth target decoding pixel from the context table storage device 104, the A data of the fifth target decoding pixel and the C data of the fifth target decoding pixel, according to the above-mentioned equation (5).

When the prediction conversion signal LPS matches with the prediction symbol MPS of the storing data for the sixth target decoding pixel, the picture data indicating, for example, "1" from the picture data generator 171 is outputted to and stored in the storage device 101 as the picture data for the sixth target decoding pixel. When the prediction conversion signal LPS does not match with the prediction symbol MPS, the picture data indicating, for example, "0" from the picture data generator 171 is outputted to and stored in the storage device 101 as the picture data for the sixth target decoding pixel.

On the other hand, when the prediction conversion signal LPS shows that the equation (5) is satisfied, the calculator 172 calculates an A data from the LSZ data of the storing data for the sixth target decoding pixel from the context table storage device 104 and the A data of the fifth target decoding pixel, namely, the A data shifted-up by one bit, according to the above-mentioned equation (6). The calculated A data is outputted to the A register 108. The C data of the fifth target decoding pixel, namely, the C data shifted-up by one bit, is outputted to the C register 110, according to the above-mentioned equation (7).

When prediction conversion signal LPS shows that the equation (5) is not satisfied, the calculator 172 outputs the LSZ data of the storing data for the sixth target decoding pixel from the context table storage device 104 to the A register 108 as an A data, according to the above-mentioned equation (8).

The calculator 172 also calculates a C data from the LSZ data of the storing data for the sixth target decoding pixel from the context table storage device 104 and both the A data and the C data of the fifth target decoding pixel, namely, the A data and C data shifted-up by one bit respectively, according to the above-mentioned equation (9). The calculated C data is outputted to the C register 110.

The A data and the C data calculated by the calculator 172 in this way are inputted to the register portion 181 of the A register 108 (ref. FIG. 15) and to the C register 110 (ref. FIG. 16) respectively, and stored (the stored contents in each register has been renewed) therein on the rise of a pixel processing clock signal from the control portion 113 (at period T₁₀).

On the other hand, since the renewal clock signal from the control portion 113 maintains "H" level as shown in FIG. 17G, the contents stored in the context table storage device 104 is not renewed.

Since this mode V shows an example in which five renormalization processing are required, the A data stored in the register portion 181 of the A register 108, has a value more than 0.15625 and less than 0.03125 in decimal number. Accordingly, the value of its most significant bit becomes "0", and the next bit of the most the significant bit becomes "0".

Accordingly, a renormalizing signal "1" indicating "prosecute a normalization processing" is outputted from the renormalization generator 182 in the A register 108. As shown in FIG. 17E, the control portion 113 obtains an "H" level renormalizing signal in the period $T_{10}$.

The last renormalization generator 183 in the A register 108 outputs a last renormalizing signal "0" indicating "normalization will not be completed by the last one processing". An "L" level last renormalizing signal is obtained at the control portion 113 in the period $T_{10}$, as shown in FIG. 17F.

Receiving a context of the seventh pixel from the context generator 102 and a context of the sixth target decoding pixel from the context storage device 103, the context comparator 106 outputs an "H" level identical context signal indicating that "the contexts match with each other" during the period $T_{10}$ as shown in FIG. 17D.

Accordingly, the mode V is recognized in this period $T_{10}$ in which the contexts are not identical and at least one renormalization processing has to be performed. By this recognition, a renormalization processing is performed in the period $T_{10}$ shown in FIG. 17. In other words, the storing data in the context table storage device 104 is renewed, and the A data in the A register 108 and the C data in the C register 110 are respectively shifted-up one bit.

As mentioned above, in this period $T_{10}$, at the rise of a pixel clock signal triggered by the rise of a system clock, the A data and the C data calculated for the sixth target decoding pixel are inputted to the A register 108 and to the C register 110 respectively and latched therein. Receiving the rise of the pixel processing clock signal, the context generator 102 reads the context for the seventh target decoding pixel from the storage device 101 and outputs the read context to the read address input nodes AR in the context table storage device 104 and to the context storage device 103.

The pixel processing clock signal however, maintains "H" level in this period $T_{10}$, since the renormalization generator 182 of the A register 108 outputs "1" indicating "prosecute a normalization processing", and the last one renormalization generator 183 of the A register 108 outputs "0" indicating "normalization processing will not be completed by the last one processing". As a result, the A register 108 and the C register 110 shift none of the contents stored therein. The A data and the C data calculated for the sixth target decoding pixel remains to be latched in the A register 108 and the C register 110, respectively.

On the other hand, when the control portion 113 receives "1" indicating "prosecute a normalization processing" from the renormalization generator 182 of the A register 108, the renormalizing clock signal generator is set, and the control portion 113 therefore, outputs a renormalizing clock signal and a code shift clock signal in synchronization with the system clock signal.

Receiving the fall of this code shift clock signal, the input means 112 shifts-up the encoded data latched therein by one bit and latches the data again.

Receiving the fall of this renormalizing clock signal, the A register 108 and the C register 110 shift up the A data and the C data by one bit, which are calculated by the arithmetic calculator 107 in the period $T_9$ for the sixth target decoding pixel, respectively, and latch themselves again.

Since the control portion 113 receives "1" indicating "prosecute a normalization processing" from the renormalization generator 182 in the A register 108, the control portion 113 outputs a renewal clock signal in synchronization with the system clock as shown in FIG. 17G.

Receiving the fall of the renewal clock signal, the context table storage device 104 writes and stores a renewal data including the prediction symbol MPSUP and the LSZUP data from the renewal data generating means (i.e. the data storage device 114, the LSZ renewal logic circuit 115, and the MPS renewal logic circuit 116) on the context table storing portion at the address based on the context from the context storage device 103, received in the write address input nodes AW, namely, the context of the target decoding pixel for the sixth in this mode V.

In this period $T_{10}$, the A data stored in the register portion 181 of the A register 108 has a value more than 0.03125 and less than 0.0625 in decimal number because it has been shifted-up by one bit. The value of the most significant bit is however "0", and the value which is one bit lower from the most significant bit is "0".

Accordingly, the renormalization generator 182 in the A register 108 outputs a renormalizing signal "1" indicating "prosecute a normalization processing", therefore, an "H" level renormalizing signal is obtained at the control portion 113 in the period $T_{11}$, as shown in FIG. 17E.

The last renormalization generator 183 in the A register 108 outputs a last renormalizing signal "0" indicating "normalization will not be completed by the last one processing". An "L" level last renormalizing signal is obtained at the control portion 113 in the period $T_{11}$, as shown in FIG. 17F.

This means that in the period $T_{11}$, the A data and the C data latched in the A register 108 and the C register 110 respectively are shifted-up by one bit in a renormalization processing.

Accordingly in the period $T_{11}$, when the control portion 113 receives "0" indicating "normalization processing will not be completed by the last one processing" from the last renormalization generator 183 of the A register 108, the renormalizing clock signal generator in the control portion 113 is not reset, the control portion 113 therefore outputs a renormalizing clock signal in synchronization with the system clock signal, and a code shift clock signal in synchronization with the system clock signal.

Receiving the fall of this code shift clock signal, the input means 112 shifts-up the encoded data latched therein by one bit and latches the data again. Receiving the fall of this renormalizing clock signal, the A register 108 and the C register 110 shift up the A data and the C data by one bit, which are shifted-up by one bit in the period $T_{10}$, respectively, and latch themselves again.

Since the control portion 113 maintains the renewal clock signal at "H" level in this period $T_{11}$, the contents stored in the context table storage device 104 is not renewed.

In this period $T_{11}$, the A data stored in the register portion 181 of the A register 108 has a value more than 0.0625 and less than 0.125 in decimal number, because it has been shifted-up by one bit. The value of the most significant bit is however "0", and the value which is one bit lower from the most significant bit is also "0".

Accordingly, a renormalizing signal "1" indicating "prosecute a normalization processing" is outputted from the renormalization generator 182 in the A register 108. An "H" level renormalizing signal is obtained in the control portion 113 in the period $T_{12}$, as shown in FIG. 17E.

A last renormalizing signal "0" indicating "normalization will not be completed by the last one processing" is outputted from the last one renormalization generator 183 in the A register 108. An "L" level last renormalizing signal is obtained in the control portion 113 in the period $T_{12}$, as shown in FIG. 17F.

This means that in the next period $T_{12}$, the A data and the C data latched in the A register 108 and the C register 110 respectively are shifted-up by one bit in a renormalization processing.

Accordingly in the period $T_{12}$, the renormalizing clock signal generator in the control portion 113 is not reset because the control portion 113 receives "0" indicating "normalization processing will not be completed by the last one processing" from the last one renormalization generator 183 in the A register 108. The control portion 113 therefore, outputs a renormalizing clock signal in synchronization with the system clock signal.

In this period $T_{12}$, the number of the counts of the CT count clock signal is 8 as shown in FIG. 17J. In the second embodiment, the number of the bits of the encoded data for transmission is also 8. Accordingly, the control portion 113 maintains the code system clock signal at "H" level, instead of synchronizing it with the system clock signal, and synchronizes the code input clock signal with the system clock signal.

Receiving the fall of this code input clock signal, the input means 112 takes-in the transmitted eight bit encoded data, writes it over the old encoded data, and stores it therein. When the fall of this renormalizing clock signal is received by the A register 108 and the C register 110, the A data and C data latched therein, namely, the A data and C data already shifted-up by one bit in the period $T_{11}$, are again shifted-up by one bit, and latched again in the A register 8 and the C register 10 respectively.

Since the control portion 113 maintains the renewal clock signal at "H" level in this period $T_{12}$ as shown in FIG. 17G, the contents stored in the context table storage device 104 is not renewed.

In this period $T_{12}$, the A data stored in the register portion 181 of the A register 108 has a value more than 0.125 and less than 0.25 in decimal number, because it has been shifted-up by one bit. The value of the most significant bit is however, "0", and the value which is one bit lower from the most significant bit is also "0".

Accordingly, a renormalizing signal "1" indicating "prosecute a normalization processing" is outputted from the renormalization generator 182 in the A register 108. An "H" level renormalizing signal is obtained in the control portion 113 in the period $T_{13}$, as shown in FIG. 17E.

A last renormalizing signal "0" indicating "normalization will not be completed by the last one processing" is outputted from the last renormalization generator 183 in the A register 108. An "T" level 1 last renormalizing signal is obtained in the control portion 113 in the period $T_13$ as shown in FIG. 17F.

This means that in the period $T_{13}$, the A data and the C data latched in the A register 108 and the C register 110 respectively, are shifted-up by one bit in a renormalization processing.

Accordingly in the period $T_{13}$, the renormaliing clock signal generator in the control portion 113 is not reset because the control portion 113 receives "0" indicating "normalization processing will not be completed by the last one processing" from the last renormalization generator 183 of the A register 108. The control portion 113 therefore, outputs a renormalizing clock signal and a code shift clock signal in synchronization with the system clock signal, and a code shift clock signal in synchronization with the system clock signal.

Receiving the fall of this code shift clock signal, the input means 112 shifts-up the encoded data latched therein by one bit and latches the data again.

When the fall of this renormalizing clock signal is received by the A register 108 and the C register 110, the A data and C data latched therein, namely, the A data and C data already shifted-up by one bit in the period $T_{12}$, are again shifted-up by one bit, and latched again in the A register 8 and the C register 10 respectively.

Since the control portion 113 maintains the renewal clock signal at "H" level in this period $T_{13}$ as shown in FIG. 17G, the contents stored in the context table storage device 104 is not renewed.

In this period $T_{13}$, the A data stored in the register portion 181 of the A register 108 has a value more than 0.25 and less than 0.5 in decimal number, because it has been shifted-up by one bit. Accordingly, the value of the most significant bit is "0", and the value which is one bit lower from the most significant bit is "1".

Accordingly, a renormaliing signal "1" indicating "prosecute a normalization processing" is outputted from the renormalization generator 182 in the A register 108. An "H" level renormalizing signal is obtained in the control portion 113 in the period $T_14$, as shown in FIG. 17E.

The last renormalization generator 183 in the A register 108 outputs a last renormalizing signal "1" indicating "normalization will be completed by the last one processing". An "H" level last renormalizing signal is obtained at the control portion 113 in the period $T_{14}$, as shown in FIG. 17F.

This means that in the period $T_{14}$, the A data and the C data latched in the A register 108 and the C register 110 respectively are shifted-up by one bit in a renormalization processing. This also means that the mode V is completed by the last one normalizing processing.

In other words, since the last one renormalization generator 183 has outputted "1" indicating "normalization will be completed by the last one processing", the renormalization processing is completed in the first clock of the system clock in which an encoding processing for the next target decoding pixel is performed, namely, the period $T_{14}$ shown in FIG. 17.

In other words, receiving the rise of the system clock in the period $T_{14}$, the control portion 113 obtains a renormalizing signal and a last renormalizing signal, both "H" level, as shown in FIG. 17E and FIG. 17F, respectively, and generates a shift-up selection signal, which rises receiving the rise of the system clock as shown in FIG. 17I.

When the shift-up selection signal rises, receiving a shift-up selection signal indicating "normalization will be completed by the last one normalization processing", the A selector 109 selects the data obtained by shifting up the A data from the A register 108 by one bit, and also outputs it to the arithmetic calculator 107.

Similarly, receiving the shift-up selection signal, the C selector 111 selects the data obtained by shifting up the C data from the C register 110 by one bit, and outputs it to the arithmetic calculator 107.

In other words, the processing performed in this period $T_{14}$ is the same as the "shift-up" processing in the mode V in which the A data and the C data latched in the A register 108 and in the C register 110 respectively are shifted-up by one bit. As a result, five renormalization processing are performed in the mode V during the periods $T_{10}$–$T_{14}$. The A data and the C data which are outputted from the A selector 109 and from the C selector 111 are the same as those obtained from the A data and the C data, respectively, calculated for the sixth target decoding pixel in the period $T_9$ in the mode V by shifting up them five bits.

Accordingly, in the mode V, for the renormalization processing which are required for five times, the procedures from a context generation to the arithmetic calculation for the sixth target decoding pixel, take only one clock time (one cycle) of the system clock to carry out. The A data and the C data calculated by the arithmetic calculator 107, are stored in the A register 108 and the C register 110, respectively. The four renormalization processing need four clocks of the system clock to carry out. The last one renormalization processing is performed in the first clock of the system clock in which a decoding processing for the next target decoding pixel is performed. As a result, substantial operating time in the mode V needs only five clocks of the system clock.

In the periods $T_{10}$-$T_{13}$, since the control portion 113 maintains the renormalizing clock signal to "H" level, the CT count clock signal is maintained to the same clock signal as the system clock shown in FIG. 17J. The control portion 113 outputs the four CT count clock signals. Accordingly, since there are five total clocks until the mode V, when the control portion 113 counts the same number of the bits of the encoded data for transmission, namely, eight bits in this second embodiment, the control portion 113 outputs a code input clock signal, which becomes "L" level in synchronization with the next system clock as shown in FIG. 17K.

Receiving the falling code input clock signal to the "L" level from the control portion 113, the input means 112 takes-in the all transmitted eight bits encoded data in parallel, and latches them again, as explained in the period $T_{12}$.

In conclusion, with regard to the digital signal decoding device having the above mentioned configuration, the number of the processing clocks of the system clock signal is as follows as shown in FIG. 10.

In the mode I where there is no renormalization, that is, no normalization processing is required because the A data for a target decoding pixel is equal or more than 0.5 in decimal number, the number of the processing clocks is one.

In the mode II where a renormalization is performed, that is, a normalization processing is required because the A data for a target decoding pixel is less than 0.5 in decimal number, the context for the target decoding pixel does not match with the context for the pixel which is immediately subsequent to the target decoding pixel, and renormalization occurs once, the number of the processing clocks is one.

In the mode III where a renormalization is performed, the context for a target decoding pixel does not match with the context for a pixel which is immediately subsequent to the target decoding pixel, and renormalization occurs more than once, the number of the processing clocks is the same as that of the renormalization processing.

In the mode IV where a renormalization is performed, the context for a target decoding pixel matches with the context for a pixel which is immediately subsequent to the target decoding pixel, and renormalization occurs once, the number of the processing clocks is two.

In the mode V where a renormalization is performed, the context for a target decoding pixel matches with the context for a pixel which is immediately subsequent to the target decoding pixel, and renormalization occurs more than once, the number of the processing clocks is the same as that of the renormalization processing.

In other words, in the mode II, III and V, the last renormalization processing is performed together with the processing for the next target decoding pixel at the first clock of the system clock for processing the next target decoding pixel. Therefore, it is possible to substantially reduce the processing time as much as one clock, and speed up the decoding processing.

With regard to the digital signal decoding device formed in the abovementioned way, it is expected that the processing mode for the most of the target decoding pixel will be mode II in case of the worst compression ratio for decoding (compression ratio is almost 1). Even in this case, the operation time takes substantially no more than one clock of the system clock to complete the processing for the most of the target decoding pixel. Accordingly, this can speed up the decoding processing. Moreover, the substantial time required for the one clock equals to the sum of the accessing time of the context table storage device 104 and the accessing time of the arithmetic calculator 107. Since the cycle of the system clock is shortened, this speeds up the processing.

Furthermore, the encoded data encoded by the digital signal encoding device explained in the first embodiment is decoded in real time. Accordingly, the capacity of a storage device for accumulating the transmitted encoded data, namely, the input means 112, is made smaller. As a result, a semiconductor integrated circuit device comprising the digital signal decoding device can be made small sized and manufactured in a low cost.

The context table storage device 104 can be constructed by a 2-port RAM of a small storage device capacity, because the storing data stored in the context table storage device portion of the context table storage device 104 includes the prediction symbol MPS and the LSZ data. As a result, the context table storage device 104 occupies a relatively small area in the semiconductor integrated circuit of the digital information encoding device. Accordingly, the digital information encoding device of the invention can be suitably integrated into a semiconductor integrated circuit.

Furthermore, the renewal data generating means for giving a renewal data to the context table storage device 104 comprises the data storage device 114, the LSZ renewal logic circuit 115, the MPS renewal logic circuit 116. For example, the data storage device 114 comprises a latch circuit, the LSZ renewal logic circuit 115 comprises a logic circuit 116 (of 2K gate in case of the present embodiment) including a P channel MOS transistor and an N channel MPS transistor, and the MPS renewal logic circuit 116 comprises a logic circuit, i.e. an exclusive OR circuit. As a result, the renewal data generating means occupies a relatively small area in the semiconductor circuit of the digital information encoding device. Accordingly, the digital information encoding device of the invention can be suitably integrated into a semiconductor integrated circuit.

Embodiment 3

Figure 18A:
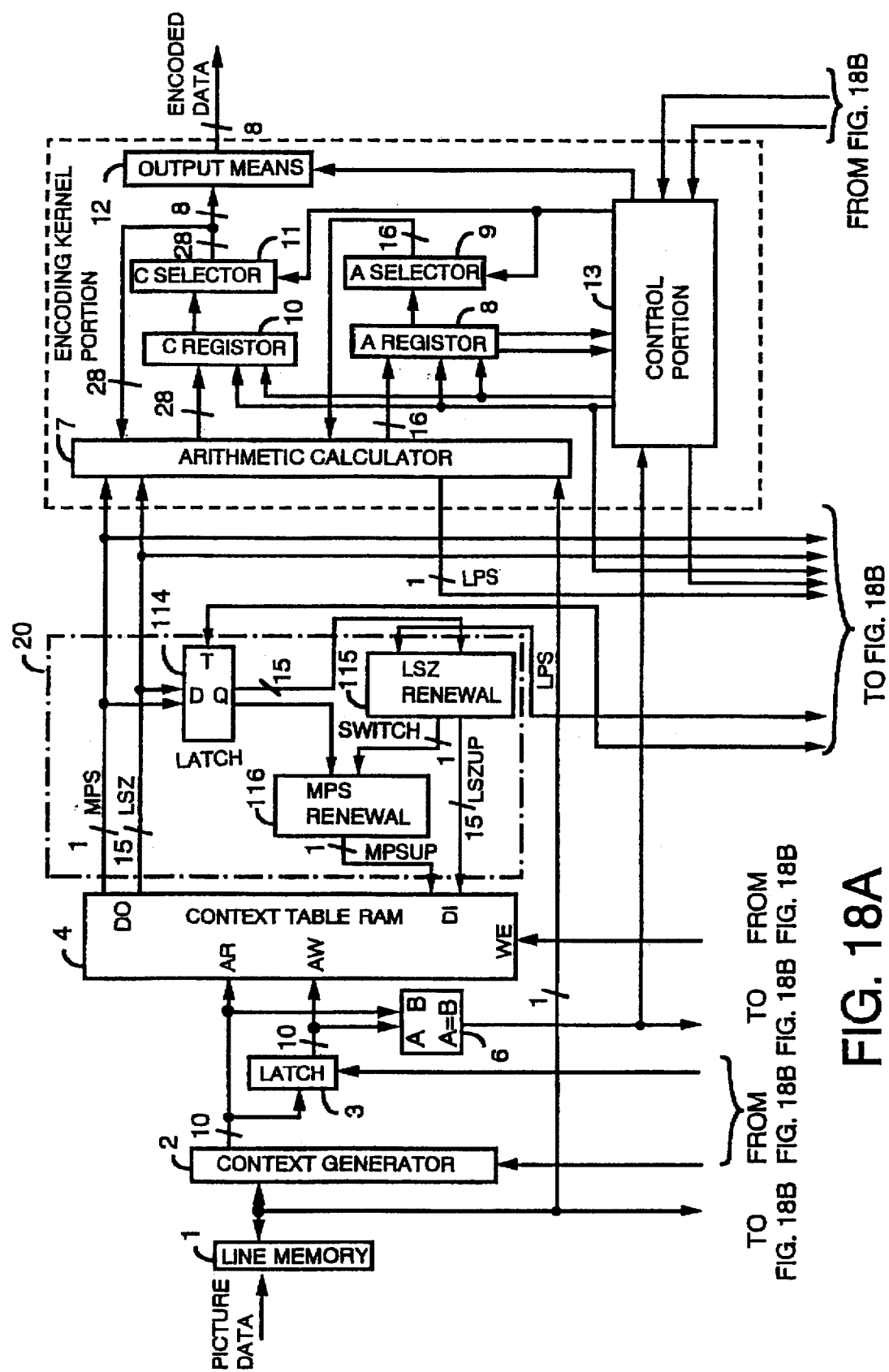
FIG. 18A and FIG. 18B are block diagrams showing a third embodiment of the present invention.
Figure 18B:
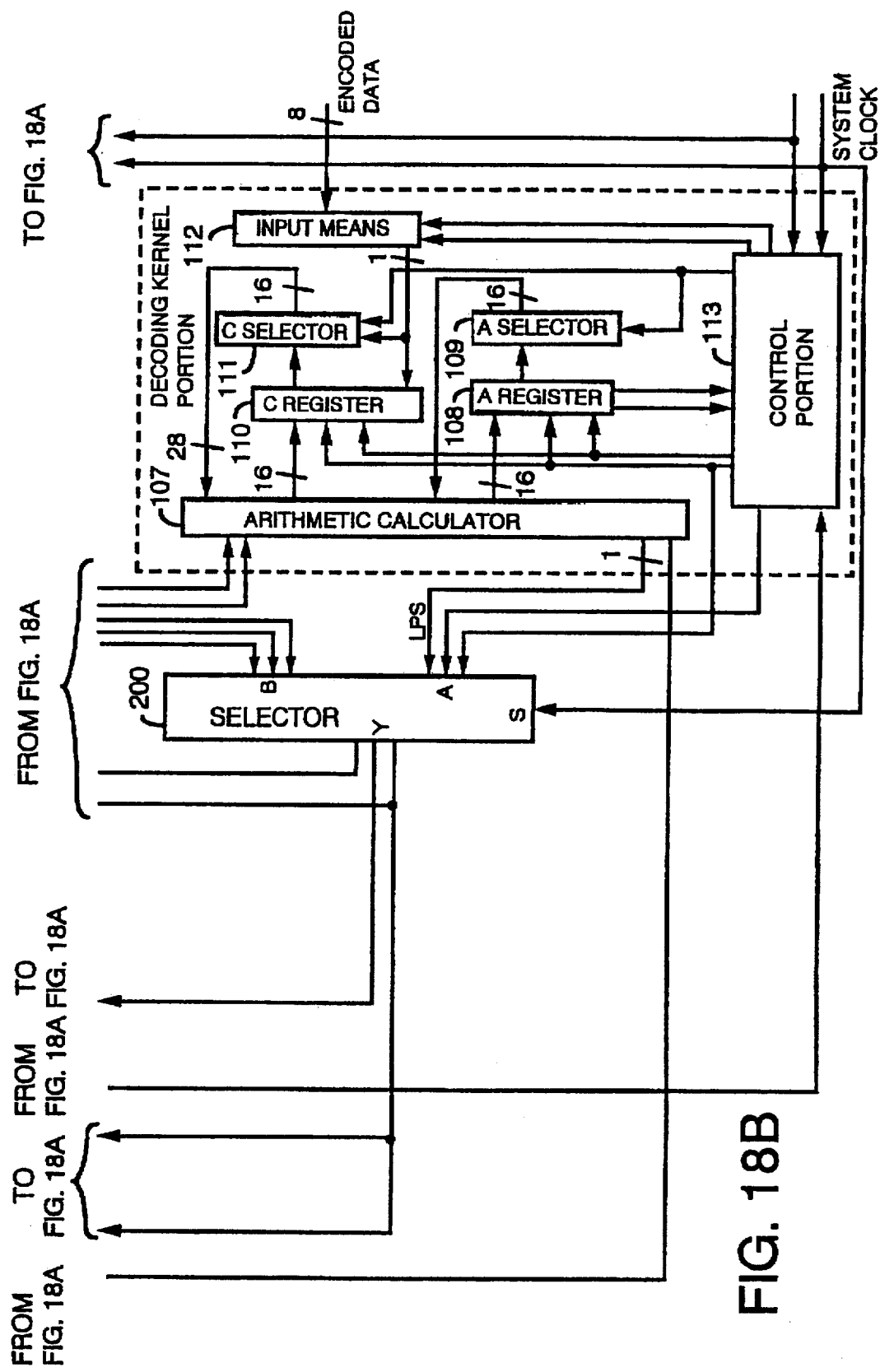

FIG. 18 shows a third embodiment of the present invention, in which a digital signal encoding/decoding device is integrated into a semiconductor integrated circuit, which is, for example, applied to a facsimile apparatus.

This digital signal encoding/decoding device fundamentally comprises the above-mentioned digital signal encoding device of the first embodiment and the above-mentioned digital signal decoding device of the second embodiment, both of which are integrated into one semiconductor integrated circuit device. The digital signal encoding/decoding device comprises a storage device 1, a context generator 2, a context storage device 3, a context table storage device 4, and a renewal data generating means of the same kind as the first embodiment, comprising a data storage device 114, an LSZ renewal logic circuit 115, and an MPS renewal logic circuit 116. The above elements are used for both encoding and decoding.

An encoding kernel portion which comprises an arithmetic calculator 7, an A register 8, an A selector 9, a C register 10, a C selector 11, an output means 12 and a control portion 13, is the same as that of the first embodiment. The active/inactive state of the encoding kernel portion is controlled according to the encode/decode switching signal. When the control portion 13 is turned on an active state, the encoding kernel portion works in a similar way as the first embodiment.

A decoding kernel portion which comprises an arithmetic calculator 107, an A register 108, an A selector 109, a C register 110, a C selector 111, an input means 112 and a control portion 113 is the same as that of the second embodiment. The active/inactive state of the decoding kernel portion is controlled according to the encode/decode switching signal. When the control portion 13 is turned on an active state, the decoding kernel portion works in a similar way as the second embodiment.

The circuit comprising the storage device 1, the context generator 2, the context storage device 3, the context table storage device 4, and the renewal data generating means comprising the data storage device 114, the LSZ renewal logic circuit 115 and the MPS renewal logic circuit 116 operates as either encoding device or decoding device by using the encoding/decoding selector 200.

This encoding/decoding selector 200 receives a prediction conversion signal LPS from the arithmetic calculator 107, a pixel processing clock signal and renewal clock signal from the control portion 113 at the input terminal A. The encoding/decoding selector 200 also receives a prediction conversion signal LPS 7, a pixel processing clock signal and a renewal clock signal from the control portion 13 at the other input terminal B. According to the encode/decode switching signal, the encoding/decoding selector 200 selects either the signal inputted into the one input terminal A or the signal inputted into the other input terminal B.

When the inputted encode/decode switching signal indicates "encode", the encoding/decoding selector 200 selects the signal inputted into the other input terminal B. The encoding/decoding selector 200 respectively outputs the prediction conversion signal LPS from the arithmetic calculator 7 to the LSZ renewal logic circuit 15, the pixel processing clock signal from the control portion 13 to the context generator 2, the context storage device 3, and the data storage device 14, the renewal clock signal from the control portion 13 to the input node WE for the write enable signal of the context table storage device 4.

When the inputted encode/decode switching signal indicates "decode", the encoding/decoding selector 200 selects the signal inputted into the input terminal A. The encoding/decoding selector 200 respectively outputs the prediction conversion signal LPS from the arithmetic calculator 107 to the LSZ renewal logic circuit 115, the pixel processing clock signal from the control portion 113 to the context generator 2, the context storage device 3 and the data storage device 114, the renewal clock signal from the control portion 113 to the input node WE for the write enable signal of the context table storage device 4.

In brief, the digital signal encoding/decoding device constructed in this way operates in the same way as the digital encoding device of the first embodiment, when the encode/decode switching signal indicates "encode", using the storage device 1, the context generator 2, the context storage device 3, the context table storage device 4, the renewal data generating means comprising the data storage device 114, the LSZ renewal logic circuit 115, and the MPS renewal logic circuit 116, the context comparator 6, the arithmetic calculator 7, the A register 8, the A selector 9, the C register 10, the C selector 11, the output means 12, the control portion 13 and the encoding/decoding selector 200.

The digital signal encoding/decoding device constructed in this way operates in the same way as the digital decoding device of the second embodiment, when the encode/decode switching signal indicates "decode", using the storage device 1, the context generator 2, the context storage device 3, the context table storage device 4, the renewal data generating means comprising the data storage device 114, the LSZ renewal logic circuit 115, and the MPS renewal logic circuit 116, the context comparator 6, the arithmetic calculator 107, the A register 108, the A selector 109, the C register 110, the C selector 111, the input means 112, the control portion 113 and the encoding/decoding selector 200.

An alternative configuration of the above-mentioned digital signal encoding/decoding device can be constructed by any one of the configuration which applies a constant voltage, for example, power supply voltage or earth voltage, instead of the encode/decode switching signal. The digital signal encoding/decoding device constructed in this way may operates as a digital signal encoding device when the encoding kernel portion is always kept active, the decoding kernel portion is always kept inactive, and the signal inputted into the terminal B is always selected by the encoding/decoding selector 200. On the other hand, the digital signal encoding/decoding device constructed in this way may operates as a digital signal decoding device when the encoding kernel portion is always kept inactive, the decoding kernel portion is always kept active, and the signal inputted into the terminal A is always selected by the encoding/decoding selector 200.

The digital signal encoding/decoding device constructed in the above-mentioned way provides the same effect obtained in the first and second embodiments, respectively. Moreover, since the encoding device and the decoding device are integrated into one semiconductor integrated circuit device, an encoding device a decoding device and an encoding/decoding device may be provided by one semiconductor integrated circuit device, instead of manufacturing each apparatus separately.

What is claimed is:

1. A digital information encoding device comprising:
 a context generation means for extracting a reference pixel from an inputted picture data according to a template model to generate a context for a target coding pixel;
 a context storage means for temporarily storing the context for the target coding pixel which is received from the context generation means;
 a context table storage means for storing a plurality of storing data of plurality of bits comprising a prediction symbol and an LSZ data which is a part of a probability estimating data and indicates a mismatching probability, and outputting a predetermined storing data from the stored plurality of storing data according to a context from the context generation means, wherein any of storing data among the stored plurality of storing data is written on a renewal data having a plurality of bits comprising a prediction symbol and an LSZ data which is a part of a probability estimating data and indicates a mismatching probability, according to the context temporarily stored in the context storage means, if renormalizing processing is required for the target coding pixel;
 an arithmetic calculation means for receiving a picture data for the target coding pixel, a storing data from the context table storage means, an A data indicating the size of the current interval for a pixel which immediately precedes the target coding pixel, and a C data indicating the trailing bits of the code stream for a pixel which immediately precedes the target coding pixel, conducting a predetermined arithmetic processing, and outputting an A data indicating the size of the current interval for the target coding pixel and a C data indicating the trailing bits of the code stream for the target coding pixel, and a prediction conversion signal indicating whether or not a picture data for the target coding pixel matches with a prediction symbol of the storing data; and a renewal data generation means for receiving the prediction conversion signal from the arithmetic calculation means and the storing data from the context table storage means and for generating the renewal data to be written on the context table storage means.

2. The digital information encoding device according to claim 1, wherein said context table storage means comprises a read address input node for receiving the context from the context generation means, a read/write context table storage device portion for storing a plurality of the storing data, a data output node for outputting the storing data stored in the context table storage device portion at an address based on the context received on the read address input node, a write address input node for receiving the context temporarily stored in the context storage means, and a data input node for receiving a renewal data of a plurality of bits which corresponds to the context table storage device portion at an address based on the context received on the write address input node.

3. The digital information encoding device according to claim 2, wherein said renewal data generation means comprises an LSZ renewal means for receiving an LSZ data of a storing data from the context table storage means and a prediction conversion signal from the arithmetic calculation means, and outputting an LSZUP data indicating a mismatching probability of the renewal data to be sent to the context table storage means and a SWITCH data indicating whether a prediction symbol of a storing data from the context table storage means is to be inverted or not; and an MPS renewal means for receiving a SWITCH data from the LSZ renewal means and a prediction symbol of storing data from the context table storage means and outputting a value of the received prediction symbol as a prediction symbol of a renewal data to be written on the context table storage device if the received SWITCH data is "0", and outputting an inverted value of the received prediction symbol as a prediction symbol of a renewal data to be written on the context table storage device if the received SWITCH data is "1".

4. The digital information encoding device according to claim 3, wherein said LSZ renewal means comprises a logic circuit which outputs LSZUP signal and SWITCH signal according to a table based on the Probability estimation table below.

| No. | INPUT | | OUTPUT | |
|---|---|---|---|---|
| | LPS | LSZ | LSZUP | SWITCH |
| 0 | 0 | 5a1d | 2586 | 0 |
| 1 | 0 | 2586 | 1114 | 0 |
| 2 | 0 | 1114 | 080b | 0 |
| 3 | 0 | 080b | 03d8 | 0 |
| ~ | ~ | ~ | ~ | ~ |
| 14 | 0 | 5a7f | 3f25 | 0 |
| ~ | ~ | ~ | ~ | ~ |
| 111 | 0 | 5522 | 504f | 0 |
| 112 | 0 | 59eb | 5522 | 0 |
| 113 | 1 | 5a1d | 2586 | 1 |
| 114 | 1 | 2586 | 5a7f | 0 |
| 115 | 1 | 1114 | 2cf2 | 0 |
| 116 | 1 | 080b | 17b9 | 0 |
| ~ | ~ | ~ | ~ | ~ |
| 127 | 1 | 5a7f | 3f25 | 1 |
| ~ | ~ | ~ | ~ | ~ |
| 224 | 1 | 5522 | 59eb | 0 |
| 225 | 1 | 59eb | 59eb | 1 |

5. The digital information encoding device according to claim 4, further comprising:

a data storage device means for temporarily storing the storing data from the context table storage means, and outputting an LSZ data of the temporarily stored storing data to the LSZ renewal means and a prediction symbol of the temporarily stored storing data to the MPS renewal means.

6. The digital information encoding device according to claim 5 further comprising:

an A data output means for receiving the A data from the arithmetic calculation means, giving an A data received from the arithmetic calculation means as a target coding pixel which immediately precedes the target coding pixel if no renormalization processing for the target coding pixel is required, and giving the A data received from the arithmetic calculation means which is shifted-up by one bit as a target coding pixel which immediately precedes the target coding pixel if one renormalization processing for the target coding pixel is required; and a C data output means for receiving the C data from the arithmetic calculation means, giving a C data received from the arithmetic calculation means as a target coding pixel which immediately precedes the target coding pixel if no renormalization processing for the target coding pixel is required, and giving the C data received from the arithmetic calculation means which is shifted-up by one bit as a target coding pixel which immediately precedes the target coding pixel, and outputting as encoded data, if one renormalization processing for the target coding pixel is required.

7. The digital information encoding device according to claim 1 further comprising:

an A register for latching the A data from the arithmetic calculation means, outputting contents of the latched A data as an A data, and outputting a renormalizing signal for conducting a normalization processing and a last renormalizing signal which indicates that the normalization will be completed by the last one processing;

an A selector for receiving the A data form the A register and a shift-up selection signal based on the last renormalizing signal, and outputting the A data from the A register which is shifted-up by one bit if the selection signal indicates "shift-up", or otherwise, outputting the A data from the A register without shifting-up, to the arithmetic calculation means, as an A data for a pixel which immediately precedes the target coding pixel;

a C register for latching a C data from the arithmetic calculation means and outputting the latched contents as a C data; and a C selector for receiving the C data from the C register and the shift-up selection signal, and outputting the C data from the C register which is shifted-up by one bit if the selection signal indicates "shift-up", or otherwise, outputting the C data from the C register without shifting-up, to the arithmetic calculation means, as a C data for a pixel which immediately precedes the target coding pixel.

8. The digital information encoding device according to claim 7, wherein said A register shifts-up a data latched therein by one bit and latches the data therein again in synchronization with a renormalizing clock signal inputted therein; and said C register shifts-up a data latched therein by one bit and latches the data therein again in synchronization with a renormalizing clock signal inputted therein.

9. A digital information decoding device comprising:

a context generation means for extracting a reference pixel from an inputted picture data according to a template model to generate a context for a target coding pixel;

a context storage means for temporarily storing the context for the target coding pixel which is received from the context generation means;

a context table storage means for storing a plurality of storing data of plurality of bits comprising a prediction symbol and an LSZ data which is a part of a probability estimating data and indicates a mismatching probability, and outputting a predetermined storing data from the stored plurality of storing data according to a context from the context generation means, wherein any of storing data among the stored plurality of storing data is written on a renewal data having a plurality of bits comprising a prediction symbol and an LSZ data which is a part of a probability estimating data and indicates a mismatching probability, according to the context temporarily stored in the context storage means, if renormalizing processing is required for the target decoding pixel;

an arithmetic calculation means for receiving a storing data from the context table storage means, an A data indicating the size of the current interval for a pixel which immediately precedes the target decoding pixel, and a C data indicating the trailing bits of the code stream for a pixel which immediately precedes the target decoding pixel, and conducting a predetermined arithmetic processing, and outputting an A data indicating the size of the current interval for the target decoding pixel, a C data indicating the trailing bits of the code stream for the target decoding pixel, and a prediction conversion signal, and a decoded picture data for the target decoding pixel; and a renewal data generation means for receiving the prediction conversion signal from the arithmetic calculation means and the storing data from the context table storage means, and generating the renewal data to be written on the context table storage means.

10. The digital information decoding device according to claim 9, wherein said context table storage means comprises a read address input node for receiving the context from the context generation means, a read/write context table storage device portion for storing a plurality of the storing data, a data output node for outputting the storing data stored in the context table storage device portion at an address based on the context received on the read address input node, a write address input node for receiving the context temporarily stored in the context storage means, and a data input node for receiving a renewal data of a plurality of bits which corresponds to the context table storage device portion at an address based on the context received on the write address input node.

11. The digital information decoding device according to claim 10, wherein said renewal data generation means comprises an LSZ renewal means for receiving an LSZ data of a storing data from the context table storage means and a prediction conversion signal from the arithmetic calculation means, and outputting an LSZUP data indicating a mismatching probability of the renewal data to be sent to the context table storage means and a SWITCH data indicating whether a prediction symbol of a storing data from the context table storage means is to be inverted or not; and an MPS renewal means for receiving a SWITCH data from the LSZ renewal means and a prediction symbol of storing data from the context table storage means and outputting a value of the received prediction symbol as a prediction symbol of a renewal data to be written on the context table storage device if the received SWITCH data is "0", and outputting an inverted value of the received prediction symbol as a prediction symbol of a renewal data to be written on the context table storage device if the received SWITCH data is "1".

12. The digital information decoding device according to claim 11, wherein said LSZ renewal means comprises a logic circuit which outputs LSZUP signal and SWITCH signal according to a truth table based on the Probability estimation table below.

| | INPUT | | OUTPUT | |
|---|---|---|---|---|
| No. | LPS | LSZ | LSZUP | SWITCH |
| 0 | 0 | 5a1d | 2586 | 0 |
| 1 | 0 | 2586 | 1114 | 0 |
| 2 | 0 | 1114 | 080b | 0 |
| 3 | 0 | 080b | 03d8 | 0 |
| ~ | ~ | ~ | ~ | ~ |
| 14 | 0 | 5a7f | 3f25 | 0 |
| ~ | ~ | ~ | ~ | ~ |
| 111 | 0 | 5522 | 504f | 0 |
| 112 | 0 | 59eb | 5522 | 0 |
| 113 | 1 | 5a1d | 2586 | 1 |
| 114 | 1 | 2586 | 5a7f | 0 |
| 115 | 1 | 1114 | 2cf2 | 0 |
| 116 | 1 | 080b | 17b9 | 0 |
| ~ | ~ | ~ | ~ | ~ |
| 127 | 1 | 5a7f | 3f25 | 1 |
| ~ | ~ | ~ | ~ | ~ |
| 224 | 1 | 5522 | 59eb | 0 |
| 225 | 1 | 59eb | 59eb | 1 |

13. The digital information decoding device according to claim 12, further comprising:

a data storage device means for temporarily storing the storing data from the context table storage means, and outputting an LSZ data of the temporarily stored storing data to the LSZ renewal means and a prediction symbol of the temporarily stored storing data to the MPS renewal means.

14. The digital information decoding device according to claims 13, further comprising:

an A data output means for receiving the A data from the arithmetic calculation means, giving an A data received from the arithmetic calculation means as a target decoding pixel which immediately precedes the target decoding pixel if no renormalization processing for the target decoding pixel is required, and giving the A data received from the arithmetic calculation means which is shifted-up by one bit as a target decoding pixel which immediately precedes the target decoding pixel if one renormalization processing for the target decoding pixel is required; and a C data output means for receiving the C data from the arithmetic calculation means, and also receiving the encoded data via input means, giving a content latched according to the encoded data and a C data received from the arithmetic calculation means as a target decoding pixel which immediately precedes the target decoding pixel if no renormalization processing for the target decoding pixel is required, and giving the C data received from the arithmetic calculation means and a content latched according to the encoded data which are shifted-up by one bit as a target decoding pixel which immediately precedes the target decoding pixel, if one renormalization processing for the target decoding pixel is required.

15. The digital information decoding device according to claim 9, wherein said arithmetic calculation means performs an arithmetic processing according to an equation (5) below; and outputs a prediction conversion signal indicating whether the equation (5) is satisfied or not; performs an arithmetic processing according to equations (6) and (7) below to output the A data and the C data for the target decoding pixel, if the equation (5) is satisfied; performs an arithmetic processing according to equations (8) and (9) below to output the A data and the C data for the target decoding pixel, if the equation (5) is not satisfied; outputs a same value as that of the prediction symbol in the storing data from the context table storage means as a decoded picture data for the target decoding pixel, if said equation (5) is satisfied; and inverts the value of the prediction symbol in the storing data from the context table storage means and then outputs as a decoded picture data for the target decoding pixel, if the equation (5) is not satisfied, wherein $$C(k-1) < A(k-1) - LSZ(k) \quad (5)$$

$$A(k) = A(k-1) - LSZ(k) \quad (6)$$

$$C(k) = C(k-1) \quad (7)$$

$$A(k) = LSZ(k) \quad (8)$$

$$C(k) = C(k-1) + \{A(k-1) - LSZ(k)\} \quad (9)$$

where A(k) is an A data of the target decoding pixel (a k-th target decoding pixel), A(k−1) is an A data of a target decoding pixel which immediately precedes the target decoding pixel {a(k−1)-th target decoding pixel}, C(k) is a C data of the target decoding pixel (a k-th target decoding pixel), C(k−1) is a C data of a target decoding pixel which immediately precedes the target decoding pixel {a(k−1)-th target decoding pixel}, LSZ(k) is an LSZ data indicating a mismatching probability of a storing data from the context table storage means for the target decoding pixel (a k-th target decoding pixel), and k=1,2,3, . . . n where n is a positive integer.

16. The digital information decoding device according to claim 15, wherein said A register shifts-up a data latched therein by one bit and latches the data therein again in synchronization with a renormalizing clock signal inputted therein; and said C register shifts-up a data latched therein by one bit and latches the data therein again in synchronization with a renormalizing clock signal inputted therein.

17. The digital information decoding device according to claim 9, further comprising an A register for latching the A data from the arithmetic calculation means, outputting contents of the latched A data as an A data, and outputting a renormalizing signal for conducting a normalization processing and a last renormalizing signal which indicates that the normalization will be completed by the last one processing;

an A selector for receiving the A data form the A register and a shift-up selection signal based on the last renormalizing signal, and outputting the A data from the A register which is shifted-up by one bit if the selection signal indicates "shift-up", or otherwise, outputting the A data from the A register without shifting-up, to the arithmetic calculation means, as an A data for a pixel which immediately precedes the target coding pixel;

a C register for receiving the C data from the arithmetic calculation means, receiving the encoding data via the input means, and outputting latched contents as a C data according to the received C data and the encoded data; and a C selector for receiving the C data from the C register and the shift-up selection signal, and outputting the C data from the C register which is shifted-up by one bit if the selection signal indicates "shift-up", or otherwise, outputting the C data from the C register without shifting-up, to the arithmetic calculation means, as a C data for a pixel which immediately precedes the target coding pixel.

18. A digital information encoding/decoding device comprising:

a context generation means for receiving a picture data from either an inputted picture data or a decoded picture data, extracting a reference pixel from the received picture data according to a template model, generating a context for a target coding pixel if the received picture data is the inputted picture data, and generating a context for a target decoding pixel if the received picture data is the decoded picture data;

a context storage means for temporarily storing the context for the target coding pixel or the context for the target decoding pixel from the context generation means;

a context table storage means for storing a plurality of storing data of plurality of bits comprising a prediction symbol and an LSZ data which is a part of a probability estimating data and indicates a mismatching probability, and outputting a predetermined storing data from the stored plurality of storing data according to a context from the context generation means, wherein any of storing data among the stored plurality of storing data is written on a renewal data having a plurality of bits comprising a prediction symbol and an LSZ data which is a part of a probability estimating data and indicates a mismatching probability, according to the context temporarily stored in the context storage means, if renormalizing processing is required for the target coding pixel or the target decoding pixel;

an encoding arithmetic calculation means for receiving a picture data for the target coding pixel, a storing data from the context table storage means, an A data indicating the size of the current interval for a pixel which immediately precedes the target coding pixel, and a C data indicating the trailing bits of the code stream for a pixel which immediately precedes the target coding pixel, conducting a predetermined arithmetic processing, outputting an A data indicating the size of the current interval for the target coding pixel and a C data indicating the trailing bits of the code stream for the target coding pixel, and outputting a prediction conversion signal indicating whether a picture data for the target coding pixel matches with a prediction symbol of the storing data or not;

a decoding arithmetic calculation means for receiving a storing data from the context table storage means, an A data indicating the size of the current interval for a pixel which immediately precedes the target decoding pixel, and a C data indicating the trailing bits of the code stream for a pixel which immediately precedes the target decoding pixel, conducting a predetermined arithmetic processing, outputting an A data indicating the size of the current interval for the target decoding pixel and a C data indicating the trailing bits of the code stream for the target decoding pixel, and outputting a prediction conversion signal and a decoded picture data for the target decoding pixel; and a renewal data generation means for receiving the prediction conversion signal from either the encoding arithmetic calculation means or the decoding arithmetic calculation means and the storing data from the context table storage means, and generating the renewal data to be written on the context table storage means.

19. A digital information encoding/decoding device according to claim 18, wherein said context table storage means comprises a read address input node for receiving the context from the context generation means, a read/write context table storage device portion for storing a plurality of the storing data, a data output node for outputting the storing data stored in the context table storage device portion at an address based on the context received on the read address input node, a write address input node for receiving the context temporarily stored in the context storage means, and a data input node for receiving a renewal data of a plurality of bits which corresponds to the context table storage device portion at an address based on the context received on the write address input node.

20. The digital information encoding/decoding device according to claim 19, wherein said renewal data generation means comprises:

an LSZ renewal means for receiving an LSZ data of a storing data from the context table storage means and a prediction conversion signal from either the encoding arithmetic calculator or the decoding arithmetic calculator, and outputting an LSZUP data indicating a mismatching probability of the renewal data to be sent to the context table storage means and a SWITCH data indicating whether a prediction symbol of a storing data from the context table storage means is to be inverted or not; and an MPS renewal means for receiving a SWITCH data from the LSZ renewal means and a prediction symbol of storing data from the context table storage means and outputting a value of the received prediction symbol as a prediction symbol of a renewal data to be written on the context table storage device if the received SWITCH data is "0", and outputting an inverted value of the received prediction symbol as a prediction symbol of a renewal data to be written on the context table storage device if the received SWITCH data is "1".

21. The digital information encoding device according to claim 20, wherein said LSZ renewal means comprises a logic circuit which outputs LSZUP signal and SWITCH signal according to a truth table based on the Probability estimation table below.

| | INPUT | | OUTPUT | |
|---|---|---|---|---|
| No. | LPS | LSZ | LSZUP | SWITCH |
| 0 | 0 | 5a1d | 2586 | 0 |
| 1 | 0 | 2586 | 1114 | 0 |
| 2 | 0 | 1114 | 080b | 0 |
| 3 | 0 | 080b | 03d8 | 0 |
| ~ | ~ | ~ | ~ | ~ |
| 14 | 0 | 5a7f | 3f25 | 0 |
| ~ | ~ | ~ | ~ | ~ |
| 111 | 0 | 5522 | 504f | 0 |
| 112 | 0 | 59eb | 5522 | 0 |
| 113 | 1 | 5a1d | 2586 | 1 |
| 114 | 1 | 2586 | 5a7f | 0 |
| 115 | 1 | 1114 | 2cf2 | 0 |
| 116 | 1 | 080b | 17b9 | 0 |
| ~ | ~ | ~ | ~ | ~ |
| 127 | 1 | 5a7f | 3f25 | 1 |
| ~ | ~ | ~ | ~ | ~ |
| 224 | 1 | 5522 | 59eb | 0 |
| 225 | 1 | 59eb | 59eb | 1 |

22. The digital information encoding device according to claim 21, further comprising:

a data storage device means for temporarily storing the storing data from the context table storage means, and outputting an LSZ data of the temporarily stored storing data to the LSZ renewal means and a prediction symbol of the temporarily stored storing data to the MPS renewal means.

23. The digital information decoding device according to claim 22, further comprising:

an encoding A data output means for receiving the A data from the encoding arithmetic calculation means, giving an A data received from the encoding arithmetic calculation means as a target coding pixel which immediately precedes the target coding pixel if no renormalization processing for the target coding pixel is required, and giving the A data received from the encoding arithmetic calculation means which is shifted-up by one bit as a target coding pixel which immediately precedes the target coding pixel if one renormalization processing for the target coding pixel is required; and an encoding C data output means for receiving the C data from the encoding arithmetic calculation means, giving a C data received from the encoding arithmetic calculation means as a target coding pixel which immediately precedes the target coding pixel if no renormalization processing for the target coding pixel is required, and giving the C data received from the arithmetic calculation means which is shifted-up by one bit as a target coding pixel which immediately precedes the target coding pixel, and outputting them as encoded data, if one renormalization processing for the target coding pixel is required;

a decoding A data output means for receiving the A data from the decoding arithmetic calculation means, giving an A data received from the decoding arithmetic calculation means as a target decoding pixel which immediately precedes the target decoding pixel if no renormalization processing for the target decoding pixel is required, and giving the A data received from the decoding arithmetic calculation means which is shifted-up by one bit as a target decoding pixel which immediately precedes the target decoding pixel if one renormalization processing for the target decoding pixel is required; and a decoding C data output means for receiving the C data from the decoding arithmetic calculation means, and also receiving the received encoded data via input means, giving a content latched according to the encoded data and a C data received from the decoding arithmetic calculation means as a target decoding pixel which immediately precedes the target decoding pixel if no renormalization processing for the target decoding pixel is required, and giving the C data received from the decoding arithmetic calculation means and a content latched according to the encoded data which are shifted-up by one bit as a target decoding pixel which immediately precedes the target decoding pixel, if one renormalization processing for the target decoding pixel is required.

24. The digital information encoding/decoding device according to claims 18 further comprising:

an encoding A register for latching-up the A data from the encoding arithmetic calculation means, outputting contents of the latched A data as an A data, and outputting a renormalizing signal for conducting a normalization processing, and a last renormalizing signal which indicates that the normalization will be completed by the last one processing;

an encoding A selector for receiving the A data form the encoding A register and a shift-up selection signal based on the last renormalizing signal, and giving an A data from the encoding A register which is shifted-up by one bit to the encoding arithmetic calculation means as an A data for a pixel which immediately precedes the target coding pixel if the sift-up selection signal indicates "shift-up", otherwise, giving an A data from the encoding A register to the encoding arithmetic calculation means as an A data for a pixel which immediately precedes the target coding pixel, without shifting-up;

an encoding C register for outputting a C data from the encoding arithmetic calculation means is latched, and contents of the latched C data is outputted as a C data;

an encoding C selector for receiving the C data from the encoding C register and the shift-up selection signal, and giving a C data from the encoding C register which is shifted-up by one bit to the encoding arithmetic calculation means as an A data for a pixel which immediately precedes the target coding pixel if the sift-up selection signal indicates "shift-up", otherwise, giving a C data from the encoding C register to the encoding arithmetic calculation means as a C data for a pixel which immediately precedes the target coding pixel, without shifting-up;

a decoding A register for latching-up the A data from the decoding arithmetic calculation means, outputting contents of the latched A data as an A data, and outputting a renormalizing signal for conducting a normalization processing, and a last renormalizing signal which indicates that the normalization will be completed by the last one processing;

a decoding A selector for receiving the A data form the decoding A register and a shift-up selection signal based on the last renormalizing signal, for giving an A data from the decoding A register which is shifted-up by one bit to the decoding arithmetic calculation means as an A data for a pixel which immediately precedes the target coding pixel if the sift-up selection signal indicates "shift-up", otherwise, giving an A data from the decoding A register to the decoding arithmetic calculation means as an A data for a pixel which immediately precedes the target coding pixel, without shifting-up;

a decoding C register for receiving a C data from the decoding arithmetic calculation means, and an encoded data via an input means, and outputting contents latched therein as a C data according to the C data and the encoded data received therein; and a decoding A selector for receiving the C data form the decoding C register and a shift-up selection signal, and giving a C data from the decoding C register which is shifted-up by one bit to the decoding arithmetic calculation means as a C data for a pixel which immediately precedes the target decoding pixel if the sift-up selection signal indicates "shift-up", otherwise, giving a C data from the decoding C register to the decoding arithmetic calculation means as a C data for a pixel which immediately precedes the target decoding pixel, without shifting-up.

25. The digital information encoding/decoding device according to claim 24, wherein said encoding A register shifts-up a data latched therein by one bit and latches the data therein again in synchronization with a renormalizing clock signal inputted therein;

said encoding C register shifts-up a data latched therein by one bit and latches the data therein again in synchronization with a renormalizing clock signal inputted therein;

said decoding A register shifts-up a data latched therein by one bit and latches the data therein again in synchronization with a renormalizing clock signal inputted therein; and said decoding C register shifts-up a data latched therein by one bit and latches the data therein again in synchronization with a renormalizing clock signal inputted therein.

26. A digital information encoding method comprising:

during one clock of a system clock signal when encoding processing for a target coding pixel requires one renormalization, generating a context for the target coding pixel;

reading out a storing data comprising a prediction symbol based on the generated context, and an LSZ data which is a part of a probability estimating data and indicates a mismatching probability;

obtaining an A data indicating a size of the current coding interval for the target coding pixel and a C data indicating the trailing bits of the code stream for the target coding pixel, according to a picture data for the target coding pixel, the read-out storing data, an A data indicating a size of the current coding interval for a pixel which immediately precedes the target coding pixel and a C data indicating the trailing bits of the code stream for a pixel which immediately precedes the target coding pixel; and obtaining a prediction conversion signal indicating whether a picture data for the target coding pixel matches with a prediction symbol of the read-out storing data or not; and, during subsequent one clock of a system clock signal:

obtaining a renewal data comprising a prediction symbol and an LSZ data which is a part of a probability estimating data and indicates a mismatching probability according to the read-out storing data and the obtained prediction conversion signal;

rewriting a storing data based on the context for the target coding pixel by the renewal data;

generating a context for a subsequent target coding pixel;

reading out a storing data based on the generated context; and obtaining an A data indicating a size of the current coding interval for a subsequent target coding pixel and a C data indicating the trailing bits of the code stream for a subsequent target coding pixel, according to a picture data for a subsequent target coding pixel, the read-out storing data, an A data indicating a size of the current coding interval for a subsequent target coding pixel and a C data indicating the trailing bits of the code stream for a subsequent target coding pixel.

27. A digital information encoding method comprising:

during one clock of a system clock signal when encoding processing for a target encoding pixel requires one renormalization, generating a context for the target coding pixel;

reading out a storing data comprising a prediction symbol and an LSZ data which is a part of a probability estimating data and indicates a mismatching probability according to the context generated by the above-mentioned step;

obtaining a prediction conversion symbol which indicates whether picture data for the target coding pixel matches with a prediction symbol of the storing data read-out by the above-mentioned step;

obtaining an A data and a C data for the target coding pixel according to equations (1) and (2) below, if the picture data for the target coding pixel matches with the prediction symbol in the storing data from the context table storage means, and obtaining an A data and a C data for the target coding pixel according to equations (3) and (4) below; if the picture data for the target coding pixel does not match with the prediction symbol in the storing data from the context table storage means; and, during subsequent one clock of a system clock signal, obtaining a renewal data comprising a prediction symbol and an LSZ data which is part of a probability estimating data and indicates a mismatching probability according to the prediction conversion signal obtained by the above-mentioned step and the storing data read-out by the above-mentioned step;

rewriting a storing data by the renewal data obtained by the above-mentioned step based on the context for the target coding pixel;

generating a context for a subsequent target coding pixel;

reading out a storing data comprising a prediction symbol and an LSZ data which is part of a probability estimating data and indicates a mismatching probability based on the generated context;

obtaining an A data and a C data for a subsequent target coding pixel of the target encoding pixel according to equations (1) and (2) if the picture data for a subsequent target coding pixel matches with the prediction symbol in the storing data read out in the above-mentioned step for a subsequent target coding pixel and obtaining an A data and a C data for a subsequent target coding pixel according to equations (3) and (4) if the picture data for a subsequent target coding pixel does not match with the prediction symbol in the storing data read out in the above-mentioned step for a subsequent target coding pixel; wherein $$A(k)=A(k-1)-LSZ(k) \tag{1}$$

$$C(k)=C(k-1) \tag{2}$$

$$A(k)=LSZ(k) \tag{3}$$

$$C(k)=C(k-1)+\{A(k-1)-LSZ(k)\} \tag{4}$$

where, $A(k)$ is an A data of the target coding pixel (a k-th target coding pixel), $A(k-1)$ is an A data of a target coding pixel which immediately precedes the target coding pixel $\{a(k-1)$-th target coding pixel$\}$, $C(k)$ is a C data of the target coding pixel (a k-th target coding pixel), $C(k-1)$ is a C data of a target coding pixel which immediately precedes the target coding pixel $\{a(k-1)$-th target coding pixel$\}$, $LSZ(k)$ is an LSZ data indicating a mismatching probability which is a part of a probability estimating data for the target coding pixel (a k-th target coding pixel), and $k=1,2,3,\ldots n$ where n is a positive integer.

28. A digital information decoding method comprising:

during one clock of a system clock signal when decoding processing for a target decoding pixel requires one renormalization, generating a context for the target decoding pixel;

reading out a storing data comprising a prediction symbol based on the generated context and an LSZ data which is a part of a probability estimating data and indicates a mismatching probability;

obtaining an A data indicating the size of the current interval for a target decoding pixel, a C data indicating the trailing bits of the code stream for a target decoding pixel, and a prediction conversion signal according to the read-out storing data, an A data indicating the size of the current interval for a target decoding pixel which immediately precedes the target decoding pixel, and a C data indicating the trailing bits of the code stream for a target decoding pixel which immediately precedes the target decoding pixel, and further obtaining a decoded picture data for the target decoding pixel; and, during subsequent one clock of a system clock signal, obtaining a renewal data comprising a prediction symbol and an LSZ data which is a part of a probability estimating data and indicates a mismatching probability according to the read-out storing data and the obtained prediction conversion signal;

rewriting a storing data based on the context for the target decoding pixel by the renewal data;

generating a context for a subsequent target decoding pixel of the target decoding pixel;

reading out a storing data based on the generated context;

obtaining an A data indicating a size of the current coding interval for a subsequent target decoding pixel of the target decoding pixel and a C data indicating the trailing bits of the code stream for a subsequent target decoding pixel of the target decoding pixel, according to the read-out storing data, an A data indicating a size of the current coding interval for a subsequent target decoding pixel of the target decoding pixel and a C data indicating the trailing bits of the code stream for a subsequent target decoding pixel of the target decoding pixel.

29. A digital information decoding method comprising:

during one clock of a system clock signal when decoding processing for a target decoding pixel requires one renormalization, generating a context for the target decoding pixel;

reading out a storing data comprising a prediction symbol and an LSZ data which is a part of a probability estimating data and indicates a mismatching probability according to the context generated by the above-mentioned step;

obtaining a prediction conversion signal which indicates whether an equation (5) below is satisfied or not;

obtaining an A data and a C data for the target decoding pixel according to equations (6) and (7) below if the equation (5) is satisfied, obtaining an A data and a C data for the target decoding pixel according to equations (8) and (9) below if the equation (5) is not satisfied, during subsequent one clock of a system clock signal, obtaining a renewal data comprising a prediction symbol and an LSZ data which is a part of probability estimating data and indicates a mismatching probability according to the obtained prediction conversion signal and the read-out storing data;

rewriting a storing data based on the context for the target decoding pixel by the renewal data;

generating a context for a subsequent target decoding pixel of the target decoding pixel;

obtaining an A data and a C data for a subsequent target decoding pixel of the target decoding pixel according to equations (6) and (7) if the equation (5) is satisfied, obtaining an A data and a C data for a subsequent target decoding pixel of the target decoding pixel according to equations (8) and (9) if the equation (5) is not satisfied; wherein $$C(k-1) < A(k-1) - LSZ(k) \tag{5}$$

$$A(k) = A(k-1) - LSZ(k) \tag{6}$$

$$C(k) = C(k-1) \tag{7}$$

$$A(k) = LSZ(k) \tag{8}$$

$$C(k) = C(k-1) + \{A(k-1) - LSZ(k)\} \tag{9}$$

where, $A(k)$ is an A data of the target decoding pixel (a k-th target decoding pixel), $A(k-1)$ is an A data of a target decoding pixel which immediately precedes the target decoding pixel {a(k-1)-th target decoding pixel}, $C(k)$ is a C data of the target decoding pixel (a k-th target decoding pixel), $C(k-1)$ is a C data of a target decoding pixel which immediately precedes the target decoding pixel {a(k-1)-th target decoding pixel}, $LSZ(k)$ is an LSZ data indicating a mismatching probability which is a part of a probability estimating data for the target decoding pixel (a k-th target decoding pixel), and $k=1,2,3,\ldots n$ where n is a positive integer.

* * * * *

UNITED STATES PATENT AND TRADEMARK OFFICE
CERTIFICATE OF CORRECTION

PATENT NO. : 5,781,136
DATED : July 14, 1998
INVENTOR(S) : Imanaka et al.

It is certified that error appears in the above-identified patent and that said Letters Patent is hereby corrected as shown below:

Column 73, Line 64, after "a" insert --truth--;

Column 74, Line 51, after "outputting" insert --them--.

Signed and Sealed this

Seventeenth Day of November, 1998

Attest:

BRUCE LEHMAN

Attesting Officer          Commissioner of Patents and Trademarks